United States Patent
Noh et al.

(10) Patent No.: US 8,811,314 B2
(45) Date of Patent: Aug. 19, 2014

(54) METHOD AND APPARATUS FOR TRANSMITTING REFERENCE SIGNAL IN WIRELESS COMMUNICATION SYSTEM

(75) Inventors: Min Seok Noh, Anyang-si (KR); Jae Hoon Chung, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 143 days.

(21) Appl. No.: 13/148,292

(22) PCT Filed: Mar. 16, 2010

(86) PCT No.: PCT/KR2010/001622
§ 371 (c)(1),
(2), (4) Date: Aug. 5, 2011

(87) PCT Pub. No.: WO2010/107230
PCT Pub. Date: Sep. 23, 2010

(65) Prior Publication Data
US 2011/0317641 A1 Dec. 29, 2011

Related U.S. Application Data

(60) Provisional application No. 61/166,779, filed on Apr. 6, 2009, provisional application No. 61/161,419, filed on Mar. 19, 2009, provisional application No. 61/161,075, filed on Mar. 18, 2009.

(51) Int. Cl.
*H04W 72/04* (2009.01)
*H04L 1/18* (2006.01)
*H04L 1/00* (2006.01)

(52) U.S. Cl.
CPC .............. *H04L 1/188* (2013.01); *H04L 1/1812* (2013.01); *H04L 1/0027* (2013.01)
USPC .......................................................... 370/329

(58) Field of Classification Search
CPC ....... H04L 1/0027; H04L 1/188; H04L 1/1812
USPC ................................................... 370/329–332
See application file for complete search history.

(56) References Cited

U.S. PATENT DOCUMENTS

2010/0080166 A1* 4/2010 Palanki et al. ................ 370/315
2010/0091724 A1* 4/2010 Ishii et al. ..................... 370/329

FOREIGN PATENT DOCUMENTS

| KR | 1020080088525 | 10/2008 |
|----|---------------|---------|
| KR | 1020080110453 | 12/2008 |
| KR | 1020080112115 | 12/2008 |
| KR | 1020090026019 | 3/2009  |

OTHER PUBLICATIONS

3GPP, MCCH structure and multiplexing, Oct. 8-12, 2007, Philips, 3GPP TSG-RAN WG2#59bis, #pp. 4.*

* cited by examiner

*Primary Examiner* — Jae Y Lee
*Assistant Examiner* — Jean F Voltaire
(74) *Attorney, Agent, or Firm* — Lee, Hong, Degerman, Kang & Waimey

(57) ABSTRACT

A method and apparatus of transmitting a reference signal in a wireless communication system is provided. A transmitter generates the reference signal, maps the reference signal to a resource region, and transmits the reference signal, mapped to the resource region, to a user equipment (UE). The resource region to which the reference signal is mapped is determined based on at least one of a hybrid automatic repeat request (HARQ) processing time for backhaul link transmission, a position of a backhaul link sub-frame, and a transmission period of the reference signal.

10 Claims, 49 Drawing Sheets

| 1 subframe | | | | | | | | | | | |
|---|---|---|---|---|---|---|---|---|---|---|---|
| Slot 0 | | | | | | Slot 1 | | | | | |
| 0/1 | 2/3 | | 0/1 | S | P | B | B | B | B | 0/1 | |
| C | C | C | | | | 0/1 | 2/3 | | | | |

RS port 0,1

RS port 2,3

PSCH

SSCH

PBCH

DL Control CH

CRS for LTE-A

RS port 0,1

RS port 2,3

PSCH

SSCH

PBCH

DL Control CH

CRS for LTE-A

Fig. 18

| 1 subframe |||||||||||||
|---|---|---|---|---|---|---|---|---|---|---|---|
| Slot 0 |||||| Slot 1 ||||||
| 0/1 | 2/3 | | ▨ | 0/1 | S | P | B | B | B | B | 0/1 | ▨ |
| C | C | C | | | | | 0/1 | 2/3 | | | | |

| 0/1 | RS port 0,1 |
| 2/3 | RS port 2,3 |
| P | PSCH |
| S | SSCH |
| B | PBCH |
| C | DL Control CH |
| ▨ | CRS for LTE-A |

RS port 0,1

RS port 2,3

PSCH

SSCH

PBCH

DL Control CH

CRS for LTE-A

C0 :CQI RS for antenna port 0 in LTE-A
C1 :CQI RS for antenna port 1 in LTE-A
C2 :CQI RS for antenna port 2 in LTE-A
C3 :CQI RS for antenna port 3 in LTE-A
C4 :CQI RS for antenna port 4 in LTE-A
C5 :CQI RS for antenna port 5 in LTE-A
C6 :CQI RS for antenna port 6 in LTE-A
C7 :CQI RS for antenna port 7 in LTE-A C0 : CQI RS for antenna port 0 in LTE-A
C1 : CQI RS for antenna port 1 in LTE-A
C2 : CQI RS for antenna port 2 in LTE-A
C3 : CQI RS for antenna port 3 in LTE-A
C4 : CQI RS for antenna port 4 in LTE-A
C5 : CQI RS for antenna port 5 in LTE-A
C6 : CQI RS for antenna port 6 in LTE-A
C7 : CQI RS for antenna port 7 in LTE-A C0 :CQI RS for antenna port 0 in LTE-A
C1 :CQI RS for antenna port 1 in LTE-A
C2 :CQI RS for antenna port 2 in LTE-A
C3 :CQI RS for antenna port 3 in LTE-A
C4 :CQI RS for antenna port 4 in LTE-A
C5 :CQI RS for antenna port 5 in LTE-A
C6 :CQI RS for antenna port 6 in LTE-A
C7 :CQI RS for antenna port 7 in LTE-A

METHOD AND APPARATUS FOR TRANSMITTING REFERENCE SIGNAL IN WIRELESS COMMUNICATION SYSTEM

CROSS-REFERENCE TO RELATED APPLICATIONS

This application is the National Stage filing under 35 U.S.C. of International Application No. PCT/KR2010/001622, filed on Mar. 16, 2010, which claims the benefit of U.S. Provisional Application Ser. Nos. 61/166,779, filed on Apr. 6, 2009, 61/161,419, filed on Mar. 19, 2009, and 61/161,075, filed on Mar. 18, 2009, the contents of which are all hereby incorporated by reference herein in their entirety.

TECHNICAL FIELD

The present invention relates to wireless communications, and more particularly, to a method and apparatus for transmitting a reference signal in a wireless communication system.

BACKGROUND ART

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, InterSymbol Interference (ISI), and the Doppler Effect resulting from the mobility of a user equipment. A variety of techniques are being developed in order to overcome the abnormal characteristics of the wireless channel and to increase the reliability of wireless communication.

Technology for supporting reliable and high-speed data service includes Orthogonal Frequency Division Multiplexing (OFDM), Multiple Input Multiple Output (MIMO), and so on.

An OFDM system is being considered after the $3^{rd}$ generation system which is able to attenuate the ISI effect with low complexity. The OFDM system converts symbols, received in series, into N (N is a natural number) parallel symbols and transmits them on respective separated N subcarriers. The subcarriers maintain orthogonality in the frequency domain. It is expected that the market for mobile communication will shift from the existing Code Division Multiple Access (CDMA) system to an OFDM-based system.

MIMO technology can be used to improve the efficiency of data transmission and reception using multiple transmission antennas and multiple reception antennas. MIMO technology includes spatial multiplexing, transmit diversity, beam-forming and the like. An MIMO channel matrix according to the number of reception antennas and the number of transmission antennas can be decomposed into a number of independent channels. Each of the independent channels is called a layer or stream. The number of layers is called a rank.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmission signal by compensating for the distortion of the transmission signal resulting from a sudden change in the environment, caused by such fading, is called channel estimation. Channel estimation, in general, is performed using a reference signal (RS) which is known to a transmitter and a receiver.

In OFDM systems, a method of assigning a reference signal includes a method of assigning a reference signal to all subcarriers and a method of assigning a reference signal between data subcarriers. The method of assigning a reference signal to all subcarriers is performed using a signal comprising only a reference signal, such as a preamble signal, in order to achieve the performance of channel estimation. If this method is used, the performance of channel estimation can be improved as compared with the method of assigning a reference signal between data subcarriers because, in general, the density of reference signals is high. However, the method of assigning a reference signal between data subcarriers is used in order to increase the amount of transmission data because the amount of transmission data is reduced. If such a method is used, the density of reference signals is reduced, thereby deteriorating the performance of channel estimation. To minimize such deterioration, the reference signals should be properly arranged.

Meanwhile, a wireless communication system including relay stations is recently being developed. The relay station functions to expand the cell coverage and improve the performance of transmission. If a base station provides services to a user equipment, placed at the boundary of the coverage of the base station, through a relay station, the cell coverage can be expanded. Furthermore, if a relay station improves reliability in the transmission of signals between a base station and a user equipment, the amount of transmission data can be increased. Although a user equipment is placed within the cell coverage of a base station, it may use a relay station placed in the shadow region.

Uplink and downlink between a base station and a relay station is a backhaul link, and uplink and the downlink between a relay station and a user equipment is an access link. Hereinafter, a signal transmitted through the backhaul link is called a backhaul signal, and a signal transmitted through the access link is an access signal. If a large amount of radio resources are allocated in order to transmit a backhaul signal between a base station and a relay station, radio resources necessary to transmit an access signal between the relay station and a user equipment become short, and the efficiency in the use of the radio resources is lowered.

In the backhaul link, there is a need for a method of efficiently transmitting a reference signal.

SUMMARY OF INVENTION

Technical Problem

The present invention provides a method and apparatus for transmitting a reference signal in a wireless communication system.

Solution to Problem

In an aspect, a method of transmitting a reference signal in a wireless communication system is provided. The method include generating the reference signal, mapping the reference signal to a resource region, and transmitting the reference signal, mapped to the resource region, to a user equipment (UE), wherein the resource region to which the reference signal is mapped is determined based on at least one of a hybrid automatic repeat request (HARQ) processing time for backhaul link transmission, a position of a backhaul link sub-frame, and a transmission period of the reference signal. The HARQ processing time for backhaul link transmission may be one of 10 ms, 8 ms, and 5 ms. The transmission period of the reference signal may be a multiple of an integer of 5 ms. The transmission period of the reference signal may be 10 ms. The resource region may be at least one of sub-frames except a sub-frame allocated as the backhaul link sub-frame. The resource region may be indicated by a sub-frame offset value transmitted by a higher layer. The sub-frame offset value may be one of 1, 2, 3 and 4. The resource region to which the reference signal is mapped may be a sub-frame to which a physical broadcast channel (PBCH) or a synchronization channel (SCH) is not allocated. The resource region to which the reference signal is mapped may be an orthogonal frequency division multiplexing (OFDM) symbol to which a PBCH, an SCH, or a physical downlink control channel (PDCCH) is not allocated. Information about the resource region may be transmitted from a base station or a higher layer to the UE.

In another aspect, a transmitter in a wireless communication system is provided. The transmitter include a channel state information reference signal (CRS) generating unit configured to generate a reference signal, a CRS mapper configured to map the reference signal to the resource region, and an radio frequency unit coupled to the CRS mapper and configured to transmit and receive radio signals, wherein the CRS mapper determines the resource region based on at least one of a hybrid automatic repeat request (HARQ) processing time for backhaul link transmission, a position of a backhaul link sub-frame, and a transmission period of the reference signal. The HARQ processing time for backhaul link transmission may be one of 10 ms, 8 ms, and 5 ms. The transmission period of the reference signal may be a multiple of an integer of 5 ms. The transmission period of the reference signal may be 10 ms.

Advantageous Effects of Invention

A base station transmits a Channel State Information Reference Signal (CSI RS: CRS) with consideration taken of the Hybrid Automatic Repeat request (HARQ) processing time or a downlink control channel in a backhaul link. Accordingly, the CSI RS can be efficiently transmitted.

BRIEF DESCRIPTION OF DRAWINGS

FIG. 14 to FIG. 46 is a diagram showing another example of sub-frames to which CRSs have been mapped in accordance with the proposed method of transmitting a reference signal.

MODE FOR THE INVENTION

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16(WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

LTE/LTE-A is chiefly described as an example in order to clarify the description, but the technical spirit of the present invention is not limited to LTE/LTE-A.

Figure 1:
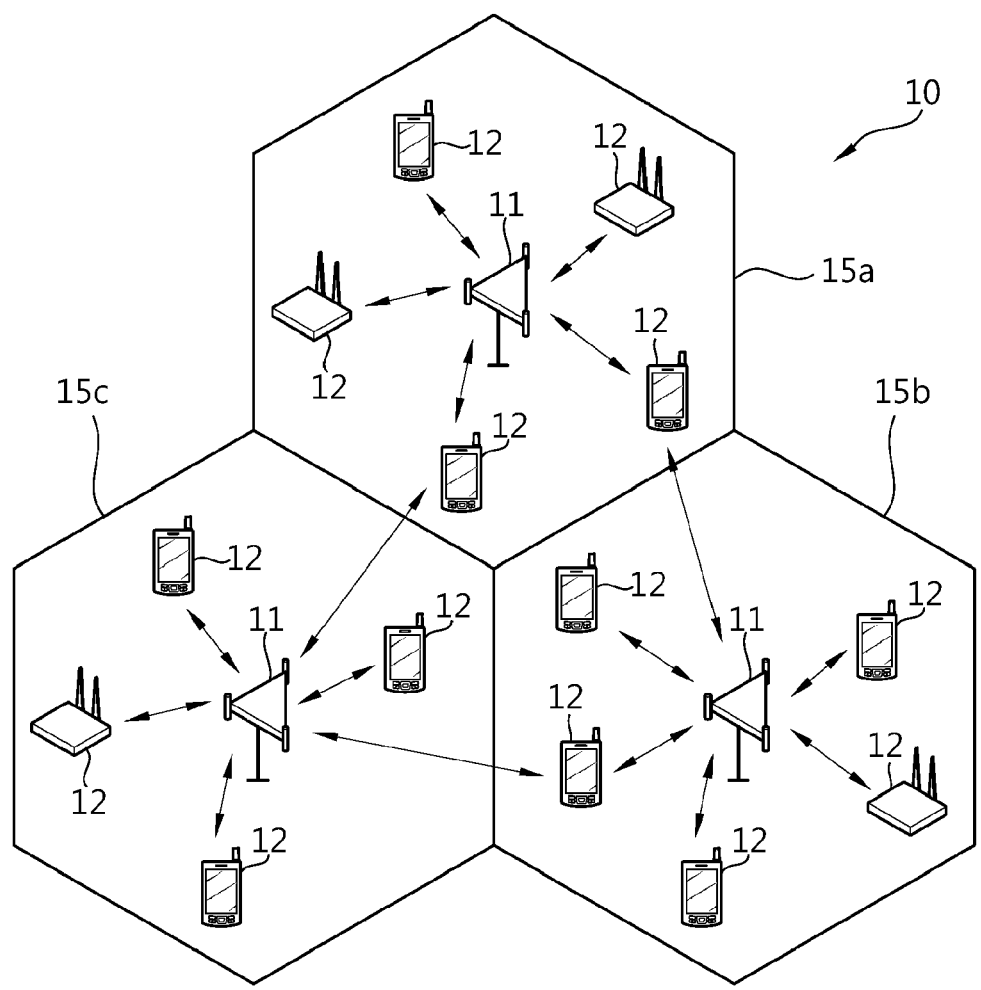
FIG. 1 shows a wireless communication system.

FIG. 1 shows a wireless communication system.

Referring to FIG. 1, the wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolvedNodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
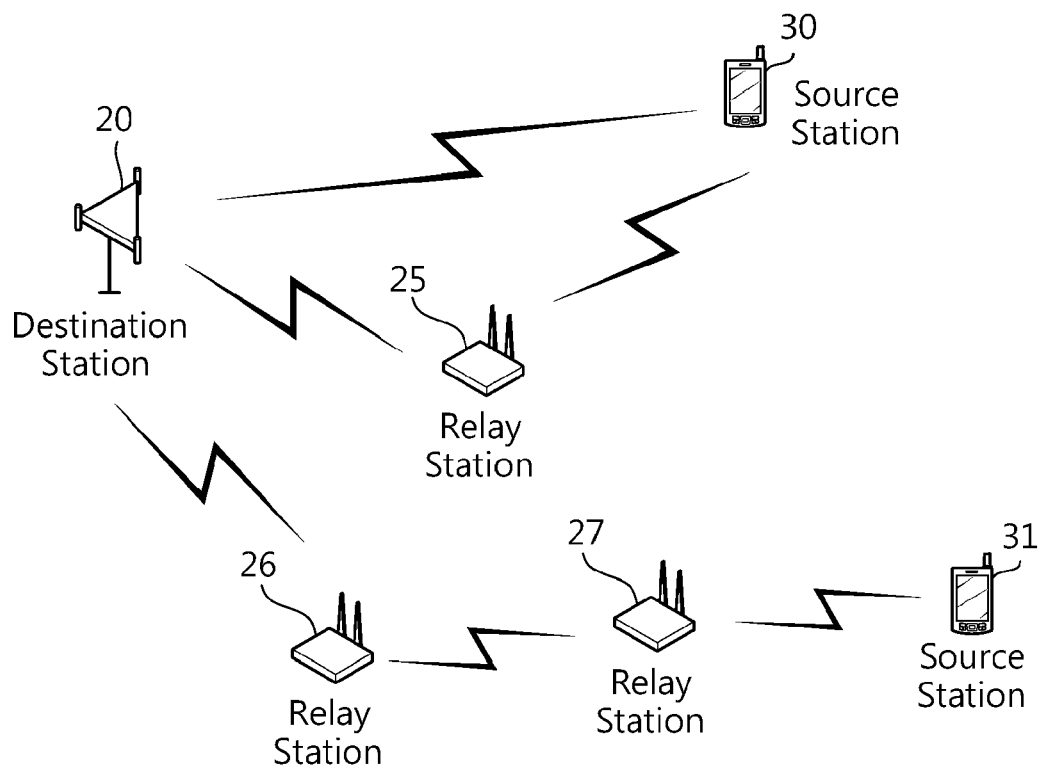
FIG. 2 shows a wireless communication system using relay stations.

FIG. 2 shows a wireless communication system using relay stations.

In uplink transmission, a source station can be a user equipment, and a destination station can be a base station. In downlink transmission, a source station can be a base station, and a destination station can be a user equipment. A relay station may be a user equipment, and an additional relay station can be deployed. A base station can perform functions, such as connectivity, management, control, and resource allocation between a relay station and a user equipment.

Referring to FIG. 2, a destination station 20 communicates with a source station 30 via a relay station 25. In uplink transmission, the source station 30 transmits uplink data to the destination station 20 and the relay station 25. The relay station 25 retransmits the received data. Further, the destination station 20 communicates with a source station 31 via relay stations 26 and 27. In uplink transmission, the source station 31 transmits uplink data to the destination station 20 and the relay stations 26 and 27. The relay stations 26 and 27 retransmit the received data sequentially or at the same time.

Although one destination station 20, the three relay stations 25, 26, and 27, and the two source stations 30 and 31 are illustrated, the present invention is not limited to the above example. It is to be noted that the number of destination stations, relay stations, and source stations included in a wireless communication system is not limited.

Any method (for example, Amplify and Forward (AF) or Decode and Forward (DF)) can be used as a relay method for a relay station. The technical spirit of the present invention is not limited to the methods.

Figure 3:
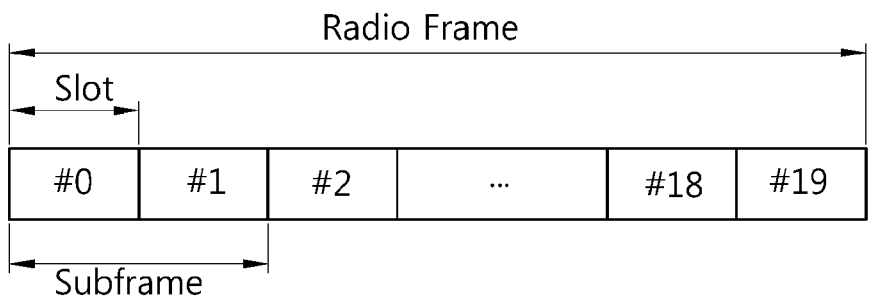
FIG. 3 shows the structure of a radio frame in the 3GPP LTE specifications.

FIG. 3 shows the structure of a radio frame in the 3GPP LTE specifications. For the radio frame structure, reference can be made to Paragraph 5 of 3GPP ($3^{rd}$ Generation Partnership Project) TS 36.211 V8.2.0 (2008-03) "Technical Specification Group Radio Access Network; Evolved Universal Terrestrial Radio Access (E-UTRA); Physical channels and modulation (Release 8)".

Referring to FIG. 3, the radio frame includes ten sub-frames, and one sub-frame includes two slots. The slots within the radio frame are allocated slot numbers from #0 to #19. The time that it takes to transmit one sub-frame is called a Transmission Time Interval (TTI). The TTI can be called a scheduling unit for data transmission. For example, the length of one radio frame can be 10 ms, the length of one sub-frame can be 1 ms, and the length of one slot may be 0.5 ms.

One slot includes a plurality of Orthogonal Frequency Division Multiplexing (OFDM) symbols in the time domain and a plurality of subcarriers in the frequency domain. The OFDM symbol is used to represent one symbol period because the 3GPP LTE specifications use OFDMA in the downlink. The OFDM symbol can be called another terminology according to the multi-access method. For example, in the case in which SC-FDMA is used as an uplink multi-access method, corresponding symbols can be called SC-FDMA symbols. A Resource Block (RB) is the unit of resource allocation, and it includes a plurality of consecutive subcarriers in one slot. The structure of a radio frame is only an example. The number of sub-frames included in a radio frame, the number of slots included in a sub-frame, or the number of OFDM symbols included in a slot can be changed in various ways.

In the 3GPP LTE specifications, one slot is defined to include seven OFDM symbols in a normal Cyclic Prefix (CP), and one slot is defined to include six OFDM symbols in the extended CP.

Figure 4:
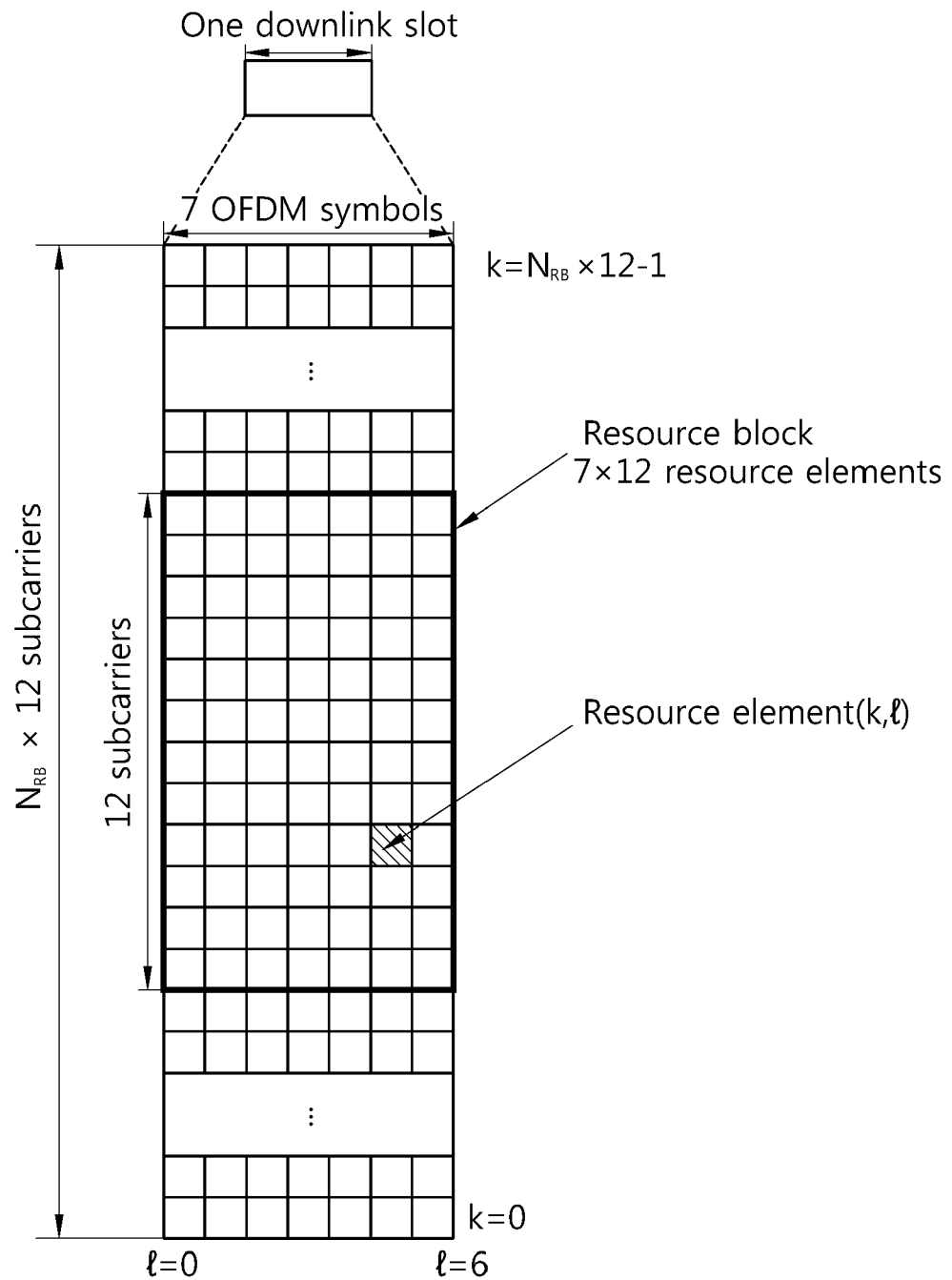
FIG. 4 shows an example of a resource grid for one downlink slot.

FIG. 4 shows an example of a resource grid for one downlink slot.

The downlink slot includes a plurality of OFDM symbols in the time domain and $N_{RB}$ resource blocks in the frequency domain. The number of resource blocks $N_{RB}$ included in a downlink slot is dependent on a downlink transmission bandwidth set in a cell. For example, in the LTE system, the number of resource blocks $N_{RB}$ may be one of 60 to 110. One resource block includes a plurality of subcarriers in the frequency domain. The structure of an uplink slot can be identical with that of the downlink slot.

Each of elements on the resource grid is called a resource element. The resource element on the resource grid can be identified by an index pair (k, l) within a slot. Here, $k(k=0, \ldots, N_{RB} \times 12-1)$ denotes a subcarrier index in the frequency domain, and l ($l=0, \ldots, 6$) denotes an OFDM symbol index in the time domain.

In this case, one resource block is illustrated to include 7×12 resource elements, including 7 OFDM symbols in the time domain and 12 subcarriers in the frequency domain. However, the number of OFDM symbols and the number of subcarriers within a resource block are not limited to the 7×12 resource elements. The number of OFDM symbols and the number of subcarriers can be variously changed depending on the length of a CP, frequency spacing, and so on. For example, in the normal CP, the number of OFDM symbols can be 7, and in the extended CP, the number of OFDM symbols can be 6. In one OFDM symbol, the number of subcarriers can be one of 128, 256, 512, 1024, 1536, and 2048.

Figure 5:
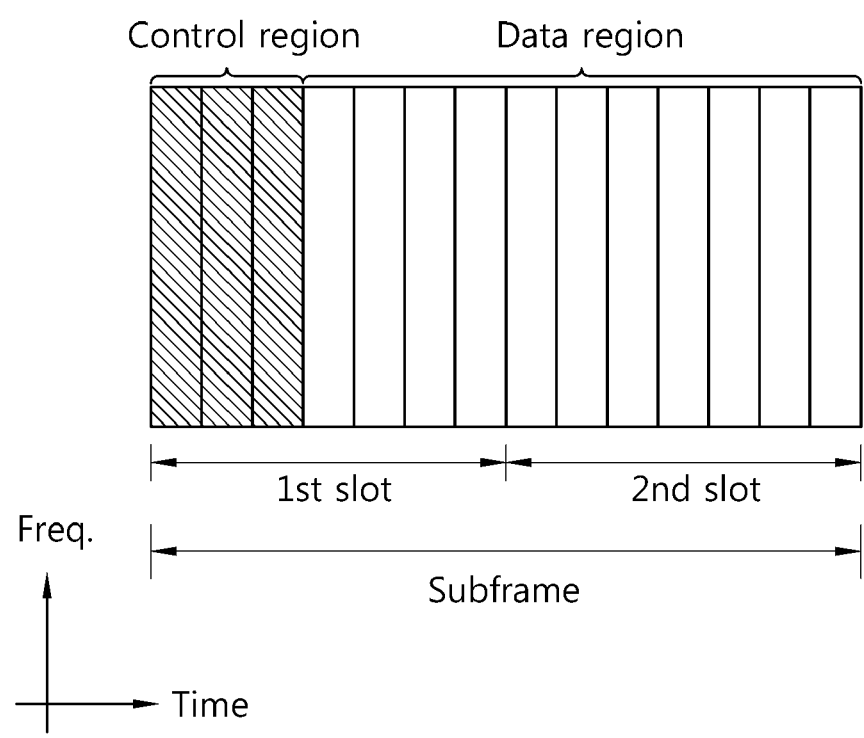
FIG. 5 shows the structure of a downlink sub-frame.

FIG. 5 shows the structure of a downlink sub-frame.

The downlink sub-frame includes two slots in the time domain. Each of the slots includes 7 OFDM symbols in the normal CP. A maximum of three OFDM symbols of the first slot within the sub-frame correspond to a control region to which control channels are allocated, and the remaining OFDM symbols correspond to a data region to which Physical Downlink Shared Channels (PDSCHs) are allocated. Downlink control channels used in the 3GPP LTE include a Physical Control Format Indicator Channel (PCFICH), a Physical Downlink Control Channel (PDCCH), a Physical Hybrid-ARQ Indicator Channel (PHICH), and so on. The PCFICH transmitted in the first OFDM symbol of a sub-frame carries information about the number of OFDM symbols (that is, the size of a control region) which is used to transmit control channels within the sub-frame. The PHICH carries an Acknowledgement (ACK)/Not-Acknowledgement (NACK) signal for an uplink Hybrid Automatic Repeat Request (HARM). In other words, an ACK/NACK signal for uplink data transmitted by a user equipment is transmitted on the PHICH. Control information transmitted through the PDCCH is called Downlink Control Information (DCI). The DCI indicates uplink or downlink scheduling information, an uplink transmission power control command for specific user equipment groups, etc.

Figure 6:
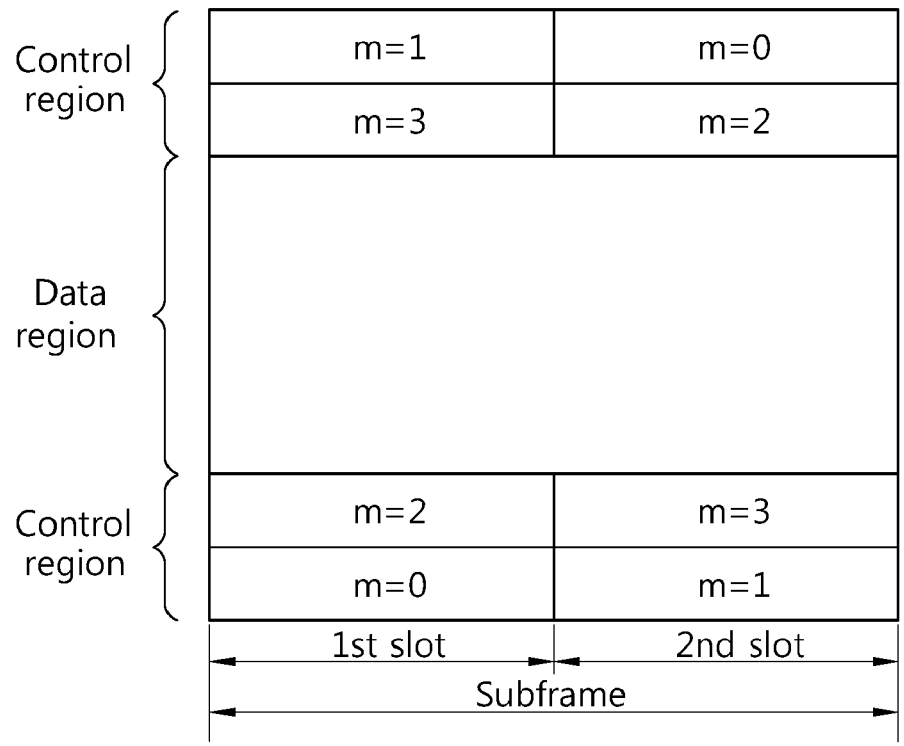
FIG. 6 shows the structure of an uplink sub-frame.
Figure 6:
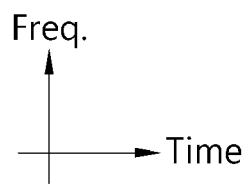

FIG. 6 shows the structure of an uplink sub-frame.

The uplink sub-frame can be divided into a control region and a data region in the frequency domain. The control region is allocated with a Physical Uplink Control Channel (PUCCH) on which uplink control information is transmitted. The data region is allocated with a Physical Uplink Shared Channel (PUSCH) on which data are transmitted. To maintain the characteristic of a single carrier, a user equipment does not transmit the PUCCH and the PUSCH at the same time. The PUCCHs of one user equipment forms a RB pair within a sub-frame and are then allocated. The RBs included in the RB pair occupy different subcarriers of respective slots. It is said that a RB pair allocated to a PUCCH is frequency-hopped at the slot boundary.

A reference signal (RS) is used for channel estimation. Channel estimation is necessary for user scheduling or data demodulation or both. Furthermore, the RS can also be used to measure the quality of a channel for its own cell or other cells as well as channel estimation. The reference signal is known to both a transmitter and a receiver and is also called a pilot. A subcarrier used to transmit the reference signal is called a reference signal subcarrier, and a resource element used to transmit data is called a data subcarrier.

The reference signals, in general, are transmitted in a sequence. A specific sequence can be used as the reference signal sequence without special restrictions. A Phase Shift Keying (PSK)-based computer-generated sequence can be used as the reference signal sequence. PSK can include, for example, Binary Phase Shift Keying (BPSK), Quadrature Phase Shift Keying (QPSK), etc. Alternatively, a Constant Amplitude Zero Auto-Correlation (CAZAC) sequence can be used as the reference signal sequence. The CAZAC sequence can include, for example, a Zadoff-Chu (ZC)-based sequence, a ZC sequence with cyclic extension, and a ZC sequence with truncation. Alternatively, a Pseudo-random (PN) sequence can be used as the reference signal sequence. The PN sequence can include, for example, m-sequence, a computer-generated sequence, a Gold sequence, and a Kasami sequence. Further, a cyclically shifted sequence can be used as the reference signal sequence.

A reference signal can be classified into a cell-specific reference signal, an MBSFN reference signal, and a user equipment-specific reference signal (UE-specific RS). The cell-specific reference signal is transmitted to all the UEs within a cell and used for channel estimation. The MBSFN reference signal can be transmitted in sub-frames allocated for MBSFN transmission. The UE-specific reference signal is received by a specific UE or a specific UE group within a cell. The UE-specific reference signal is chiefly used by a specific UE or a specific UE group for the purpose of data demodulation.

The cell-specific reference signal can be used to estimate Channel State Information (CSI) in the LTE-A system. A UE can report a Channel Quality Indicator (CQI), a Precoding Matrix Indicator (PMI), and a Rank Indicator (RI) through the CSI estimation. The UE-specific reference signal can be used for PDSCH demodulation in the LTE-A system. Here, the PDSCH and the UE-specific reference signal can comply with the same precoding operation.

In a system including a relay station, a backhaul link between a base station and a relay station and an access link between the relay station and a UE can use the same resource region. A signal transmitted by a transmitter of the relay station can act as interference to a signal received by a receiver of the relay station. Accordingly, the relay station cannot transmit a signal to the UE during the time for which a signal transmitted by the base station is received. In a similar way, the relay station cannot transmit a signal to the base station during the time for which a signal transmitted by the UE is received. The signal transmitted by the relay station and the signal received by the relay station need to be distinguished from each other.

To solve the interference problem, a signal can be planned to be received from the base station in a specific resource region, and a signal may not be transmitted to the UE in the above resource region. It refers to that there is a gap in access link transmission. To generate the gap in such access link transmission, a sub-frame of the resource region in which the gap is set up can be set as a Multimedia Broadcast multicast service Single Frequency Network (MBSFN) sub-frame. The UE can know that any signal will not be transmitted from the relay station in the MBSFN sub-frame. In the corresponding MBSFN sub-frame, the relay station can receive a signal, transmitted by the base station, without interference.

On the other hand, a downlink sub-frame in which downlink transmission from the base station to the relay station is performed and an uplink sub-frame in which uplink transmission from the relay station to the base station is performed, in the backhaul link, can be allocated semi-statically. Alternatively, the uplink sub-frame of the relay station can be operated in conjunction with the downlink sub-frame of the base station in accordance with an HARQ timing relationship. Further, the base station can always use a specific sub-frame as the downlink sub-frame in order to transmit a downlink signal to a UE connected to the relay station or the base station. For example, zeroth, fourth, fifth, and ninth sub-frames within a radio frame can always be used as downlink sub-frames for transmitting the downlink signal.

In order for a CSI RS for measuring a channel state to be transmitted, configuration of the downlink sub-frame and the uplink sub-frame, the HARQ timing, and so on have to be taken into consideration.

Embodiments of a proposed method of transmitting a reference signal are described below. The CRS is illustrated to be a CSI (Channel State Information) RS for measuring the channel state of a cell-specific reference signal, but the present invention is not limited thereto. The proposed method of transmitting a reference signal can be applied to various kinds of reference signals.

Figure 7:
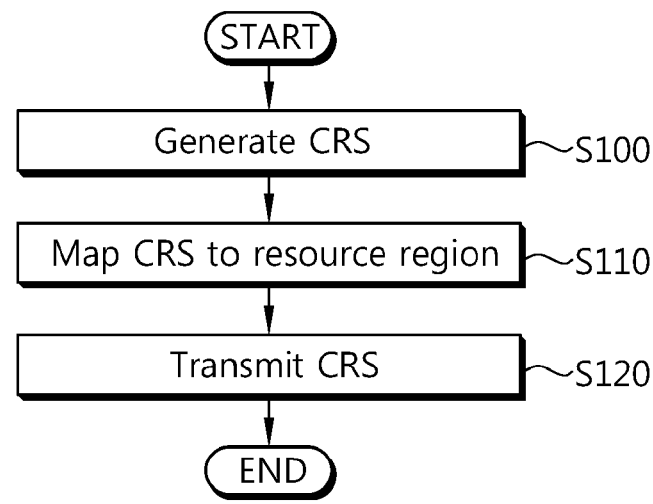
FIG. 7 is a diagram illustrating an embodiment of the proposed method of transmitting a reference signal.

FIG. 7 is a diagram illustrating an embodiment of the proposed method of transmitting a reference signal.

In step S100, a base station generates a CRS. In step S110, the base station maps the generated CRS to a resource region. In step S120, the base station transmits the CRS, mapped to the resource region, to a UE.

A position on the resource region to which the CRS is mapped can be determined by taking the following several factors into consideration.

1) Whether information about the position on the resource region to which the CRS is mapped is signaled to the UE: Information about the position on the resource region to which the CRS is mapped can be signaled to the UE or the position on the resource region to which the CRS is mapped can be previously determined.

2) HARQ timing for backhaul link: It refers to a cycle in which an HARQ for backhaul link is performed and can have a cycle, such as 10 ms, 8 ms, or 5 ms.

3) The position of a sub-frame for backhaul link transmission

4) The number of sub-frames for backhaul link transmission within one radio frame 5) A CRS transmission cycle can have various cycles, such as 40 ms, 20 ms, 10 ms, 8 ms, 5 ms, and 2 ms.

6) The symbol position of a signal mandatorily transmitted: A base station must transmit a PDCCH, a Physical Broadcast Channel (PBCH), a Synchronization Channel (SCH), and a paging channel in order to maintain a radio system. A CRS can be transmitted without using a symbol mapped to the above signal.

7) A method of indicating a CRS

8) Whether a CRS has been separated from a backhaul link sub-frame and allocated: A CRS can be transmitted in the resource region except the backhaul link sub-frame or can be transmitted within the backhaul link sub-frame First, the case in which information about the position on the resource region to which the CRS is mapped is previously determined is described. Here, the position in which the CRS is transmitted is determined by HARQ timing, the position and number of backhaul link sub-frames, and a CRS transmission cycle.

Figure 8:
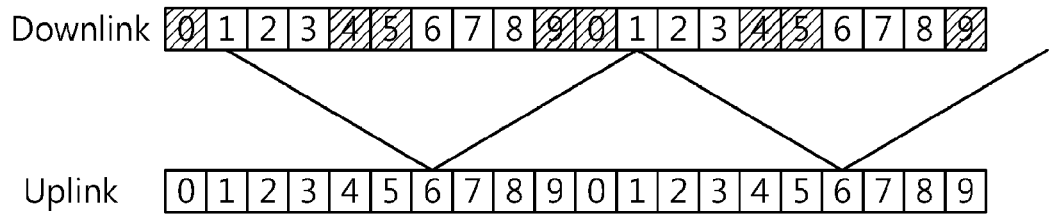
FIG. 8 is a diagram illustrating an example of the structure of backhaul link subframes having an HARQ cycle of 10 ms.

FIG. 8 is a diagram illustrating an example of the structure of backhaul link subframes having an HARQ cycle of 10 ms. The zeroth, fourth, fifth, and ninth sub-frames of each of radio frames are used as the downlink sub-frames of a base station. The base station performs backhaul link transmission to a relay station in the first sub-frame of each radio frame and receives an Acknowledgement/Non-acknowledgement (ACK/NACK) signal transmitted in the sixth sub-frame of each radio frame. Since the HARQ cycle is 10 ms, the HARQ process is repeated in all the radio frames.

The number of sub-frames for backhaul link transmission within one radio frame can be 1. A sub-frame allocated to the backhaul link sub-frame within the radio frame can be any one of first, second, third, sixth, seventh, and eighth sub-frames.

In the case in which the transmission cycle of a CRS is 40 ms, the CRS can be allocated to one sub-frame for every four radio frames and then transmitted. More particularly, the CRS can be allocated to any one of all the sub-frames except the backhaul link sub-frame (one of the first, second, third, sixth, seventh, and eighth sub-frames) within an $n_f$ mod 4=i (i∈{0, 1,2,3}) radio frame and then transmitted. Here, $n_f$ is the index of a radio frame, and i can be a fixed value or can be signaled by a base station.

In the case in which the transmission cycle of a CRS is 20 ms, the CRS can be allocated to one sub-frame for every two radio frames and then transmitted. More particularly, the CRS can be allocated to any one of all the sub-frames except the backhaul link sub-frame (one of the first, second, third, sixth, seventh, and eighth sub-frames) within an $n_f$ mod 2=i (i∈{0, 1}) radio frame and then transmitted. Here, $n_f$ is the index of a radio frame, and i can be a fixed value or can be signaled by a base station.

In the case in which the transmission cycle of a CRS is 10 ms, the CRS can be allocated to one sub-frame for every radio frame and then transmitted.

In the case in which the transmission cycle of a CRS is 8 ms, the CRS can be allocated to any one of all the sub-frames except the backhaul link sub-frame (one of the first, second, third, sixth, seventh, and eighth sub-frames) within a radio frame and then transmitted. Here, the CRS needs to be properly positioned in order to maintain the transmission cycle 8 ms for each antenna port.

In the case in which the transmission cycle of a CRS is 5 ms, a sub-frame to which the CRS can be allocated can be determined on the basis of Table 1.

TABLE 1

| | N | | |
|---|---|---|---|
| | 1 or 6 | 2 or 7 | 3 or 8 |
| Sub-frame index for CRS allocation in radio frame | (0, 5) (2, 7) (3, 8) (4, 9) | (0, 5) (1, 6) (3, 8) (4, 9) | (0, 5) (1, 6) (2, 7) (4, 9) |

In the case in which a backhaul link sub-frame is the first or sixth sub-frame, the CRS can be allocated to any one of $(0,5)^{th}$, $(2,7)^{th}$, $(3,8)^{th}$, and $(4,9)^{th}$ sub-frame pairs and then transmitted. In the case in which a backhaul link sub-frame is the second or seventh sub-frame, the CRS can be allocated to any one of $(0,5)^{th}$, $(1,6)^{th}$, $(3,8)^{th}$, and $(4,9)^{th}$ sub-frame pairs and then transmitted. In the case in which a backhaul link sub-frame is the third or eighth sub-frame, the CRS can be allocated to any one of $(0,5)$, $(1,6)^{th}$, $(2,7)^{th}$, and $(4,9)^{th}$ sub-frame pairs and then transmitted. Here, in the case in which the CRS is transmitted in the zeroth or fifth sub-frame, the CRS needs to be allocated so that a sub-frame including a signal, such as a PBCH and an SCH, and a sub-frame not including the signal have commonality for an Orthogonal Frequency Division Multiplexing (OFDM) symbol index or a frequency position.

In the case in which the transmission cycle of a CRS is 2 ms, a sub-frame to which the CRS can be allocated can be determined on the basis of Table 2.

TABLE 2

| | N | |
|---|---|---|
| | ODD (N = 1, 3, 7) | EVEN (N = 2, 6, 8) |
| Sub-frame index for CRS allocation in radio frame | (0, 2, 4, 6, 8) | (1, 3, 5, 7, 9) |

In the case in which a backhaul link sub-frame is an odd-numbered index sub-frame (any one of first, third, and seventh sub-frames), the CRS can be allocated to the zeroth, second, fourth, sixth, or eighth sub-frame and then transmitted. In the case in which a backhaul link sub-frame is an even-numbered index sub-frame (any one of second, sixth, and eighth sub-frames), the CRS can be allocated to the first, third, fifth, seventh, or ninth sub-frame and then transmitted. Here, in the case in which the CRS is transmitted in the zeroth or fifth sub-frame, the CRS needs to be allocated so that a sub-frame including a signal, such as a PBCH and an SCH, and a sub-frame not including the signal have commonality for an OFDM symbol index or a frequency position.

The number of sub-frames for backhaul link transmission within one radio frame can be 2. A sub-frame allocated as a backhaul link sub-frame within the radio frame can be an $N^{th}$ sub-frame and an $(N+5)^{th}$ sub-frame (where, N is any one of 1, 2, and 3).

In the case in which the transmission cycle of a CRS is 40 ms, a sub-frame to which the CRS can be allocated can be determined on the basis of Table 3.

TABLE 3

| | N | | |
|---|---|---|---|
| | 1 | 2 | 3 |
| Sub-frame index for backhaul link in radio frame | (1, 6) | (2, 7) | (3, 8) |
| Sub-frame index for CRS allocation in radio frame | one from among {0, 2, 3, 4, 5, 7, 8, 9} | one from among {0, 1, 3, 4, 5, 6, 8, 9} | one from among {0, 1, 2, 4, 5, 6, 7, 9} |

In the case in which a backhaul link sub-frame is a $(1,6)^{th}$ sub-frame, the CRS can be allocated to any one of zeroth, second, third, fourth, fifth, seventh, eighth, and ninth sub-frames and then transmitted. In the case in which a backhaul link sub-frame is a $(2,7)^{th}$ sub-frame, the CRS can be allocated to any one of zeroth, first, third, fifth, sixth, eighth, and ninth sub-frames and then transmitted. In the case in which a backhaul link sub-frame is a $(3,8)^{th}$ sub-frame, the CRS can be allocated to any one of zeroth, first, second, fourth, fifth, sixth, seventh, and ninth sub-frames and then transmitted. The CRS is allocated to one sub-frame for every four radio frames and transmitted. More particularly, the CRS can be allocated to any one of all the sub-frames except a backhaul link sub-frame within an $n_f$ mod 4=i (i∈{0,1,2,3}) radio frame and then transmitted. Here, $n_f$ is the index of a radio frame, and i can be a fixed value or can be signaled by a base station. However, the transmission cycle of a CRS for each antenna port must maintain 40 ms.

In the case in which the transmission cycle of a CRS is 20 ms, a sub-frame to which the CRS can be allocated can be determined on the basis of Table 3. The CRS is allocated to one sub-frame for every two radio frames and then transmitted. More particularly, the CRS can be allocated to any one of all the sub-frames except a backhaul link sub-frame within an $n_f$ mod 2=i (i∈{0,1}) radio frame and then transmitted. Here, $n_f$ is the index of a radio frame, and i can be a fixed value or can be signaled by a base station. However, the transmission cycle of a CRS for each antenna port must maintain 20 ms.

In the case in which the transmission cycle of a CRS is 10 ms, a sub-frame to which the CRS can be allocated can be determined on the basis of Table 3. The CRS can be allocated to one sub-frame for every radio frame and then transmitted. However, the transmission cycle of a CRS for each antenna port must maintain 10 ms.

In the case in which the transmission cycle of a CRS is 8 ms, a sub-frame to which the CRS can be allocated can be determined on the basis of Table 3. The CRS can be allocated to any one of all the sub-frames except a backhaul link sub-frame within a radio frame and then transmitted. Here, the CRS needs to be properly positioned in order to maintain the transmission cycle 8 ms for each antenna port.

In the case in which the transmission cycle of a CRS is 5 ms, a sub-frame to which the CRS can be allocated can be determined on the basis of Table 4.

TABLE 4

| | N | | |
|---|---|---|---|
| | 1 | 2 | 3 |
| Sub-frame index for CRS allocation in radio frame | (0, 5) (2, 7) (3, 8) (4, 9) | (0, 5) (1, 6) (3, 8) (4, 9) | (0, 5) (1, 6) (2, 7) (4, 9) |

In the case in which a backhaul link sub-frame is first and sixth sub-frames (N=1), the CRS can be transmitted in any one of $(0,5)^{th}$, $(2,7)^{th}$, $(3,8)^{th}$, and $(4,9)^{th}$ sub-frame pairs. In the case in which a backhaul link sub-frame is two and seventh sub-frames (N=2), the CRS can be transmitted in any one of $(0,5)^{th}$, $(1,6)^{th}$, $(3,8)^{th}$, and $(4,9)^{th}$) sub-frame pairs. In the case in which a backhaul link sub-frame is third and eighth subframes (N=3), the CRS can be transmitted in any one of $(0,5)^{th}$, $(1,6)^{th}$, $(2,7)^{th}$, and $(4,9)^{th}$ sub-frame pairs. Here, in the case in which the CRS is transmitted in the zeroth or fifth sub-frame, the CRS needs to be allocated so that a sub-frame including a signal, such as a PBCH and an SCH, and a sub-frame not including the signal have commonality for an OFDM symbol index or a frequency position.

In the case in which the transmission cycle of a CRS is 2 ms, a sub-frame to which the CRS can be allocated can be determined on the basis of Table 5.

TABLE 5

| | N | | |
|---|---|---|---|
| | 1 | 2 | 3 |
| Sub-frame index for CRS allocation in radio frame | (0, 2, 4, 6, 8) | (1, 3, 5, 7, 9) | (0, 2, 4, 6, 8) |

In the case in which a backhaul link sub-frame is a $(1,6)^{th}$ sub-frame (N=1) or a $(3,8)^{th}$ sub-frame (N=3), the CRS can be allocated to any one of zeroth, second, fourth, sixth, and eighth sub-frames and then transmitted. In the case in which a backhaul link sub-frame is a $(2,7)^{th}$ sub-frame (N=2), the CRS can be allocated to any one of first, third, fifth, seventh, and ninth sub-frames and then transmitted. Here, in the case in which the CRS is transmitted in the zeroth or fifth sub-frame, the CRS needs to be allocated so that a sub-frame including a signal, such as a PBCH and an SCH, and a sub-frame not including the signal have commonality for an OFDM symbol index or a frequency position.

Figure 9:
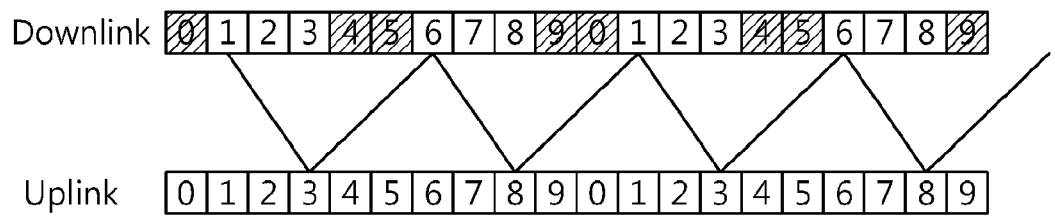
FIG. 9 is a diagram illustrating an example of the structure of backhaul link subframes having the HARQ cycle of 5 ms.

FIG. 9 is a diagram illustrating an example of the structure of backhaul link subframes having the HARQ cycle of 5 ms. The zeroth, fourth, fifth, and ninth sub-frames of each of radio frames are used as the downlink sub-frames of a base station. The base station performs backhaul link transmission to a relay station in each of the first and sixth sub-frames of each radio frame and receives an ACK/NACK signal transmitted in each of the third and eighth sub-frames of each radio frame. Since the HARQ cycle is 5 ms, the HARQ process is repeated in all the radio frames.

The number of sub-frames for backhaul link transmission within one radio frame can be 2. A sub-frame allocated as a backhaul link sub-frame within the radio frame can be any one of $(1,6)^{th}$, $(2,7)^{th}$, and $(3,8)^{th}$ sub-frame pairs.

In the case in which the transmission cycle of a CRS is 40 ms, a sub-frame to which the CRS can be allocated can be determined on the basis of Table 6.

TABLE 6

| | N | | |
|---|---|---|---|
| | 1 | 2 | 3 |
| Sub-frame index for backhaul link in radio frame | (1, 6) | (2, 7) | (3, 8) |
| Sub-frame index for CRS allocation in radio frame | one from among {0, 2, 3, 4, 5, 7, 8, 9} | one from among {0, 1, 3, 4, 5, 6, 8, 9} | one from among {0, 1, 2, 4, 5, 6, 7, 9} |

In the case in which a backhaul link sub-frame is a $(1,6)^{th}$ sub-frame, the CRS can be allocated to any one of zeroth, second, third, fourth, fifth, seventh, eighth, and ninth sub-frames and then transmitted. In the case in which a backhaul link sub-frame is a $(2,7)^{th}$ sub-frame, the CRS can be allocated to any one of zeroth, first, third, fifth, sixth, eighth, and ninth sub-frames and then transmitted. In the case in which a backhaul link sub-frame is a $(3,8)^{th}$ sub-frame, the CRS can be allocated to any one of zeroth, first, second, fourth, fifth, sixth, seventh, and ninth sub-frames and then transmitted. The CRS is allocated to one sub-frame for every four radio frames and transmitted. More particularly, the CRS can be allocated to any one of all the sub-frames except a backhaul link sub-frame within an $n_f \bmod 4 = i$ (i∈{0,1,2,3}) radio frame and then transmitted. Here, $n_f$ is the index of a radio frame, and i can be a fixed value or can be signaled by a base station. However, the transmission cycle of a CRS for each antenna port must maintain 40 ms.

In the case in which the transmission cycle of a CRS is 20 ms, a sub-frame to which the CRS can be allocated can be determined on the basis of Table 6. The CRS is allocated to one sub-frame for every two radio frames and then transmitted. More particularly, the CRS can be allocated to any one of all the sub-frames except a backhaul link sub-frame within an $n_f \bmod 2 = i$ (i∈{0,1}) radio frame and then transmitted. Here, $n_f$ is the index of a radio frame, and i can be a fixed value or can be signaled by a base station. However, the transmission cycle of a CRS for each antenna port must maintain 20 ms.

In the case in which the transmission cycle of a CRS is 10 ms, a sub-frame to which the CRS can be allocated can be determined on the basis of Table 6. The CRS can be allocated to one sub-frame for every radio frame and then transmitted. However, the transmission cycle of a CRS for each antenna port must maintain 10 ms.

In the case in which the transmission cycle of a CRS is 8 ms, a sub-frame to which the CRS can be allocated can be determined on the basis of Table 6. The CRS can be allocated to any one of all the sub-frames except a backhaul link sub-frame within a radio frame and then transmitted. Here, the CRS needs to be properly positioned in order to maintain the transmission cycle 8 ms for each antenna port.

In the case in which the transmission cycle of a CRS is 5 ms, a sub-frame to which the CRS can be allocated can be determined on the basis of Table 7.

TABLE 7

| | N | | |
|---|---|---|---|
| | 1 | 2 | 3 |
| Sub-frame index for backhaul link in radio frame | (1, 6) | (2, 7) | (3, 8) |

TABLE 7-continued

| | N | | |
|---|---|---|---|
| | 1 | 2 | 3 |
| Sub-frame index for CRS allocation in radio frame | (0, 5) (2, 7) (3, 8) (4, 9) | (0, 5) (1, 6) (3, 8) (4, 9) | (0, 5) (1, 6) (2, 7) (4, 9) |

In the case in which a backhaul link sub-frame is first and sixth sub-frames (N=1), the CRS can be transmitted in any one of $(0,5)^{th}$, $(2,7)^{th}$, $(3,8)^{th}$, and $(4,9)^{th}$ sub-frame pairs. In the case in which a backhaul link sub-frame is two and seventh sub-frames (N=2), the CRS can be transmitted in any one of $(0,5)^{th}$, $(1,6)^{th}$, $(3,8)^{th}$, and $(4,9)^{th}$ sub-frame pairs. In the case in which a backhaul link sub-frame is third and eighth subframes (N=3), the CRS can be transmitted in any one of $(0,5)^{th}$, $(1,6)^{th}$, $(2,7)^{th}$, and $(4,9)^{th}$ sub-frame pairs. Here, in the case in which the CRS is transmitted in the zeroth or fifth sub-frame, the CRS needs to be allocated so that a sub-frame including a signal, such as a PBCH and an SCH, and a sub-frame not including the signal have commonality for an OFDM symbol index or a frequency position.

In the case in which the transmission cycle of a CRS is 2 ms, a sub-frame to which the CRS can be allocated can be determined on the basis of Table 8.

TABLE 8

| | N | | |
|---|---|---|---|
| | 1 | 2 | 3 |
| Sub-frame index for backhaul link in radio frame | (1, 6) | (2, 7) | (3, 8) |
| Sub-frame index for CRS allocation in radio frame | (0, 2, 4, 6, 8) | (1, 3, 5, 7, 9) | (0, 2, 4, 6, 8) |

In the case in which a backhaul link sub-frame is a $(1,6)^{th}$ sub-frame (N=1) or a $(3,8)^{th}$ sub-frame (N=3), the CRS can be allocated to any one of zeroth, second, fourth, sixth, and eighth sub-frames and then transmitted. In the case in which a backhaul link sub-frame is a $(2,7)^{th}$ sub-frame (N=2), the CRS can be allocated to any one of first, third, fifth, seventh, and ninth sub-frames and then transmitted. Here, in the case in which the CRS is transmitted in the zeroth or fifth sub-frame, the CRS needs to be allocated so that a sub-frame including a signal, such as a PBCH and an SCH, and a sub-frame not including the signal have commonality for an OFDM symbol index or a frequency position.

The number of sub-frames for backhaul link transmission within one radio frame can be 4. Since a sub-frame allocated as a backhaul link sub-frame within the radio frame can be two selected from among the $(1,6)^{th}$, $(2,7)^{th}$, and $(3,8)^{th}$ sub-frame pairs.

In the case in which the transmission cycle of a CRS is 40 ms, a sub-frame to which the CRS can be allocated can be determined on the basis of Table 9.

TABLE 9

| | N | | |
|---|---|---|---|
| | 1 | 2 | 3 |
| Sub-frame index for backhaul link in radio frame | (1, 6) and (2, 7) | (1, 6) and (3, 8) | (2, 7) and (3, 8) |

TABLE 9-continued

| | N | | |
|---|---|---|---|
| | 1 | 2 | 3 |
| Sub-frame index for CRS allocation in radio frame | one from among {0, 3, 4, 5, 8, 9} | one from among {0, 2, 4, 5, 7, 9} | one from among {0, 1, 4, 5, 6, 9} |

In the case in which a backhaul link sub-frame is $(1,6)^{th}$ and $(2,7)^{th}$ sub-frames, the CRS can be allocated to any one of zeroth, third, fourth, fifth, eighth, and ninth sub-frame and then transmitted. In the case in which a backhaul link sub-frame is $(1,6)^{th}$ and $(3,8)^{th}$ sub-frames, the CRS can be allocated to any one of zeroth, second, fourth, fifth, seventh, and ninth sub-frame and then transmitted. In the case in which a backhaul link sub-frame is $(2,7)^{th}$ and $(3,8)^{th}$ sub-frames, the CRS can be allocated to any one of zeroth, first, fourth, fifth, sixth, and ninth sub-frames and then transmitted. The CRS can be allocated to one sub-frame for every four radio frames and then transmitted. More particularly, the CRS can be allocated to any one of all the subframes except a backhaul link sub-frame within an $n_f \bmod 4=i$ (i∈{0,1,2,3}) radio frame and then transmitted. Here, $n_f$ is the index of a radio frame, and i can be a fixed value or can be signaled by a base station. However, the transmission cycle of a CRS for each antenna port must maintain 40 ms.

In the case in which the transmission cycle of a CRS is 20 ms, a sub-frame to which the CRS can be allocated can be determined on the basis of Table 9. The CRS can be allocated to one sub-frame for every two radio frames and then transmitted. More particularly, the CRS can be allocated to any one of all the sub-frames except a backhaul link sub-frame within an $n_f \bmod 2=i$ (i∈{0,1}) radio frame and then transmitted. Here, $n_f$ is the index of a radio frame, and i can be a fixed value or can be signaled by a base station. However, the transmission cycle of a CRS for each antenna port must maintain 20 ms.

In the case in which the transmission cycle of a CRS is 10 ms, a sub-frame to which the CRS can be allocated can be determined on the basis of Table 6. The CRS can be allocated to one sub-frame for every radio frame and then transmitted. However, the transmission cycle of a CRS for each antenna port must maintain 10 ms.

In the case in which the transmission cycle of a CRS is 8 ms, a sub-frame to which the CRS can be allocated can be determined on the basis of Table 6. The CRS can be allocated to any one of all the sub-frames except a backhaul link sub-frame within a radio frame and then transmitted. Here, the CRS needs to be properly positioned in order to maintain the transmission cycle 8 ms for each antenna port.

In the case in which the transmission cycle of a CRS is 5 ms, a sub-frame to which the CRS can be allocated can be determined on the basis of Table 10.

TABLE 10

| | N | | |
|---|---|---|---|
| | 1 | 2 | 3 |
| Sub-frame index for backhaul link in radio frame | (1, 6) and (2, 7) | (1, 6) and (3, 8) | (2, 7) and (3, 8) |
| Sub-frame index for CRS allocation in radio frame | (0, 5) (3, 8) (4, 9) | (0, 5) (2, 7) (4, 9) | (0, 5) (1, 6) (4, 9) |

In the case in which a backhaul link sub-frame is $(1,6)^{th}$ and $(2,7)^{th}$ sub-frames (N=1), the CRS can be transmitted in any one of $(0,5)^{th}$, $(3,8)^{th}$, and $(4,9)^{th}$ sub-frame pairs. In the case in which a backhaul link sub-frame is $(1,3)^{th}$ and $(6,8)^{th}$ sub-frames (N=2), the CRS can be transmitted in any one of $(0,5)^{th}$, $(2,7)^{th}$, and $(4,9)^{th}$ sub-frame pairs. In the case in which a backhaul link sub-frame is $(2,7)^{th}$ and $(3,8)^{th}$ sub-frames (N=3), the CRS can be transmitted in any one of $(0,5)^{th}$, $(1,6)^{th}$, and $(4,9)^{th}$ sub-frame pairs. Here, in the case in which the CRS is transmitted in the zeroth or fifth sub-frame, the CRS needs to be allocated so that a sub-frame including a signal, such as a PBCH and an SCH, and a sub-frame not including the signal have commonality for an OFDM symbol index or a frequency position.

In the case in which the transmission cycle of a CRS is 2 ms, a sub-frame to which the CRS can be allocated can be determined on the basis of Table 11.

TABLE 11

| | N | | |
|---|---|---|---|
| | 1 | 2 | 3 |
| Sub-frame index for backhaul link in radio frame | (1, 6) and (2, 7) | (1, 6) and (3, 8) | (2, 7) and (3, 8) |
| Sub-frame index for CRS allocation in radio frame | (0, 2, 4, 6, 8) | (1, 3, 5, 7, 9) | (0, 2, 4, 6, 8) |

In the case in which a backhaul link sub-frame is $(1,6)^{th}$ and $(2,7)^{th}$ sub-frames (N=1) or $(2,7)^{th}$ and $(3,8)^{th}$ sub-frames (N=3), the CRS can be allocated to any one of zeroth, second, fourth, sixth, and eighth sub-frames and then transmitted. In the case in which a backhaul link sub-frame is $(1,6)^{th}$ and $(3,8)^{th}$ sub-frames (N=2), the CRS can be allocated to any one of first, third, fifth, seventh, and ninth sub-frames and then transmitted. Here, in the case in which the CRS is transmitted in the zeroth or fifth sub-frame, the CRS needs to be allocated so that a sub-frame including a signal, such as a PBCH and an SCH, and a sub-frame not including the signal have commonality for an OFDM symbol index or a frequency position.

Figure 10:
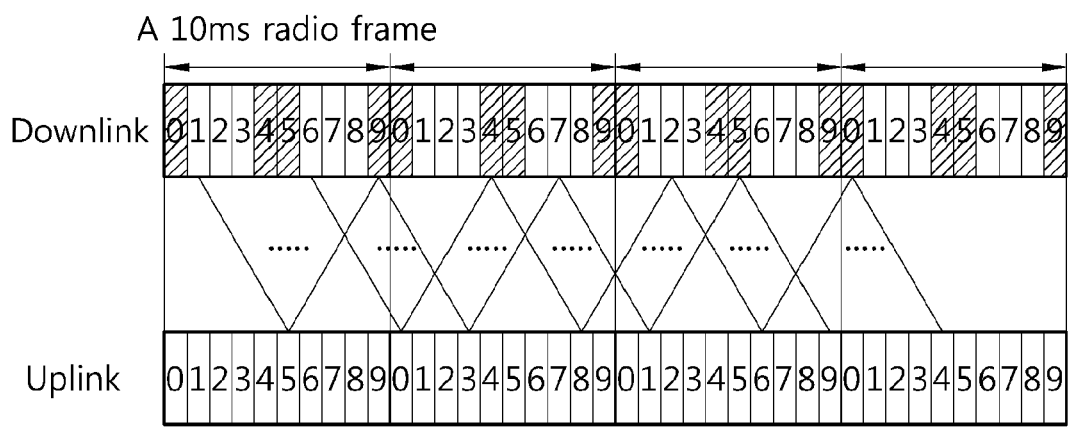
FIG. 10 is a diagram illustrating an example of the structure of backhaul link sub-frame having the HARQ cycle of 8 ms.

FIG. 10 is a diagram illustrating an example of the structure of backhaul link sub-frame having the HARQ cycle of 8 ms. The zeroth, fourth, fifth, and ninth sub-frames of each radio frame are used as the downlink sub-frames of a base station. The base station can perform backhaul link transmission in the first sub-frame and receive an ACK/NACK signal for the backhaul link transmission in the fifth sub-frame, on the basis of the HARQ execution cycle of 8 ms. Further, the base station can perform backhaul link transmission in the ninth sub-frame and receive an ACK/NACK signal for the backhaul link transmission in the third sub-frame of the next frame, on the basis of the HARQ execution cycle of 8 ms. In some embodiments, in the case in which an HARQ is performed using an even-numbered sub-frame, the base station can perform backhaul link transmission in the sixth sub-frame and receive an ACK/NACK signal for the backhaul link transmission in the zeroth sub-frame of the next frame, on the basis of the HARQ execution cycle of 8 ms. Next, the base station can perform backhaul link transmission in the fourth sub-frame and receive an ACK/NACK signal for the backhaul link transmission in the eighth sub-frame, on the basis of the HARQ execution cycle of 8 ms. Since the cycle of an HARQ is 8 ms, the HARQ process can be repeated for every four radio frames.

Only an odd-numbered sub-frame or an even-numbered sub-frame can be used as a backhaul link sub-frame.

In the case in which the transmission cycle of a CRS is 40 ms, a sub-frame to which the CRS can be allocated can be determined on the basis of Table 12.

TABLE 12

| | N | |
|---|---|---|
| | ODD | EVEN |
| Sub-frame index for backhaul link in radio frame: F(N) | (1, 9, 7, 5, 3) | (2, 0, 8, 6, 4) |
| Sub-frame index for CRS allocation in radio frame | one from among {0, 2, 4, 6, 8} | one from among {1, 3, 5, 7, 9} |

In the case in which a backhaul link sub-frame is allocated in order of first, ninth, seventh, fifth, and third sub-frames, the CRS can be allocated to any one of zeroth, second, fourth, sixth, and eighth sub-frames and then transmitted. In the case in which a backhaul link sub-frame is allocated in order of second, zeroth, eighth, sixth, and fourth sub-frames, the CRS can be allocated to any one of first, third, fifth, seventh, and ninth sub-frames and then transmitted. The CRS can be allocated to one sub-frame for every four radio frames and then transmitted. More particularly, the CRS can be allocated to any one of all the sub-frames except a backhaul link sub-frame within an $n_f$ mod $4=i$ ($i \in \{0,1,2,3\}$) radio frame and then transmitted. Here, $n_f$ is the index of a radio frame, and i can be a fixed value or can be signaled by a base station. However, the transmission cycle of a CRS for each antenna port must maintain 40 ms.

In the case in which the transmission cycle of a CRS is 20 ms, a sub-frame to which the CRS can be allocated can be determined on the basis of Table 12. The CRS can be allocated to one sub-frame for every two radio frames and then transmitted. More particularly, the CRS can be allocated to any one of all the sub-frames except a backhaul link sub-frame within an $n_f$ mod $2=i$ ($i \in \{0,1\}$) radio frame and then transmitted. Here, $n_f$ is the index of a radio frame, and i can be a fixed value or can be signaled by a base station. However, the transmission cycle of a CRS for each antenna port must maintain 20 ms.

In the case in which the transmission cycle of a CRS is 10 ms, a sub-frame to which the CRS can be allocated can be determined on the basis of Table 12. The CRS can be allocated to one sub-frame for every radio frame and then transmitted. However, the transmission cycle of a CRS for each antenna port must maintain 10 ms.

In the case in which the transmission cycle of a CRS is 8 ms, a sub-frame to which the CRS can be allocated can be determined on the basis of Table 12. The CRS can be allocated to any one of all the sub-frames except a backhaul link sub-frame within a radio frame and then transmitted. Here, the CRS needs to be properly positioned in order to maintain the transmission cycle 8 ms for each antenna port.

In the case in which the transmission cycle of a CRS is 5 ms, a sub-frame to which the CRS can be allocated can be determined on the basis of Table 13.

TABLE 13

| | N | |
|---|---|---|
| | ODD | EVEN |
| Sub-frame index for backhaul link in radio frame: F(N) | (1, 9, 7, 5, 3) | (2, 0, 8, 6, 4) |
| Sub-frame index for CRS allocation in radio frame | (0, 5) (1, 6) (2, 7) (3, 8) (4, 9) | (0, 5) (1, 6) (2, 7) (3, 8) (4, 9) |

The CRS can be allocated to any one of $(0,5)^{th}$, $(1,6)^{th}$, $(2,7)^{th}$, $(3,8)^{th}$, and $(4,9)^{th}$ sub-frame pairs and then transmitted, irrespective of whether a backhaul link sub-frame is allocated to an odd-numbered or even-numbered sub-frame. Here, in the case in which the CRS is transmitted in the zeroth or fifth sub-frame, the CRS needs to be allocated so that a sub-frame including a signal, such as a PBCH and an SCH, and a sub-frame not including the signal have commonality for an OFDM symbol index or a frequency position.

In the case in which the transmission cycle of a CRS is 2 ms, a sub-frame to which the CRS can be allocated can be determined on the basis of Table 14.

TABLE 14

| | N | |
|---|---|---|
| | ODD | EVEN |
| Sub-frame index for backhaul link in radio frame: F(N) | (1, 9, 7, 5, 3) | (2, 0, 8, 6, 4) |
| Sub-frame index for CRS allocation in radio frame | (0, 2, 4, 6, 8) | (1, 3, 5, 7, 9) |

In the case in which a backhaul link sub-frame is allocated to an odd-numbered sub-frame, the CRS can be allocated to zeroth, second, fourth, sixth, and eighth sub-frames and then transmitted. In the case in which a backhaul link sub-frame is allocated to an even-numbered sub-frame, the CRS can be allocated to first, third, fifth, seventh, and ninth sub-frames and then transmitted. Here, in the case in which the CRS is transmitted in the zeroth or fifth sub-frame, the CRS needs to be allocated so that a sub-frame including a signal, such as a PBCH and an SCH, and a sub-frame not including the signal have commonality for an OFDM symbol index or a frequency position.

Both the odd-numbered sub-frame and the even-numbered sub-frame can be used as a backhaul link sub-frame.

In the case in which the transmission cycle of a CRS is 40 ms, a sub-frame to which the CRS can be allocated can be determined on the basis of Table 15.

TABLE 15

| | N | | |
|---|---|---|---|
| | 1 | 2 | 3 |
| Sub-frame index for backhaul link in radio frame | $1^{st}$ backhaul link: {1, 9, 7, 5, 3} and $2^{nd}$ backhaul link: {6, 4, 2, 0, 8}) | $1^{st}$ backhaul link: {2, 0, 8, 6, 4} and $2^{nd}$ backhaul link: {7, 5, 3, 1, 9} | $1^{st}$ backhaul link: {3, 1, 9, 7, 5} and $2^{nd}$ backhaul link: {8, 6, 4, 2, 0} |
| Sub-frame index for CRS allocation in radio frame | one from among {0~9} | one from among {0~9} | one from among {0~9} |

The CRS can be allocated to any one of zeroth to ninth sub-frames and then transmitted. The CRS can be allocated to one sub-frame for every four radio frames and then transmitted. More particularly, the CRS can be allocated to any one of all the sub-frames except a backhaul link sub-frame within an $n_f$ mod 4=i (i∈{0,1,2,3}) radio frame and then transmitted. Here, $n_f$ is the index of a radio frame, and i can be a fixed value or can be signaled by a base station. However, the transmission cycle of a CRS for each antenna port must maintain 40 ms. Further, in the case in which a sub-frame to which the CRS is allocated overlaps with a backhaul link sub-frame, the corresponding sub-frame can be used as the backhaul link sub-frame.

In the case in which the transmission cycle of a CRS is 20 ms, a sub-frame to which the CRS can be allocated can be determined on the basis of Table 15. The CRS can be allocated to one sub-frame for every two radio frames and then transmitted. More particularly, the CRS can be allocated to any one of all the sub-frames except a backhaul link sub-frame within an $n_f$ mod 2=i (i∈{0,1}) radio frame and then transmitted. Here, $n_f$ is the index of a radio frame, and i can be a fixed value or can be signaled by a base station. However, the transmission cycle of a CRS for each antenna port must maintain 20 ms. Further, in the case in which a sub-frame to which the CRS is allocated overlaps with a backhaul link sub-frame, the corresponding sub-frame can be used as the backhaul link sub-frame.

In the case in which the transmission cycle of a CRS is 10 ms, a sub-frame to which the CRS can be allocated can be determined on the basis of Table 15. The CRS can be allocated to one sub-frame for every radio frame and then transmitted. However, the transmission cycle of a CRS for each antenna port must maintain 10 ms. Further, in the case in which a sub-frame to which the CRS is allocated overlaps with a backhaul link sub-frame, the corresponding sub-frame can be used as the backhaul link sub-frame.

In the case in which the transmission cycle of a CRS is 8 ms, a sub-frame to which the CRS can be allocated can be determined on the basis of Table 15. The CRS can be allocated to any one of all the sub-frames except a backhaul link sub-frame within a radio frame and then transmitted. Here, the CRS needs to be properly positioned in order to maintain the transmission cycle 8 ms for each antenna port. Further, in the case in which a sub-frame to which the CRS is allocated overlaps with a backhaul link sub-frame, the corresponding sub-frame can be used as the backhaul link sub-frame.

In the case in which the transmission cycle of a CRS is 5 ms, a sub-frame to which the CRS can be allocated can be determined on the basis of Table 16.

TABLE 16

| | N | | |
|---|---|---|---|
| | 1 | 2 | 3 |
| Sub-frame index for backhaul link in radio frame | $1^{st}$ backhaul link: {1, 9, 7, 5, 3} and $2^{nd}$ backhaul link: {6, 4, 2, 0, 8}) | $1^{st}$ backhaul link: {2, 0, 8, 6, 4} and $2^{nd}$ backhaul link: {7, 5, 3, 1, 9}) | $1^{st}$ backhaul link: {3, 1, 9, 7, 5} and $2^{nd}$ backhaul link: {8, 6, 4, 2, 0} |
| Sub-frame index for CRS allocation in radio frame | (0, 5) (1, 6) (2, 7) (3, 8) (4, 9) | (0, 5) (1, 6) (2, 7) (3, 8) (4, 9) | (0, 5) (1, 6) (2, 7) (3, 8) (4, 9) |

The CRS can be allocated to any one of $(0,5)^{th}$, $(1,6)^{th}$, $(2,7)^{th}$, $(3,8)^{th}$, and $(4,9)^{th}$ sub-frame pairs and then transmitted. Here, in the case in which the CRS is transmitted in the zeroth or fifth sub-frame, the CRS needs to be allocated so that a sub-frame including a signal, such as a PBCH and an SCH, and a sub-frame not including the signal have commonality for an OFDM symbol index or a frequency position. Further, in the case in which a sub-frame to which the CRS is allocated overlaps with a backhaul link sub-frame, the corresponding sub-frame can be used as the backhaul link sub-frame.

In the case in which the transmission cycle of a CRS is 2 ms, a sub-frame to which the CRS can be allocated can be determined on the basis of Table 17.

TABLE 17

| | N | | |
|---|---|---|---|
| | 1 | 2 | 3 |
| Sub-frame index for backhaul link in radio frame | $1^{st}$ backhaul link: {1, 9, 7, 5, 3} and $2^{nd}$ backhaul link: {6, 4, 2, 0, 8}) | $1^{st}$ backhaul link: {2, 0, 8, 6, 4} and $2^{nd}$ backhaul link: {7, 5, 3, 1, 9}) | $1^{st}$ backhaul link: {3, 1, 9, 7, 5} and $2^{nd}$ backhaul link: {8, 6, 4, 2, 0} |
| Sub-frame index for CRS allocation in radio frame | (0, 2, 4, 6, 8) or (1, 3, 5, 7, 9) | | |

The CRS can be allocated to sub-frames of any one of a set of zeroth, second, fourth, sixth, and eighth sub-frames and first, third, fifth, seventh, and ninth sub-frames and then transmitted. Here, in the case in which the CRS is transmitted in the zeroth or fifth sub-frame, the CRS needs to be allocated so that a sub-frame including a signal, such as a PBCH and an SCH, and a sub-frame not including the signal have commonality for an OFDM symbol index or a frequency position. Further, in the case in which a sub-frame to which the CRS is allocated overlaps with a backhaul link sub-frame, the corresponding sub-frame can be used as the backhaul link sub-frame. A sub-frame can overlap with a backhaul link sub-frame once in three ones of four radio frames and twice in one of the radio frames. If a sub-frame to which the CRS is allocated overlaps with a backhaul link sub-frame, to omit the transmission of the CRS is efficient in performing backhaul link transmission and an HARQ.

Although, in the above CRS transmission, the execution of an HARQ in the backhaul link has been taken into consideration, the CRS may be transmitted irrespective of the HARQ performing procedure. In this case, at least one OFDM symbol within the backhaul link sub-frame may be used to transmit the CRS. Further, the transmission of the CRS can be dropped if the backhaul link sub-frame and the sub-frame in which the CRS is transmitted are overlapped. As a different method, the resource for the transmission of the CRS (e.g., OFDM symbols or Resource Elements) in the sub-frame in which the backhaul link is allocated can be puncturing or use rate matching if the backhaul link sub-frame and the sub-frame in which the CRS is transmitted are overlapped.

Further, in the case in which the backhaul link sub-frame is a zeroth or fifth sub-frame, a position on the resource region in which the CRS is transmitted needs to be designed so that it does not overlap with a control channel, such as a PBCH, an SCH, or a PDCCH. In the case in which the resource region in which the CRS is transmitted does not collide with the backhaul link sub-frame through the multiplexing of methods such as FDM, CDM, and CDM, CRS transmission and backhaul link transmission can be performed at the same time. For example, if one OFDM symbol is used as a transition gap in the backhaul link sub-frame, backhaul link transmission and CRS transmission in the second OFDM symbol at the end of the backhaul link sub-frame can be multiplexed using methods, such as a TDM or an FDM, and then performed.

The CRS may be allocated within the backhaul link sub-frame. In the case in which the CRS is allocated only within the backhaul link sub-frame, the transmission cycle of a CRS can be any one of 10 ms, 8 ms, and 5 ms, such as the HARQ performing cycle of the backhaul link sub-frame. If the number of backhaul links within one radio frame is more than 2, the transmission cycle of a CRS can be shorter.

Further, the CRS can be allocated to only a set of zeroth, fourth, fifth, and ninth subframes which are not used as a backhaul link sub-frame, but used only as a unicast sub-frame. At least one sub-frame of the set of sub-frames can be used to transmit the CRS, and information about the sub-frame in which the CRS is transmitted can be transmitted by signaling using a higher layer implicitly or explicitly.

In the case in which an MBSFN sub-frame exists within a radio frame, the MBSFN sub-frame and a sub-frame used to transmit the CRS may not be transmitted at the same time. In this case, the CRS transmission can be puctured in the sub-frame. In the case in which the MBSFN sub-frame overlaps with the sub-frame for CRS transmission, the CRS can be multiplexed with PMCH or PDSCH within the MBSFN sub-frame through a TDM method at OFDM symbol level and then transmitted. Herein, the MBSFN sub-frame can be a sub-frame used for LTE-A or an MBSFN sub-frame for LTE Rel-9 User Equipments (UE). Or, the MBSFN sub-frame can be a sub-frame allocated to an MBSFN sub-frame for LTE Rel-8 UE. For example, the CRS can be allocated to a PDCCH region within the MBSFN sub-frame. More particularly, a symbol for CRS transmission can be any one of first and last OFDM symbols in the PDCCH region of the MBSFN sub-frame or can be both the first and last OFDM symbols. In some embodiments, the CRS can be allocated to a PDSCH or Physical Multicast Channel (PMCH) region within the MBSFN sub-frame. The CRS can be allocated to all the OFDM symbols or a specific OFDM symbol of the PDSCH or the PMCH. The CRS and the MBSFN data can be multiplexed together using a TDM or FDM method.

In the above proposed method of transmitting a reference signal, the case in which the CRS is multiplexed with backhaul link transmission has been described as an example. However, the present invention is not limited to the above example, but can be applied to an LTE Rel-9 sub-frame or an LTE-A sub-frame. The LTE-A sub-frame can be defined for the transmission of a Cooperative Multi-Point (CoMP), a high-order MIMO, or a relay. Further, the LTE Rel-9 sub-frame can be used as a sub-frame for measuring a position in the LTE system. The sub-frame for measuring a position in the LTE system can be based on a common sub-frame or an MBSFN sub-frame in which PDSCH transmission is not performed. In the case of the common sub-frame for measuring a position, CRS transmission can be puctured in the common sub-frame for measuring the position. In some embodiments, since the first three OFDM symbols of sub-frames are allocated to a PDCCH, irrespective of the types of the sub-frames (e.g., a normal sub-frame, an MBSFN sub-frame, a positioning sub-frame, or an LTE-A sub-frame), the CRS can be transmitted through the PDCCH.

In the case in which, in one radio frame, one or more sub-frames are used to transmit CRSs for eight transmit antennas, the CRSs for the respective antenna ports can be transmitted through different OFDM symbols.

Figure 11:
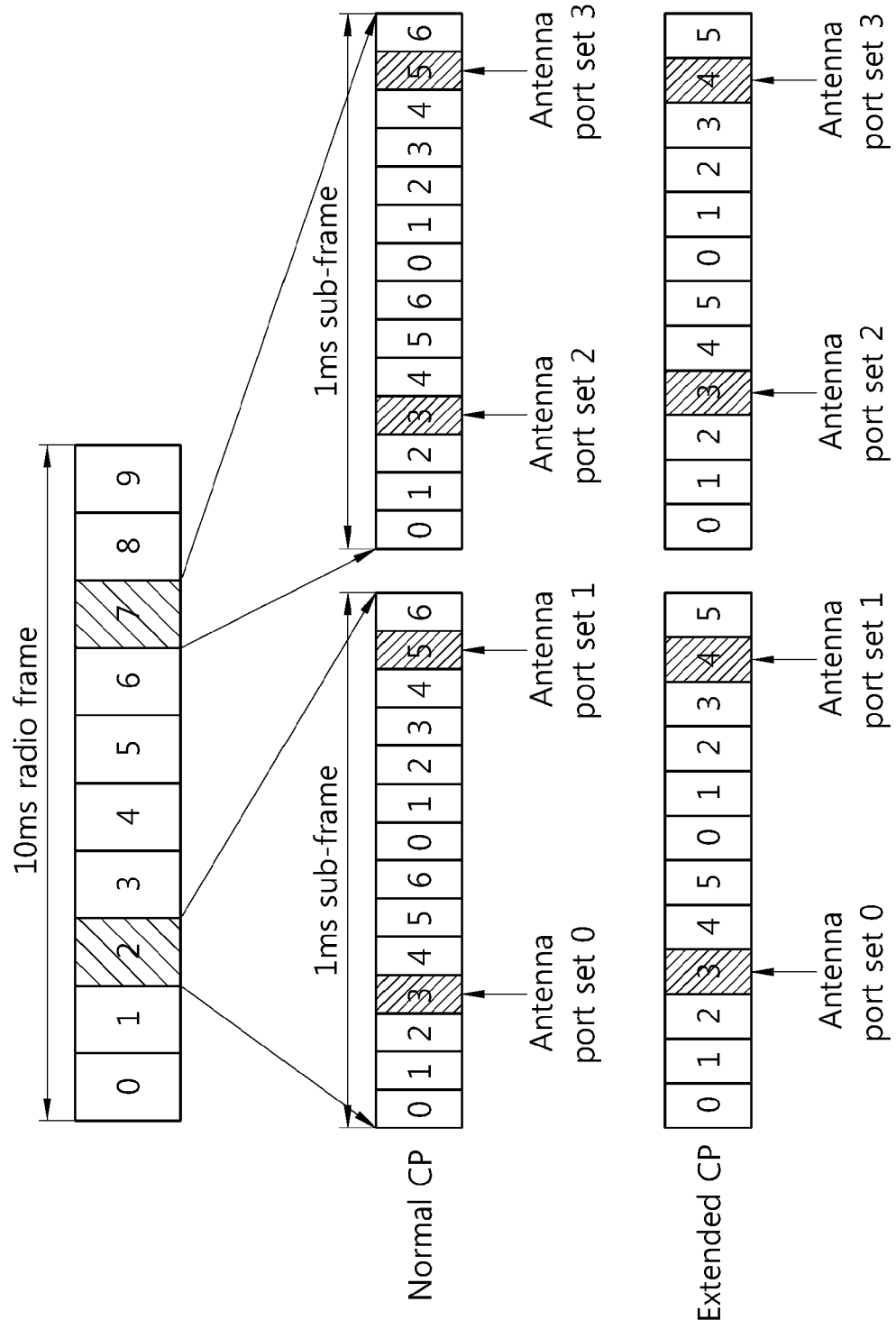
FIG. 11 is a diagram illustrating an example in which CRSs for a plurality of antennas are allocated to sub-frames.

FIG. 11 is a diagram illustrating an example in which CRSs for a plurality of antennas are allocated to sub-frames. The transmission cycle of a CRS is 5 ms, and the number of sub-frames allocated for CRS transmission within one radio frame is 2. Second and seventh sub-frames are used to transmit the CRS in each radio frame. In the case of a normal Cyclic Prefix (CP), a CRS for a first antenna port set (Antenna port set 0) is mapped to the third OFDM symbol of a first slot in a second sub-frame. A CRS for a second antenna port set (Antenna port set 1) is mapped to the fifth OFDM symbol of a second slot in the second sub-frame. A CRS for a third antenna port set (Antenna port set 2) is mapped to the third OFDM symbol of a first slot in a seventh sub-frame. A CRS for a fourth antenna port set (Antenna port set 3) is mapped to the fifth OFDM symbol of a second slot in the seventh sub-frame. In the case of an extended CP, a CRS for a first antenna port set (Antenna port set 0) is mapped to the third OFDM symbol of a first slot in a second sub-frame. A CRS for a second antenna port set (Antenna port set 1) is mapped to the fourth OFDM symbol of a second slot in the second sub-frame. A CRS for a third antenna port set (Antenna port set 2) is mapped to the third OFDM symbol of a first slot in a seventh sub-frame. A CRS for a fourth antenna port set (Antenna port set 3) is mapped to the fourth OFDM symbol of a second slot in the seventh sub-frame.

The structures of CRSs for the antenna ports 0 to 7 can be redefined irrespective of the structure of the legacy CRS of an LTE system. Assuming that eight antenna ports are divided into two groups, the CRSs for the antenna ports 0 to 3 can be the CRSs for the first antenna port set and the third antenna port set in FIG. 11. The CRSs for the antenna ports 4 to 7 can be the CRSs for the second antenna port set and the fourth antenna port set in FIG. 11. Further, assuming that eight antenna ports are divided into four groups and each of the groups includes two antenna ports, a CRS for each antenna port group can be the CRS for the first to fourth antenna port sets in FIG. 11.

Further, the CRSs for the antenna ports 0 to 3 can use the structure of the legacy CRS without change, and only the CRSs for the antenna ports 4 to 7 (i.e., extended antenna ports) can be defined in the LTE-A system. Assuming that the four extended antenna ports are divided into two groups, the CRSs for the antenna ports 4 and 5 can be the CRSs for the first antenna port set and the third antenna port set in FIG. 11. The CRSs for the antenna ports 6 and 7 can be the CRSs for the second antenna port set and the fourth antenna port set in FIG. 11. Further, assuming that the four extended antenna ports are divided into four groups, CRSs for the respective antennas can be the CRSs for the first to fourth antenna port sets in FIG. 11.

It has been assumed that the transmission cycle of a CRS is 5 ms and the number of sub-frames for CRS transmission within one radio frame is 2, but the present invention is not limited thereto. The transmission cycle of a CRS and the number and position of sub-frames for CRS transmission within one radio frame can be changed in various ways.

A case in which information about a position on the resource region to which a CRS is mapped is signaled is described below. This is for the purpose of reducing overhead for CRS transmission and guaranteeing backhaul link transmission.

A signal indicating a sub-frame in which a CRS is transmitted can be signaled. For example, in the case in which {1 0 0 0 0 0 0 0 0 0} is transmitted as a bit map, the CRS can be transmitted in a first sub-frame. In the case in which {1 0 0 0 0 1 0 0 0 0} is transmitted as a bit map, the CRS can be transmitted in first and sixth sub-frames.

Information about a sub-frame position type and the transmission cycle of a CRS within a radio frame can be signaled.

The transmission cycle of a CRS can be any one of fixed numbers. For example, in the case in which the transmission cycle of a CRS is any one of 20 ms, 10 ms, 5 ms, and 2 ms, the transmission cycle of a CRS can be signaled using a signal of 2 bits. In another embodiment, in the case in which the transmission cycle of a CRS is any one of 40 ms, 20 ms, 10 ms, 8 ms, 5 ms, 2 ms, and 1 ms, the transmission cycle of a CRS can be signaled using a signal of 3 bits. A fixed number of sub-frame position types can exist in accordance with the transmission cycle of each CRS. For example, four kinds of sub-frame positions (e.g., type 1 to type 4) for the CRS transmission cycle of 20 ms can be signaled using a signal of 2 bits.

In the case in which a CRS is not transmitted for every radio frame, information about a sub-frame offset and a sub-frame position type offset can be signaled. In this case, the sub-frame index or the sub-frame position type index of a next radio frame can have a special relationship with the sub-frame index or the sub-frame position type index of a current radio frame. For example, assuming that the sub-frame index or the sub-frame position type index of a current radio frame is N, the sub-frame index or the sub-frame position type index of a next radio frame can be expressed by (N+k) mod M. Here, k is an integer (where k=0, ..., M−1), and M can be a maximum possible sub-frame index or a maximum possible sub-frame position type index. In another embodiment, the sub-frame index or the sub-frame position type index can be allocated depending on a cell ID. For example, the sub-frame index or the sub-frame position type index can be allocated by an equation like as (cell ID mod M).

Hereinafter, a position on an OFDM symbol to which a CRS is mapped within a sub-frame is described below.

Figure 12:
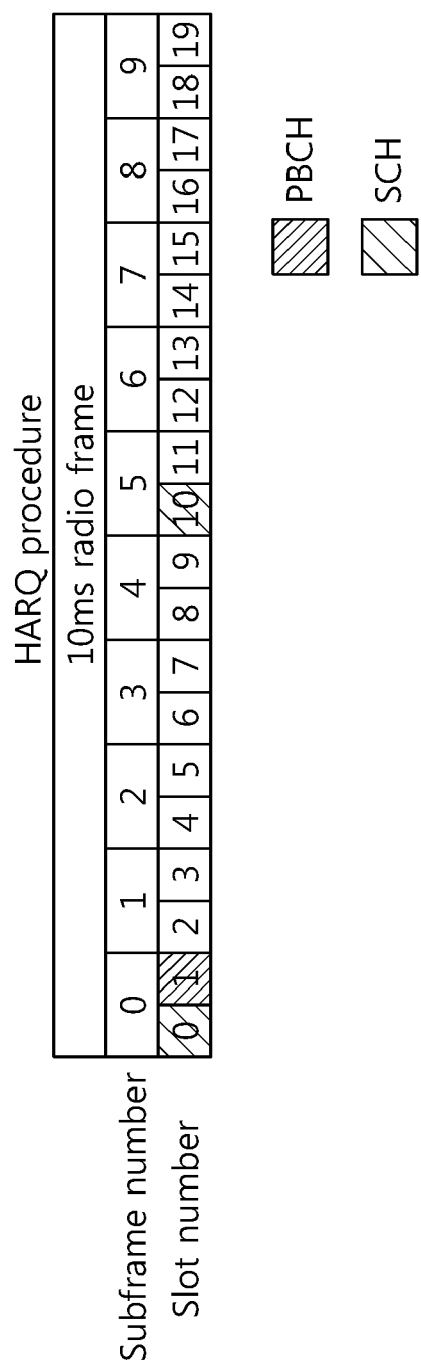
FIG. 12 is a diagram showing the positions of sub-frames in which a PBCH and an SCH are transmitted in one radio frame.

FIG. 12 is a diagram showing the positions of sub-frames in which a PBCH and an SCH are transmitted in one radio frame. The PBCH can be transmitted in the second slot (Slot No. 1) of a zeroth sub-frame. The PBCH can occupy four consecutive OFDM symbols. The SCH can be transmitted in the first slot (Slot 0) of the zeroth sub-frame and the first slot (Slot No. 10) of a fifth sub-frame. The SCH can be divided into a P-SCH and an S-SCH. The P-SCH can be transmitted in the last OFDM symbols of a Slot No. 0 and a Slot No. 10. The S-SCH can be transmitted in the ($N_{symbol}-2^{nd}$) OFDM symbols of a Slot No. 0 and a Slot No. 10. Here, $N_{symbol}$ is the number of OFDM symbols constituting one slot. In a normal CP, the number of OFDM symbols $N_{symbol}$ can be 7. In an extended CP, the number of OFDM symbols $N_{symbol}$ can be 6.

It is first assumed that a CRS is transmitted in sub-frames in which the PBCH and the SCH are transmitted within the radio frame. The sub-frame can be a zeroth sub-frame.

One OFDM symbol can be used for CRS transmission.

Figure 13:
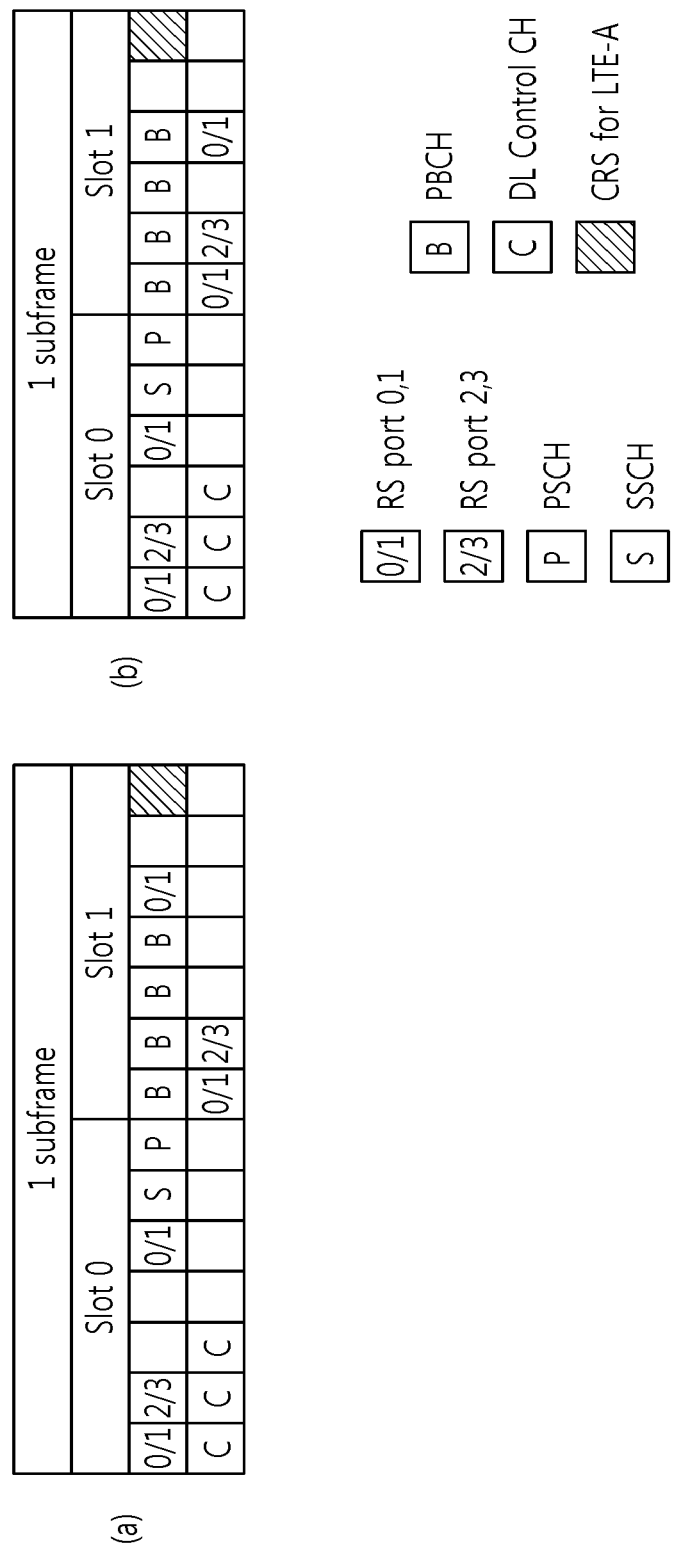
FIG. 13 is a diagram showing an example of sub-frames to which CRSs have been mapped in accordance with the proposed method of transmitting a reference signal.

FIG. 13 is a diagram showing an example of sub-frames to which CRSs have been mapped in accordance with the proposed method of transmitting a reference signal. FIG. 13(a) shows the case of a normal CP, and 13(b) shows the case of an extended CP. The CRS is mapped to the last OFDM symbol of the sub-frame.

Figure 14:
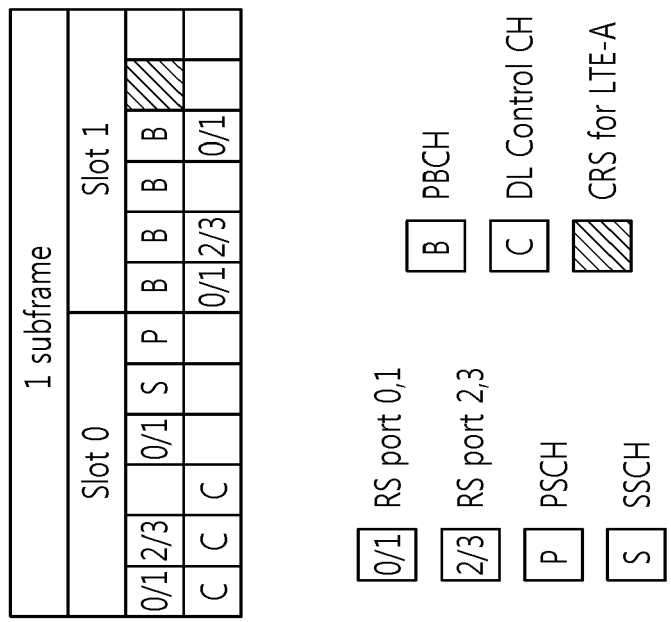
Figure 14:
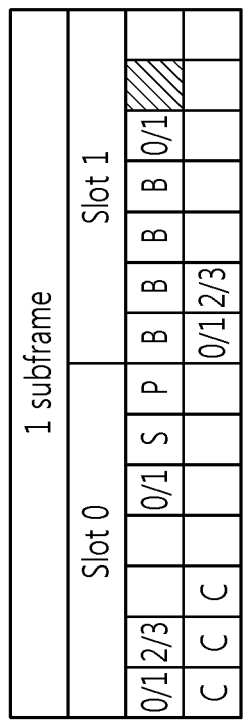

FIG. 14 is a diagram showing another example of sub-frames to which CRSs have been mapped in accordance with the proposed method of transmitting a reference signal. FIG. 14(a) shows the case of a normal CP, and 14(b) shows the case of an extended CP. The CRS is mapped to the ($2N_{symbol}-2^{nd}$) OFDM symbol of the sub-frame (i.e., the last second OFDM symbol).

Figure 15:
Figure 15:
Figure 15:
Figure 15:
Figure 15:
Figure 15:
Figure 15:

FIG. 15 is a diagram showing another example of a sub-frame to which a CRS has been mapped in accordance with the proposed method of transmitting a reference signal. The CRS is mapped to the fourth OFDM symbol of the sub-frame.

Figure 16:
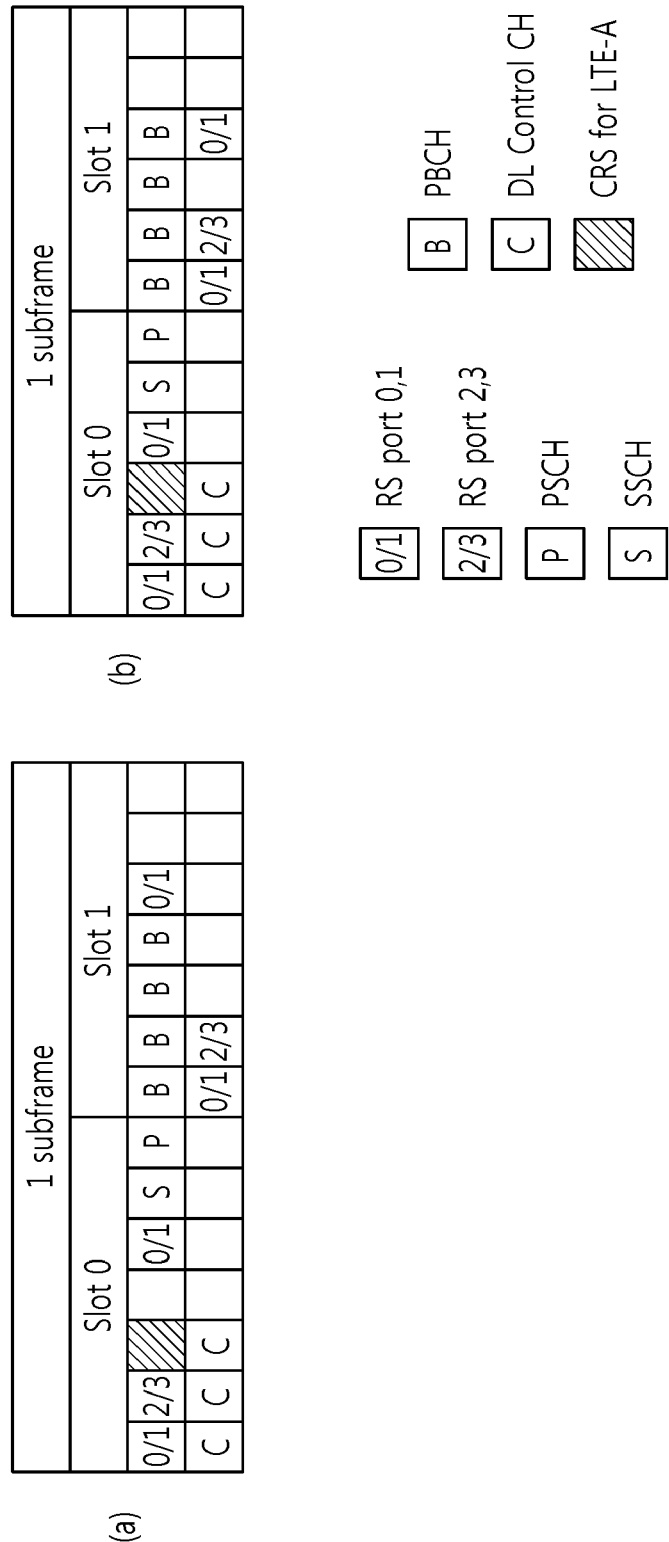

FIG. 16 is a diagram showing another example of sub-frames to which CRSs have been mapped in accordance with the proposed method of transmitting a reference signal. FIG. 16(a) shows the case of a normal CP, and FIG. 16(b) shows the case of an extended CP. The CRS is mapped to the third OFDM symbol of the sub-frame. This example can be applied to a case in which the number of OFDM symbols used as PDCCHs is two or less.

Two or more OFDM symbols can be used for CRS transmission.

Figure 17:
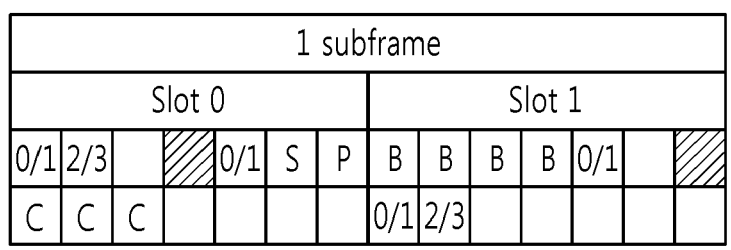
Figure 17:
Figure 17:
Figure 17:
Figure 17:
Figure 17:
Figure 17:
Figure 17:

FIG. 17 is a diagram showing another example of a sub-frame to which CRSs have been mapped in accordance with the proposed method of transmitting a reference signal. The CRSs are mapped to the fourth OFDM symbol and the last OFDM symbol of the sub-frame.

FIG. 18 is a diagram showing another example of a sub-frame to which CRSs have been mapped in accordance with the proposed method of transmitting a reference signal. The CRSs are mapped to the fourth OFDM symbol and the ($2N_{symbol}-2^{nd}$) OFDM symbol (i.e., the last second OFDM symbol) of the sub-frame.

Figure 19:
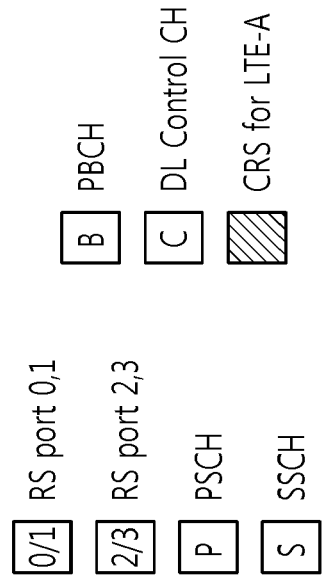

FIG. 19 is a diagram showing another example of sub-frames to which CRSs have been mapped in accordance with the proposed method of transmitting a reference signal. FIG. 19(a) shows the case of a normal CP, and FIG. 19(b) shows the case of an extended CP. The CRSs are mapped to the last two OFDM symbols of the sub-frame.

Figure 20:
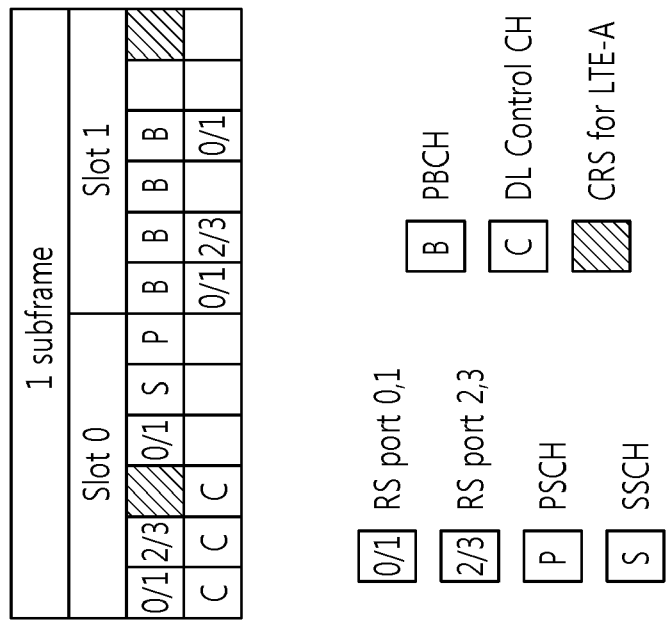
Figure 20:
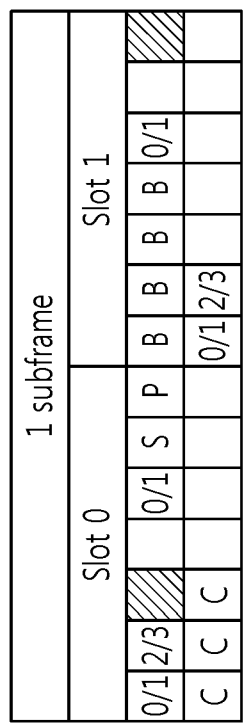

FIG. 20 is a diagram showing another example of sub-frames to which CRSs have been mapped in accordance with the proposed method of transmitting a reference signal. FIG. 20(a) shows the case of a normal CP, and FIG. 20(b) shows the case of an extended CP. The CRSs are mapped to the third OFDM symbol and the last OFDM symbol of the sub-frame. This example can be applied to a case in which the number of OFDM symbols used as PDCCHs is two or less.

Figure 21:
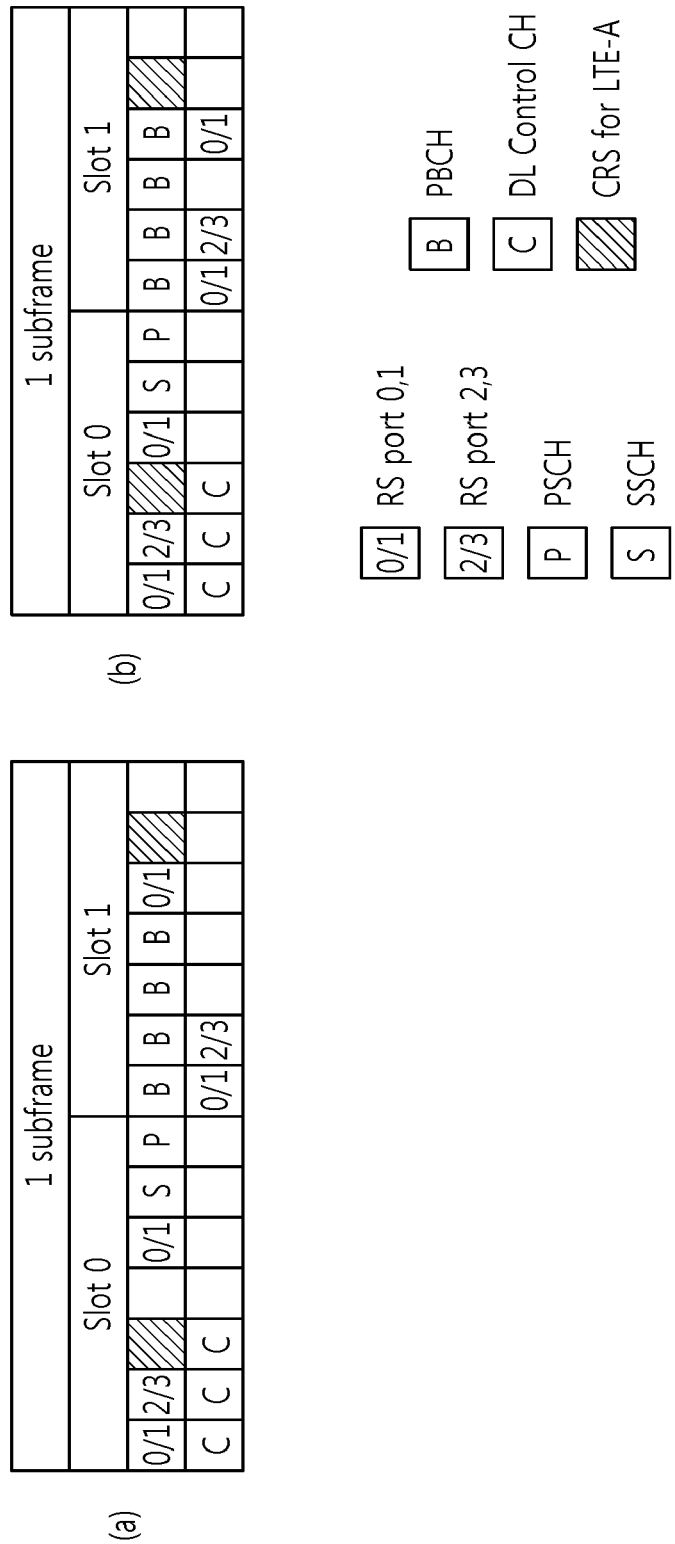

FIG. 21 is a diagram showing another example of sub-frames to which CRSs have been mapped in accordance with the proposed method of transmitting a reference signal. FIG. 21(a) shows the case of a normal CP, and FIG. 21(b) shows the case of an extended CP. The CRSs are mapped to the third OFDM symbol and the ($2N_{symbol}-2^{nd}$) OFDM symbol (i.e., the last second OFDM symbol) of the sub-frame. This example can be applied to a case in which the number of OFDM symbols used as PDCCHs is two or less.

Figure 22:
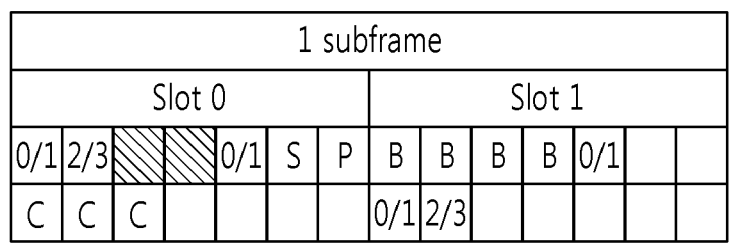
Figure 22:
Figure 22:
Figure 22:
Figure 22:
Figure 22:
Figure 22:
Figure 22:

FIG. 22 is a diagram showing another example of a sub-frame to which CRSs have been mapped in accordance with the proposed method of transmitting a reference signal. The CRSs are mapped to the third and fourth OFDM symbols of the sub-frame. This example can be applied to a case in which the number of OFDM symbols used as PDCCHs is two or less.

Figure 23:
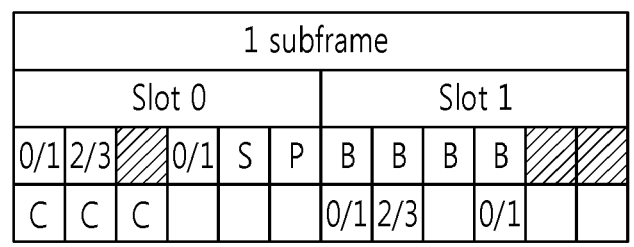

FIG. 23 is a diagram showing another example of a sub-frame to which CRSs have been mapped in accordance with the proposed method of transmitting a reference signal. The CRSs are mapped to the third OFDM symbol and the last two OFDM symbols of the sub-frame. That is, the three OFDM symbols are used for CRS transmission. This example can be applied to a case in which the number of OFDM symbols used as PDCCHs is two or less.

Figure 24:
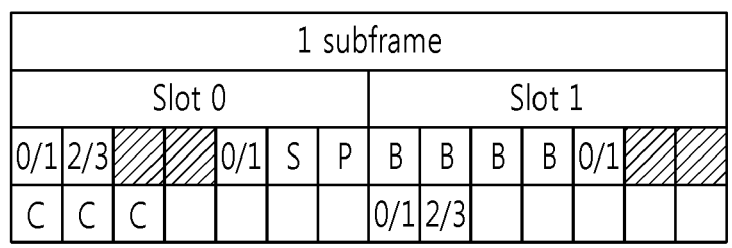

FIG. 24 is a diagram showing another example of a sub-frame to which CRSs have been mapped in accordance with the proposed method of transmitting a reference signal. The CRSs are mapped to the third and fourth OFDM symbols and the last two OFDM symbols of the sub-frame. That is, the four OFDM symbols are used for CRS transmission. This example can be applied to a case in which the number of OFDM symbols used as PDCCHs is two or less.

It can be assumed that a CRS is mapped to a sub-frame in which an SCH is transmitted within a radio frame. The above sub-frame can be a fifth sub-frame.

One OFDM symbol can be used for CRS transmission.

Figure 25:
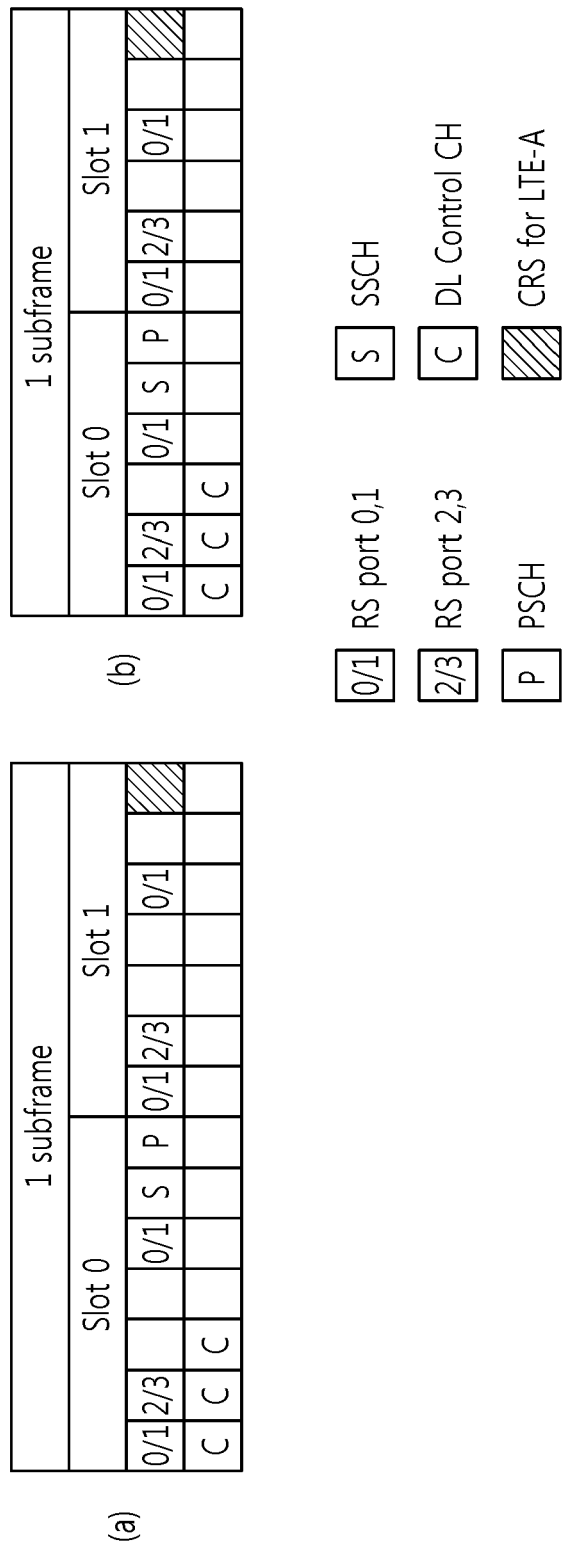

FIG. 25 is a diagram showing another example of sub-frames to which CRSs have been mapped in accordance with the proposed method of transmitting a reference signal. FIG. 25($a$) shows the case of a normal CP, and FIG. 25($b$) shows the case of an extended CP. The CRS is mapped to the last OFDM symbol of the sub-frame.

Figure 26:
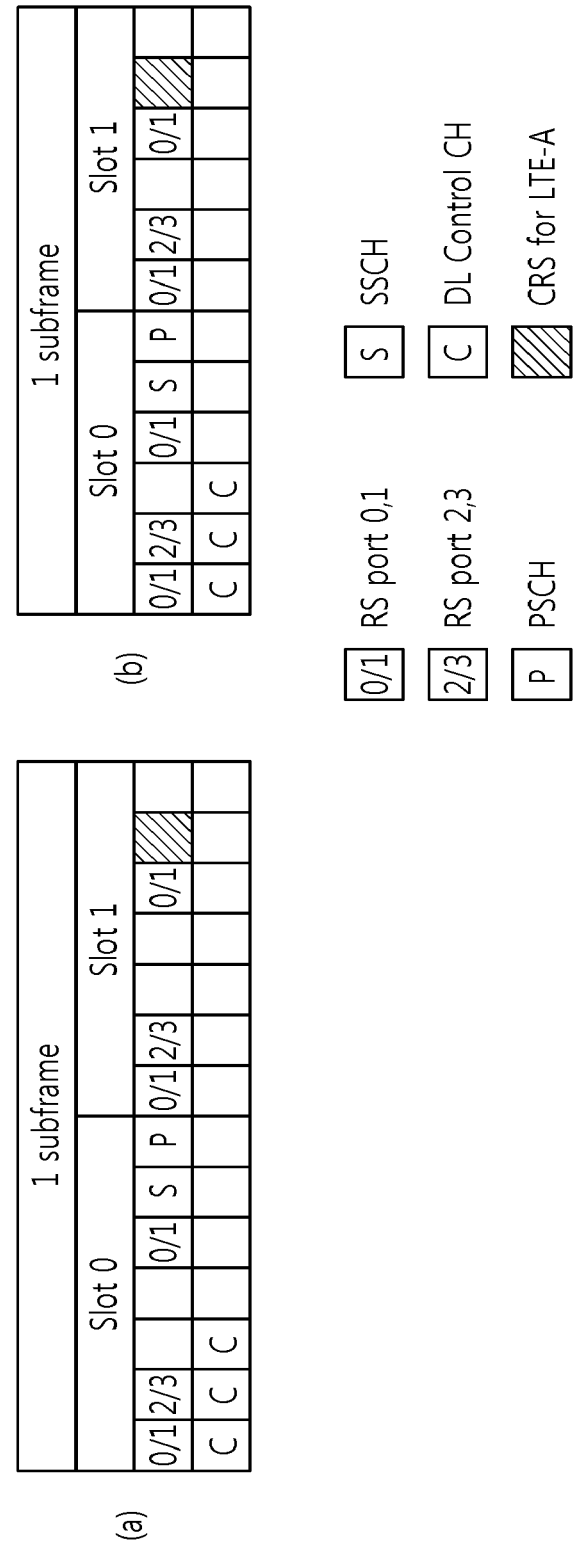

FIG. 26 is a diagram showing another example of sub-frames to which CRSs have been mapped in accordance with the proposed method of transmitting a reference signal. FIG. 26($a$) shows the case of a normal CP, and FIG. 26($b$) shows the case of an extended CP. The CRS is mapped to the $(2N_{symbol}-2^{nd})$ OFDM symbol (i.e., the last second OFDM symbol) of the sub-frame.

Figure 27:
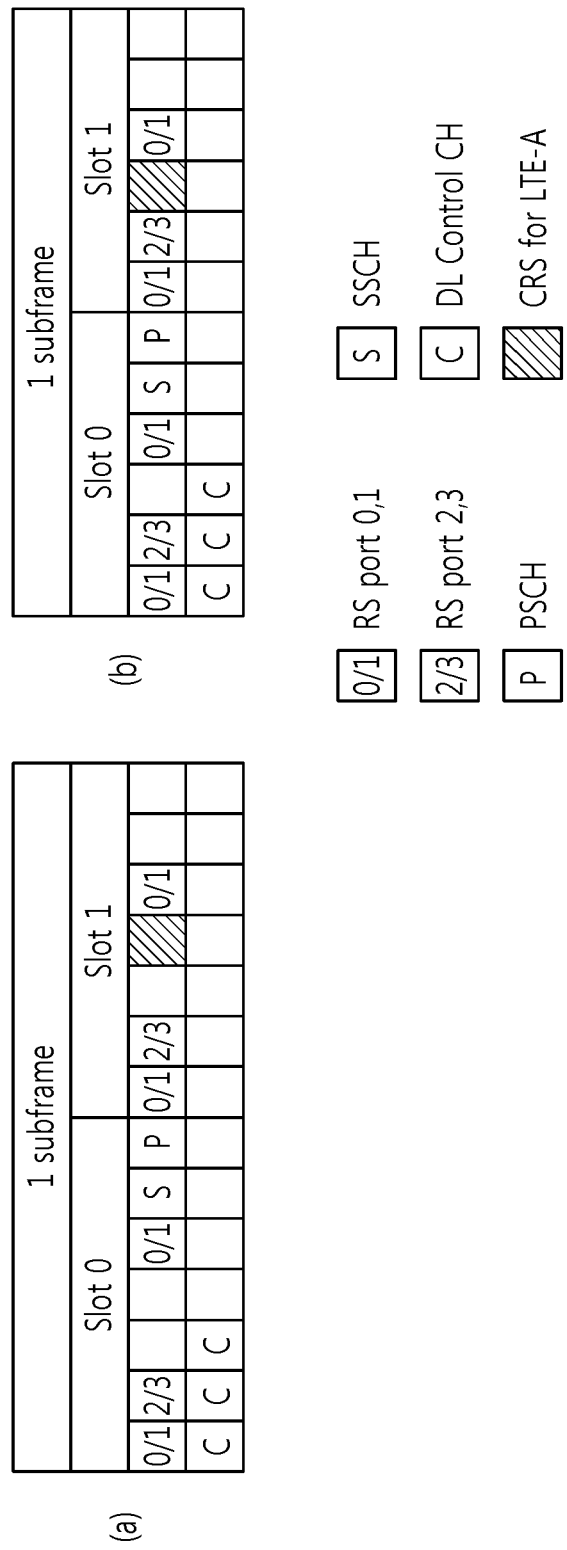

FIG. 27 is a diagram showing another example of sub-frames to which CRSs have been mapped in accordance with the proposed method of transmitting a reference signal. FIG. 27($a$) shows the case of a normal CP, and FIG. 27($b$) shows the case of an extended CP. The CRS is mapped to the $(2N_{symbol}-4^{th})$ OFDM symbol (the last fourth OFDM symbol) of the sub-frame.

Figure 28:
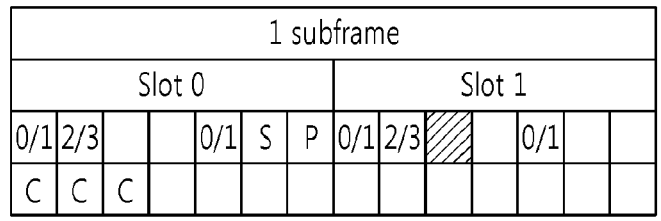
Figure 28:
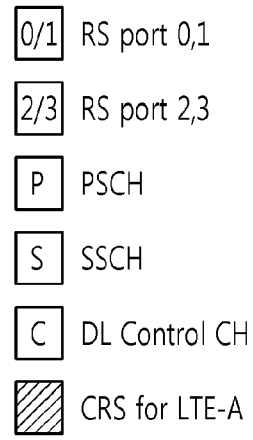

FIG. 28 is a diagram showing another example of a sub-frame to which a CRS has been mapped in accordance with the proposed method of transmitting a reference signal. The CRS is mapped to the $(2N_{symbol}-5^{th})$ OFDM symbol (i.e., the last fifth OFDM symbol) of the sub-frame.

Figure 29:
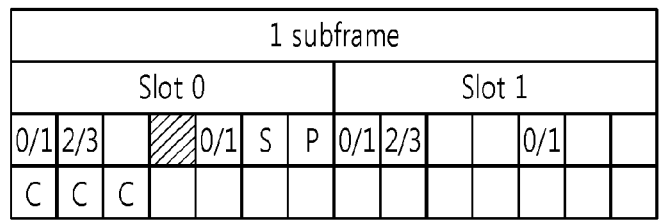
Figure 29:
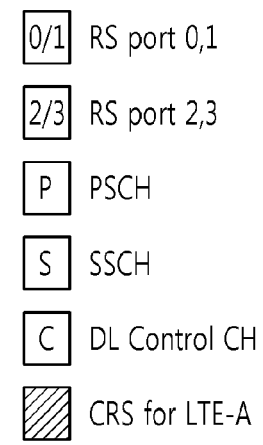

FIG. 29 is a diagram showing another example of a sub-frame to which a CRS has been mapped in accordance with the proposed method of transmitting a reference signal. The CRS is mapped to the fourth OFDM symbol of the sub-frame.

Figure 30:
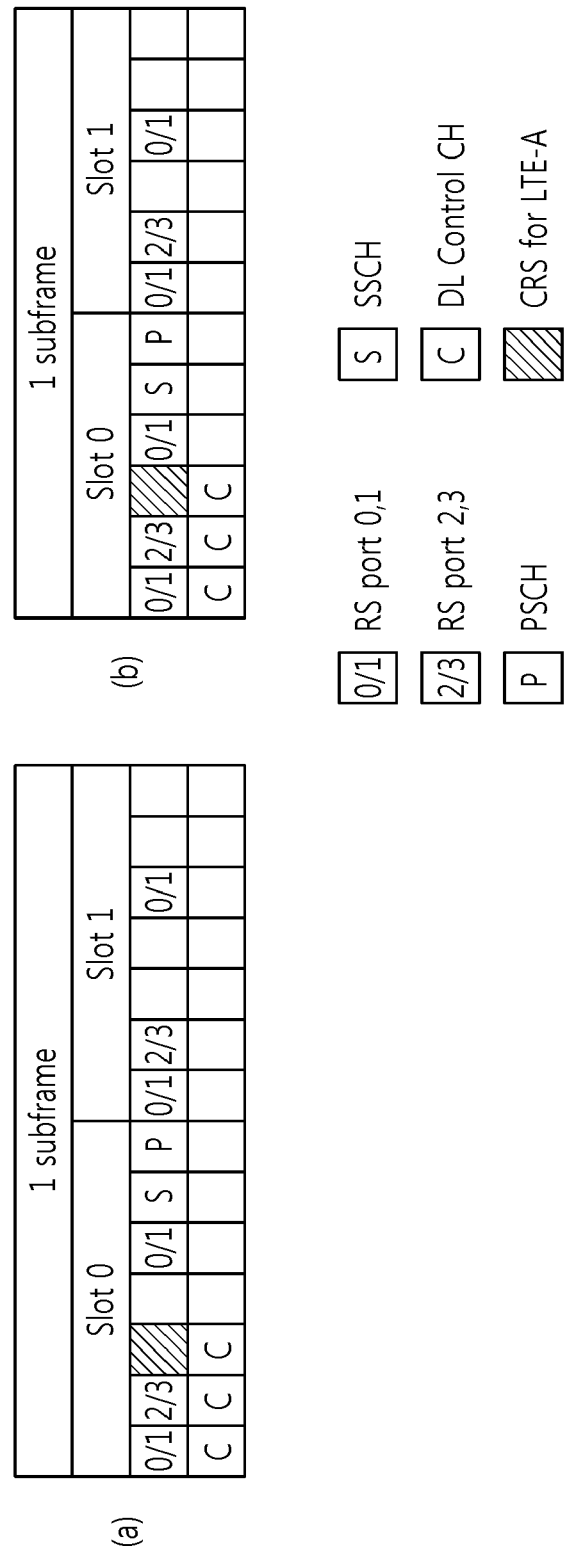

FIG. 30 is a diagram showing another example of sub-frames to which CRSs have been mapped in accordance with the proposed method of transmitting a reference signal. FIG. 30($a$) shows the case of a normal CP, and FIG. 30($b$) shows the case of an extended CP. The CRS is mapped to the third OFDM symbol of the sub-frame. This example can be applied to a case in which the number of OFDM symbols used as PDCCHs is two or less.

Two or more OFDM symbols can be used for CRS transmission.

Figure 31:
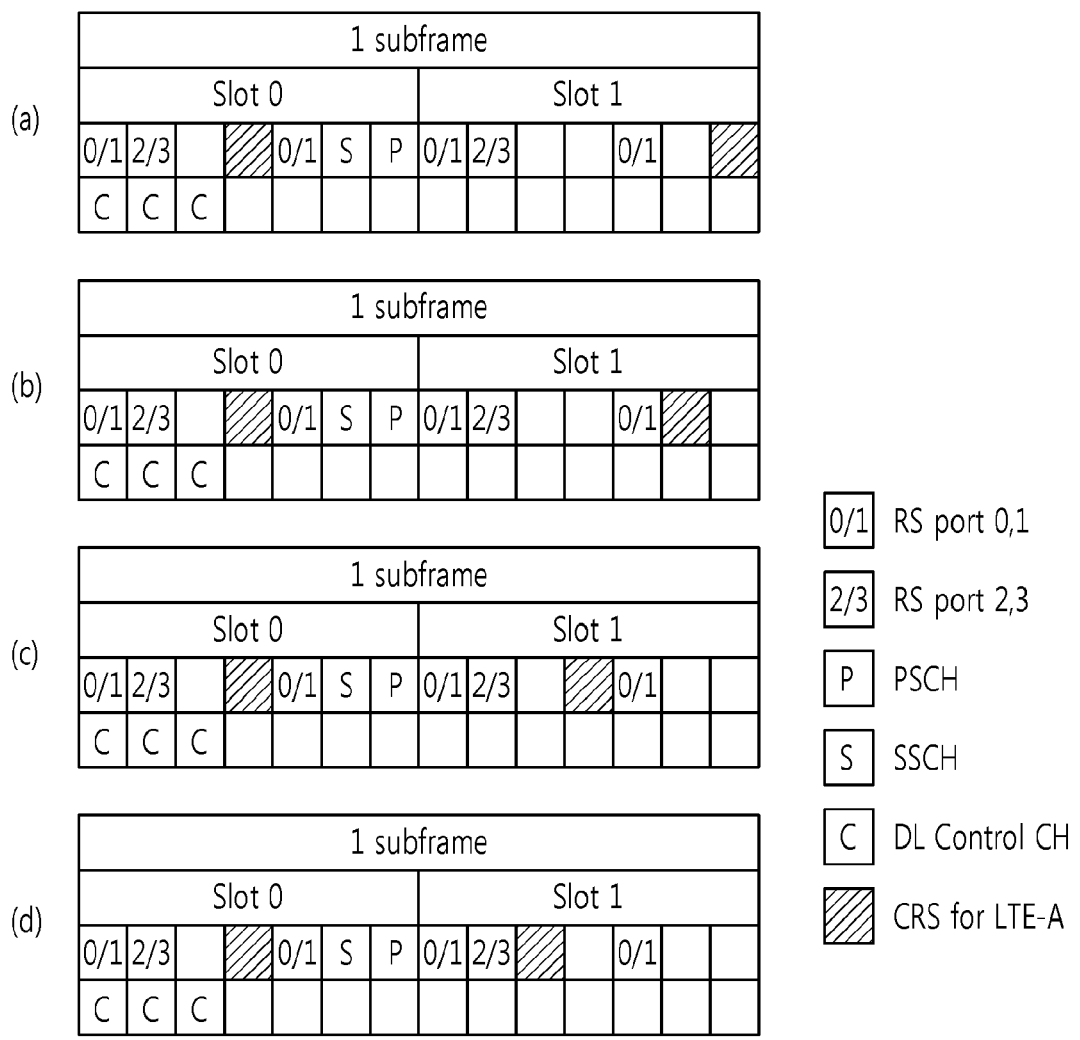

FIG. 31 is a diagram showing another example of sub-frames to which CRSs have been mapped in accordance with the proposed method of transmitting a reference signal. The CRSs are mapped to the fourth OFDM symbol and the $(2N_{symbol}-i^{th})$ (where i∈{1,2,4,5}) OFDM symbol of the sub-frame. FIGS. 31($a$) to 31($d$) are diagrams showing respective cases in which i is 1, 2, 4, and 5.

Figure 32:
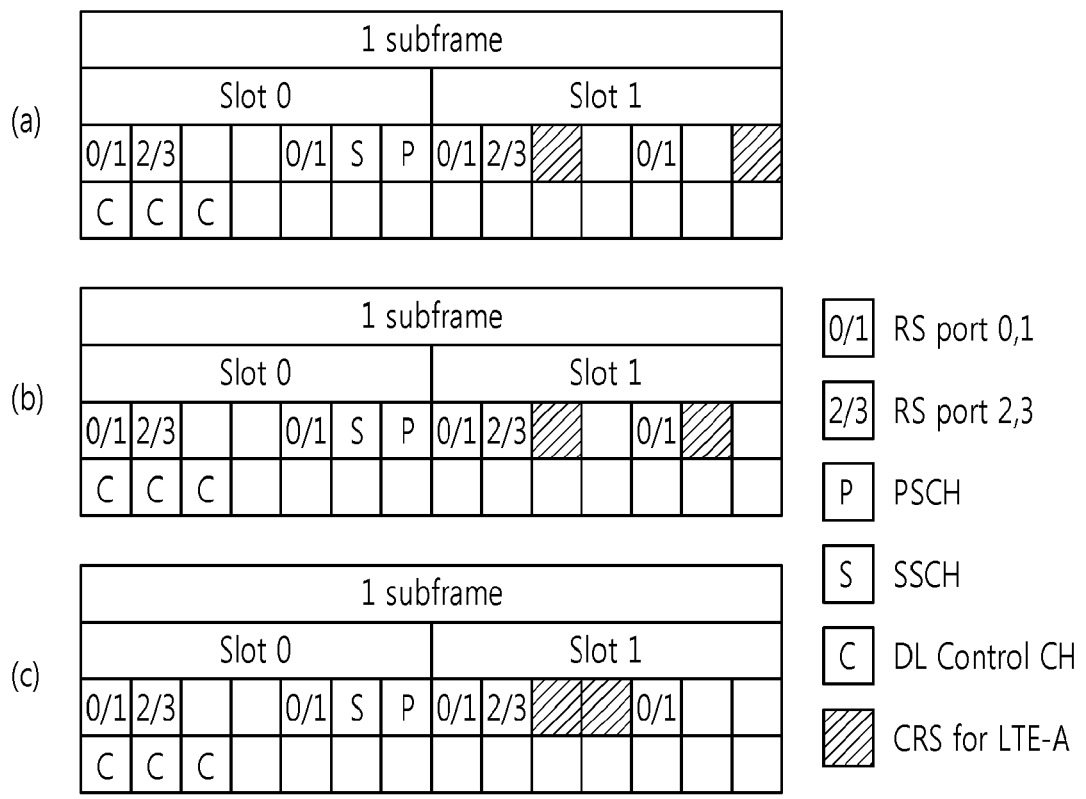

FIG. 32 is a diagram showing another example of sub-frames to which CRSs have been mapped in accordance with the proposed method of transmitting a reference signal. The CRSs are mapped to the $(2N_{symbol}-5^{th})$ OFDM symbol and the $(2N_{symbol}-i^{th})$ (where i∈{1,2,4}) OFDM symbol of the sub-frame. FIGS. 32($a$) to 32($c$) are diagrams showing respective cases in which i is 1, 2, and 4.

Figure 33:
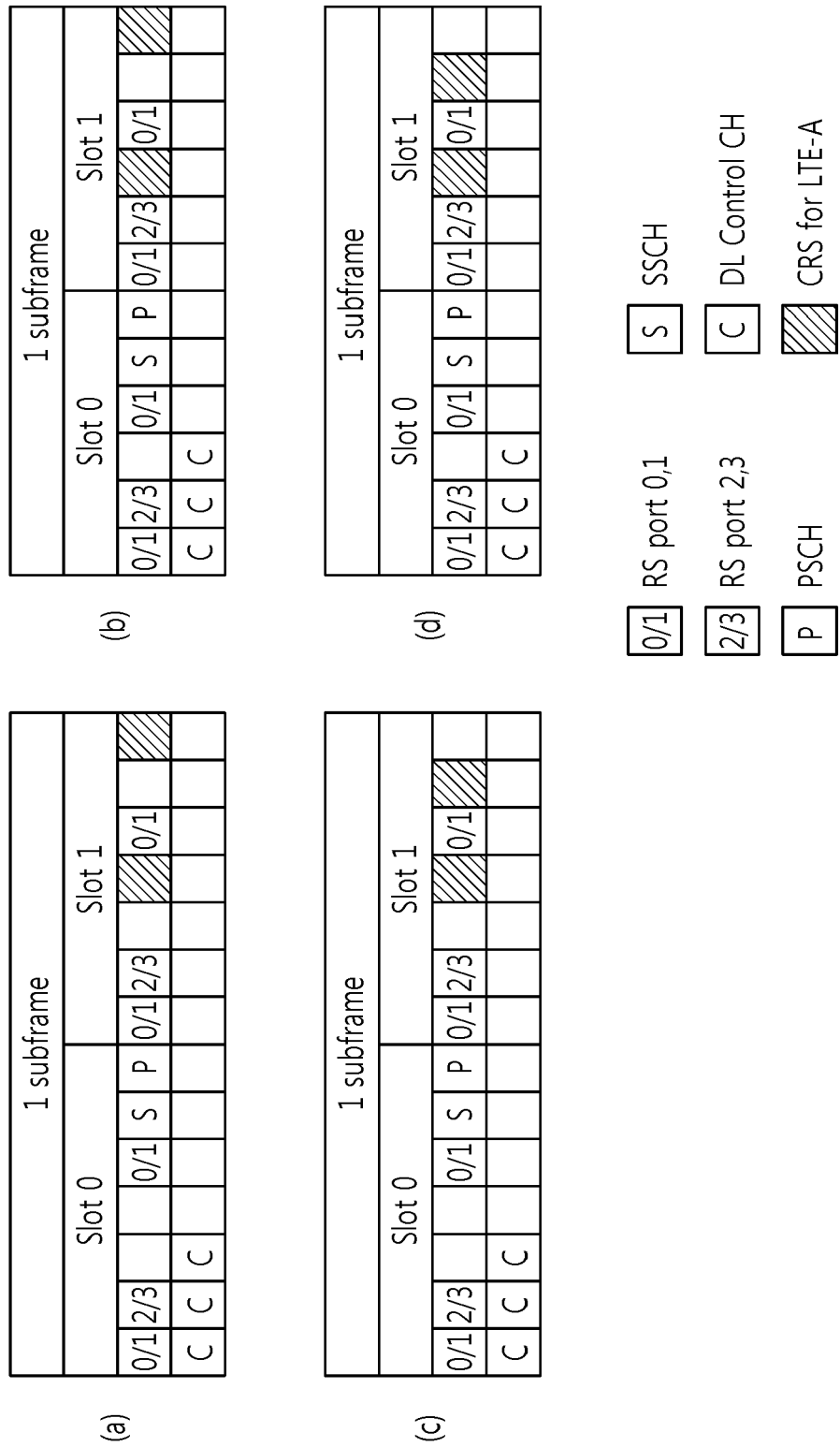

FIG. 33 is a diagram showing another example of sub-frames to which CRSs have been mapped in accordance with the proposed method of transmitting a reference signal. The CRSs are mapped to the $(2N_{symbol}-4^{th})$ OFDM symbol and the $(2N_{symbol}-i^{th})$ (where i∈{1,2}) OFDM symbol of the sub-frame. FIGS. 33($a$) and 33($b$) show the cases of a normal CP and an extended CP, respectively, when i is 1. FIGS. 33($c$) and 33($d$) show the cases of a normal CP and an extended CP, respectively, when i is 2.

Figure 34:
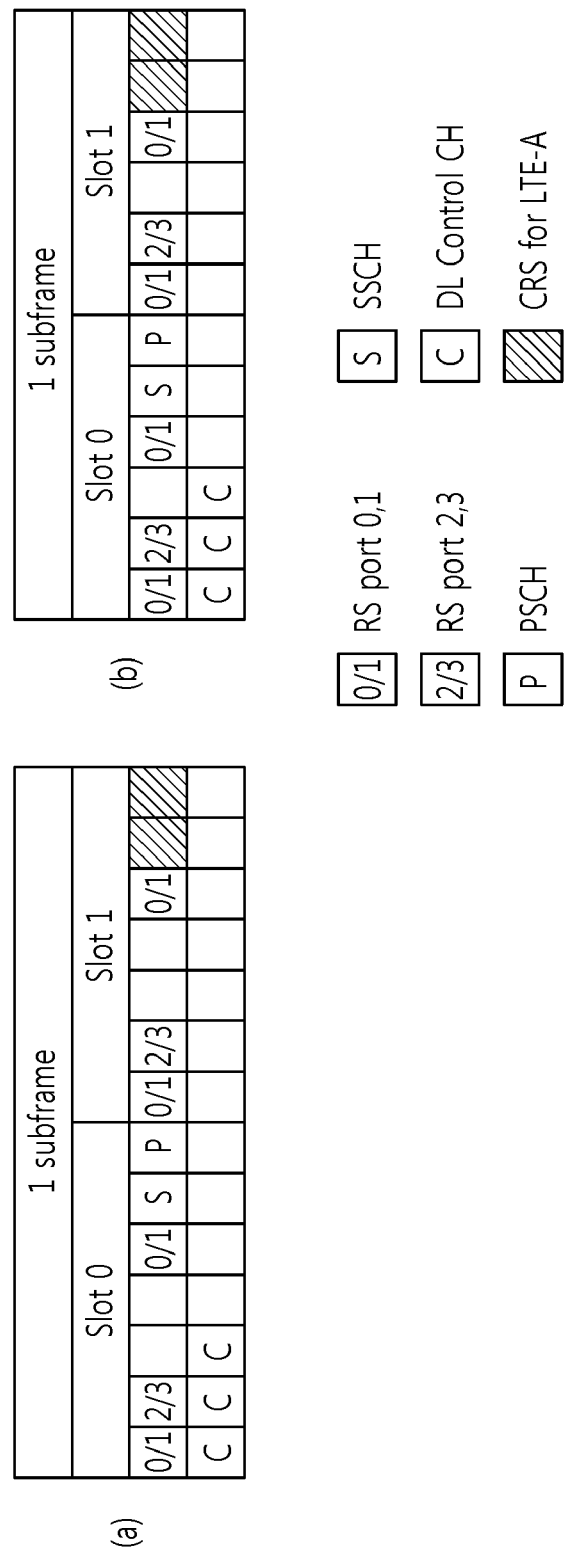

FIG. 34 is a diagram showing another example of sub-frames to which CRSs have been mapped in accordance with the proposed method of transmitting a reference signal. The CRSs are mapped to the last two OFDM symbols of the sub-frame.

Figure 35:
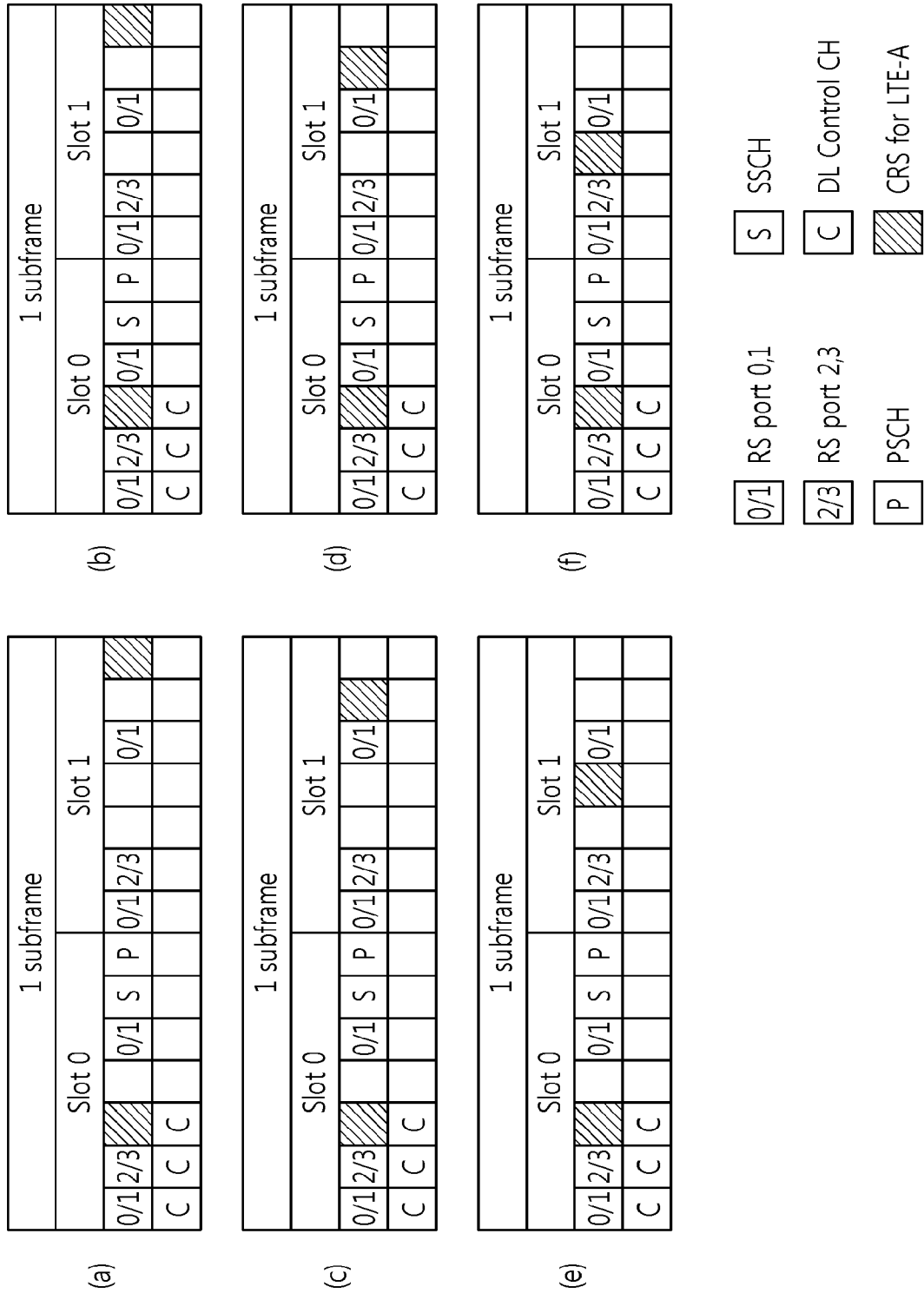

FIG. 35 is a diagram showing another example of sub-frames to which CRSs have been mapped in accordance with the proposed method of transmitting a reference signal. The CRSs are mapped to the third OFDM symbol and the $(2N_{symbol}-i^{th})$ (where i∈{1,2,4}) OFDM symbol of the sub-frame. FIGS. 35($a$) and 35($b$) show the cases of a normal CP and an extended CP, respectively, when i is 1. FIGS. 35($c$) and 35($d$) show the cases of a normal CP and an extended CP, respectively, when i is 2. FIGS. 35($e$) and 35($f$) show the cases of a normal CP and an extended CP, respectively, when i is 4. This example can be applied to a case in which the number of OFDM symbols used as PDCCHs is two or less.

Figure 36:
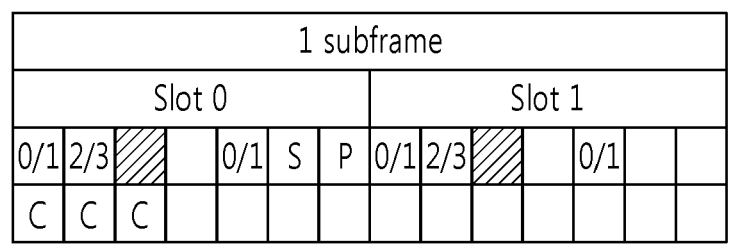

FIG. 36 is a diagram showing another example of a sub-frame to which CRSs have been mapped in accordance with the proposed method of transmitting a reference signal. The CRSs are mapped to the third OFDM symbol and the $(2N_{symbol}-5^{th})$ OFDM symbols (i.e., the last fifth OFDM symbol) of the sub-frame. This example can be applied to a case in which the number of OFDM symbols used as PDCCHs is two or less.

It can be assumed that a CRS is mapped to a sub-frame in which a PBCH or an SCH is transmitted within a radio frame and only antenna ports 0 and 1 are used as legacy antenna ports. The above sub-frame can be a zeroth or fifth sub-frame. An RS, a PBCH, an SCH, and a PDCCH for the legacy antenna ports and a UE-specific reference signal can be transmitted.

Figure 37:
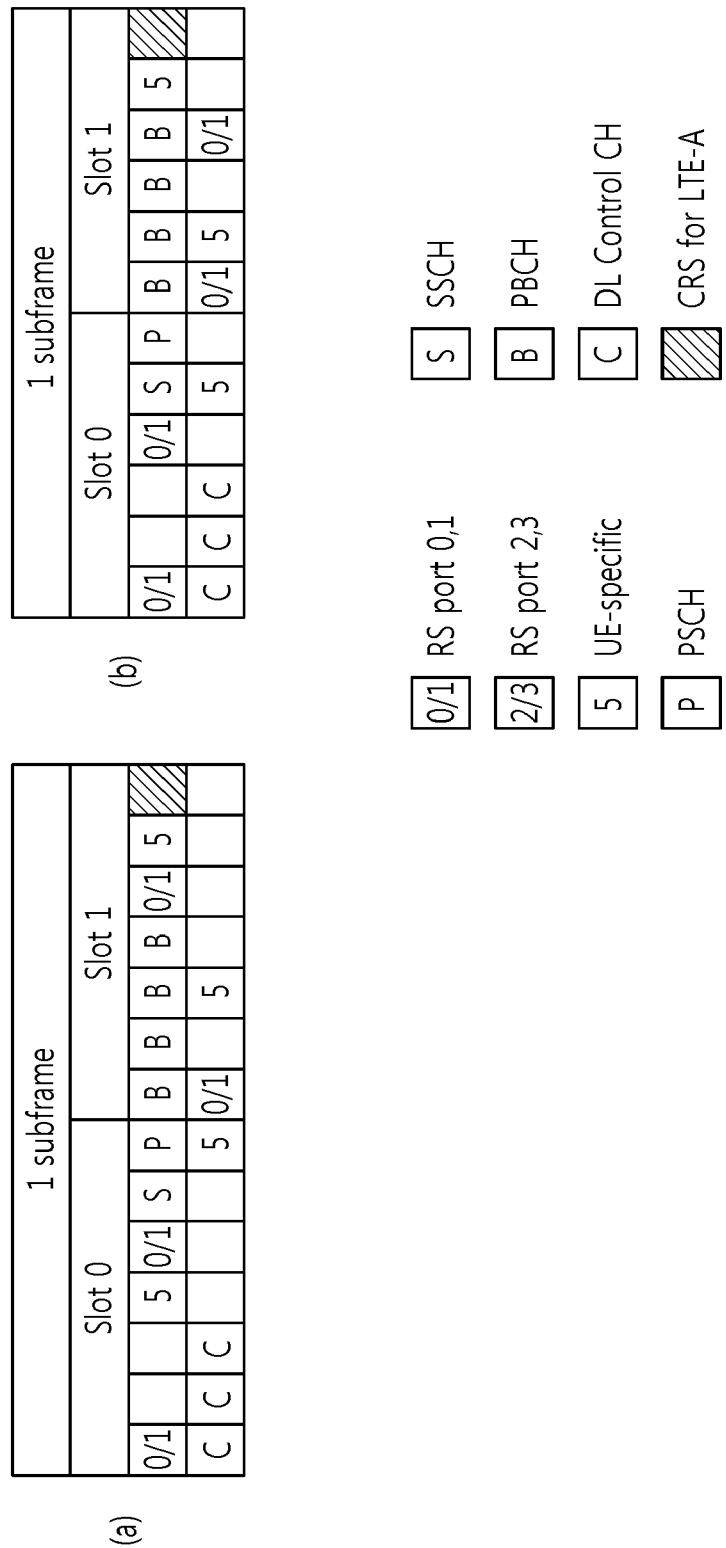

FIG. 37 is a diagram showing another example of sub-frames to which CRSs have been mapped in accordance with the proposed method of transmitting a reference signal. FIG. 37($a$) shows the case of a normal CP, and FIG. 37($b$) shows the case of an extended CP. The CRS is mapped to the last OFDM symbol of the sub-frame.

Figure 38:
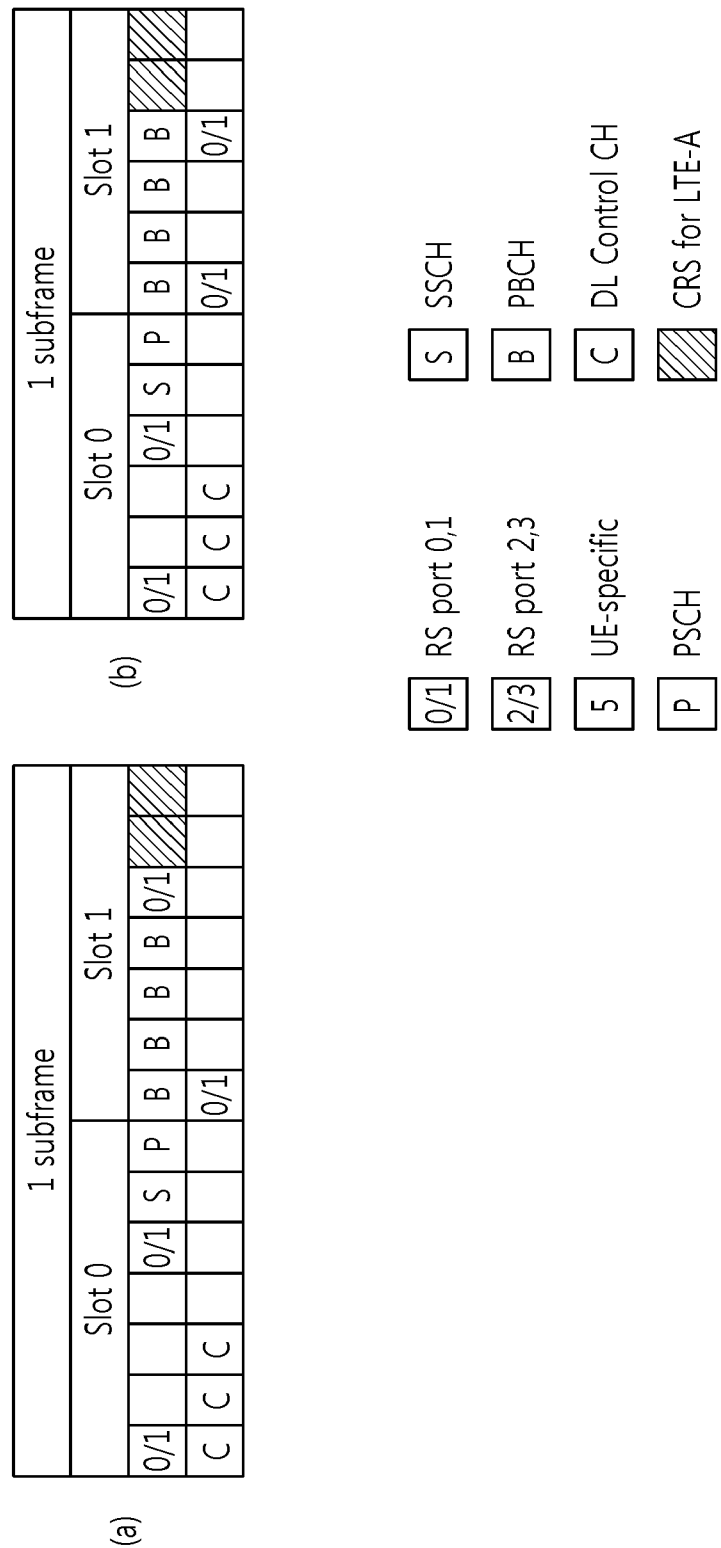

FIG. 38 is a diagram showing another example of sub-frames to which CRSs have been mapped in accordance with the proposed method of transmitting a reference signal. FIG. 38($a$) shows the case of a normal CP, and FIG. 38($b$) shows the case of an extended CP. The CRSs are mapped to the last two OFDM symbols of the sub-frame.

Figure 39:
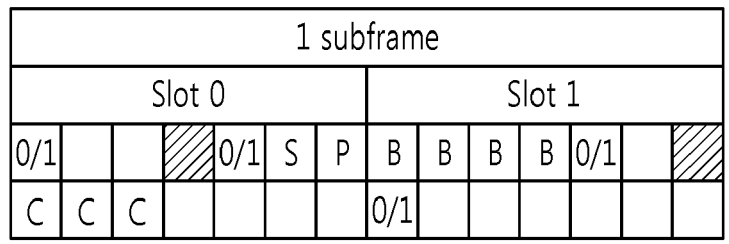
Figure 39:
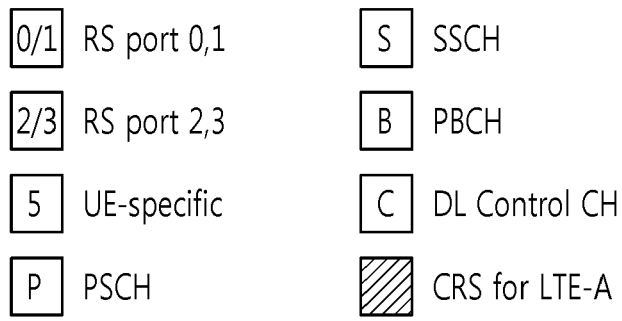

FIG. 39 is a diagram showing another example of a sub-frame to which CRSs have been mapped in accordance with the proposed method of transmitting a reference signal. The CRSs are mapped to the fourth OFDM symbol and the last OFDM symbol of the sub-frame.

Figure 40:
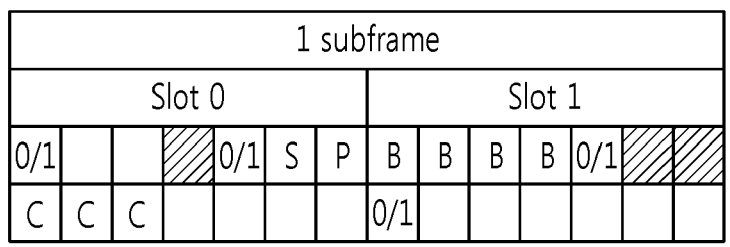
Figure 40:
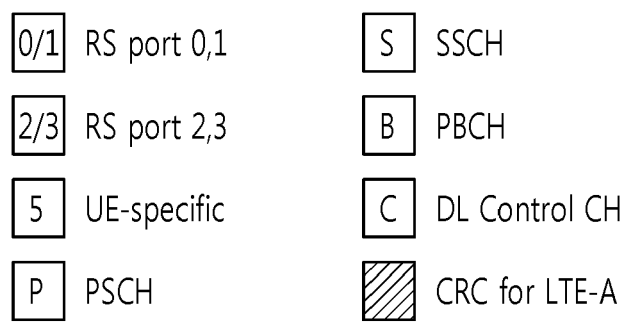

FIG. 40 is a diagram showing another example of a sub-frame to which CRSs have been mapped in accordance with the proposed method of transmitting a reference signal. The CRSs are mapped to the fourth OFDM symbol and the last two OFDM symbols of the sub-frame.

Figure 41:
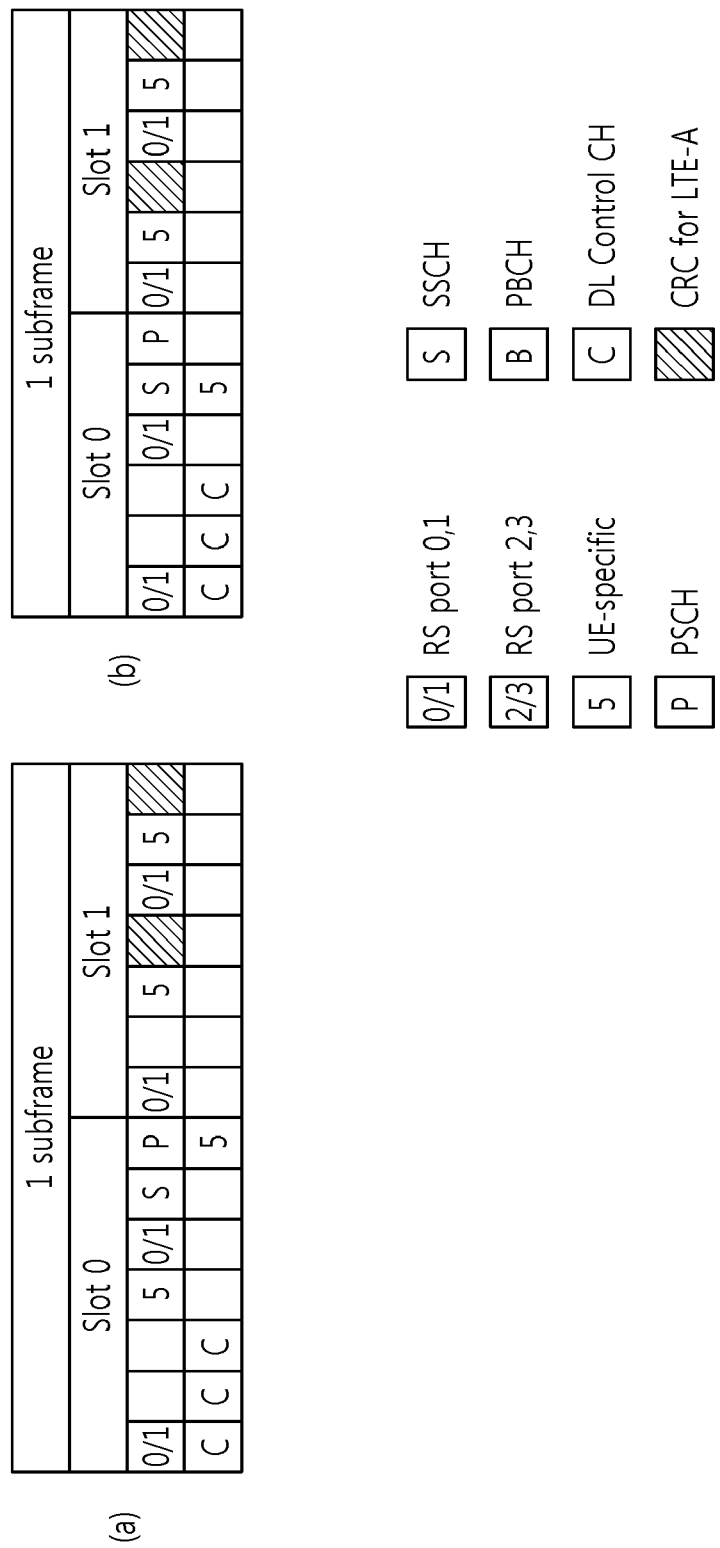

FIG. 41 is a diagram showing another example of sub-frames to which CRSs have been mapped in accordance with the proposed method of transmitting a reference signal. FIG. 41($a$) shows the case of a normal CP, and FIG. 41($b$) shows the case of an extended CP. The CRSs are mapped to the last OFDM symbol and the $(2N_{symbol}-4^{th})$ OFDM symbol (i.e., the last fourth OFDM symbol) of the sub-frame.

Figure 42:
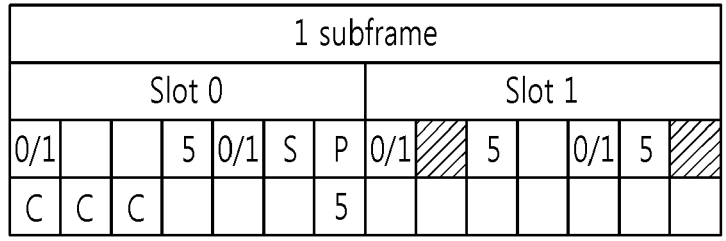
Figure 42:
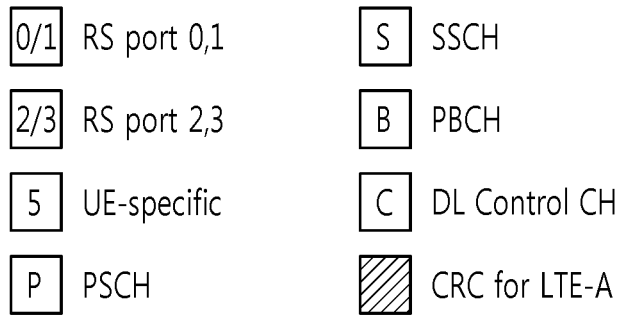

FIG. 42 is a diagram showing another example of a sub-frame to which CRSs have been mapped in accordance with the proposed method of transmitting a reference signal. The CRSs are mapped to the last OFDM symbol and the $(2N_{symbol}-6^{th})$ OFDM symbol (i.e., the last sixth OFDM symbol) of the sub-frame.

Figure 43:
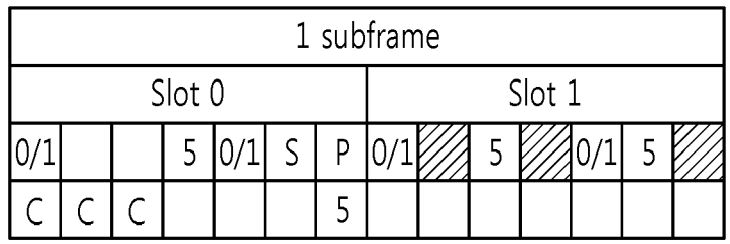
Figure 43:
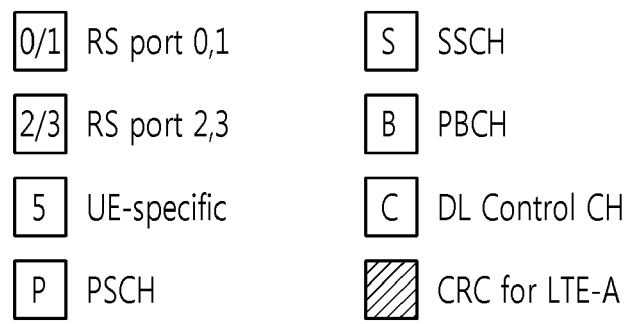

FIG. 43 is a diagram showing another example of a sub-frame to which CRSs have been mapped in accordance with the proposed method of transmitting a reference signal. The CRSs are mapped to the $(2N_{symbol}-6^{th})$ OFDM symbol (i.e., the last sixth OFDM symbol), the $(2N_{symbol}-4^{th})$ OFDM symbol (i.e., the last fourth OFDM symbol), and the last OFDM symbol of the sub-frame.

Figure 44:
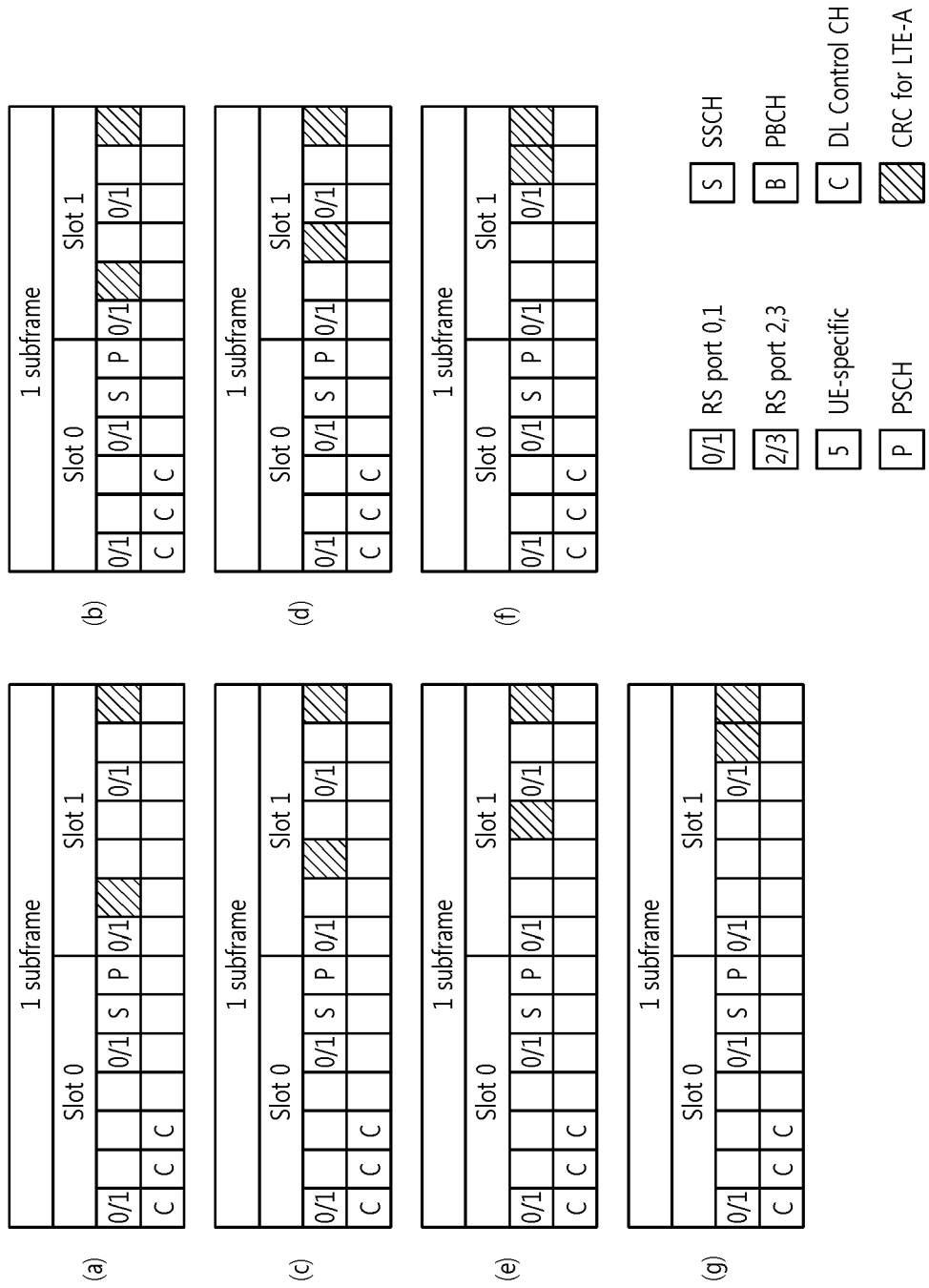
Figure 45:
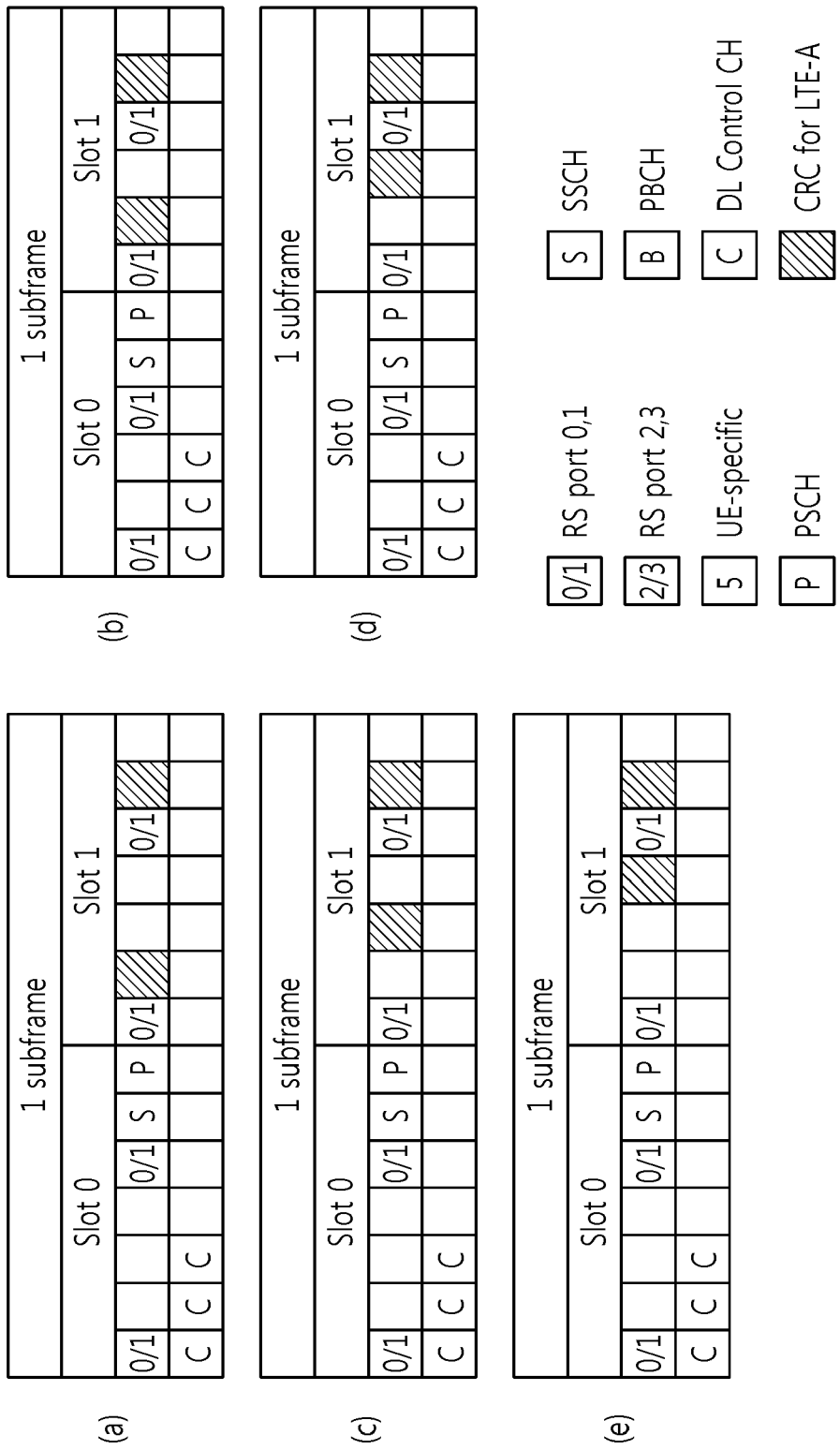
Figure 46:
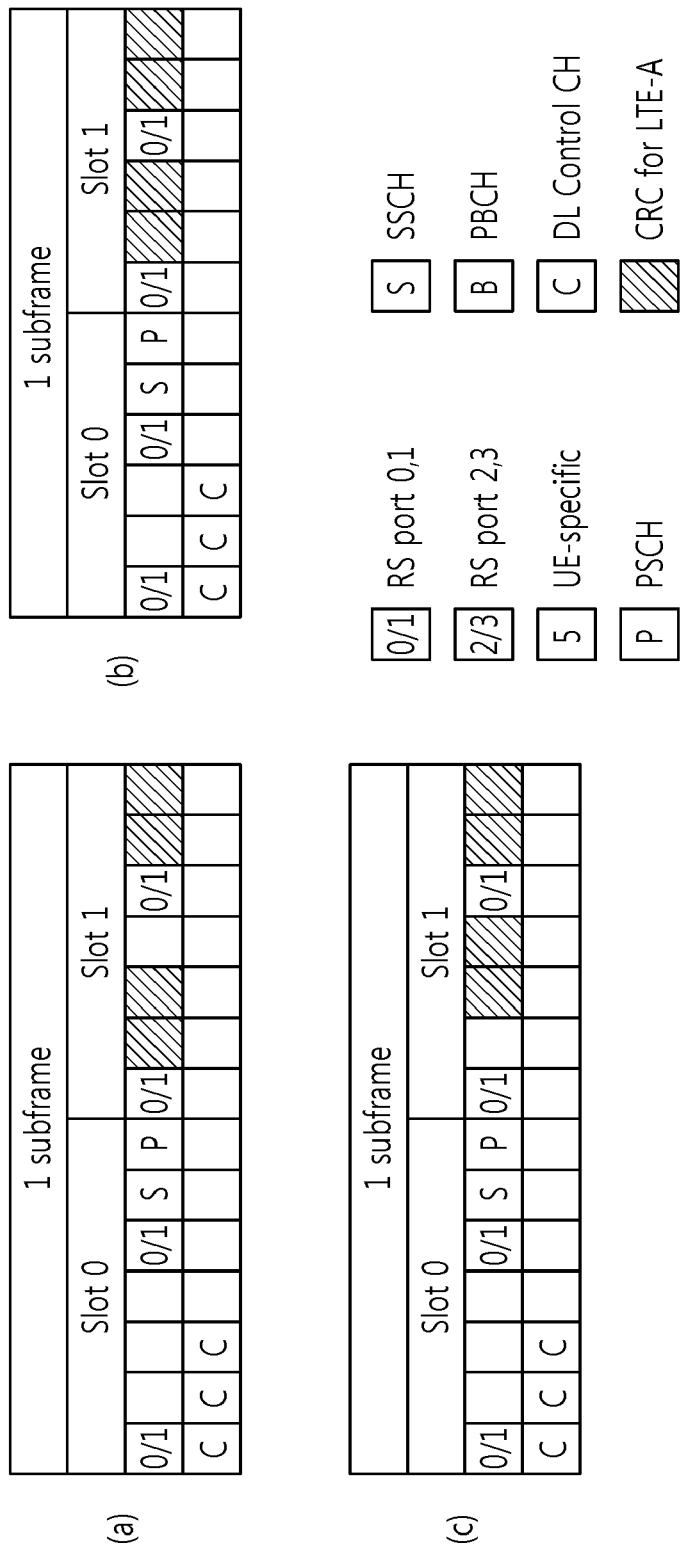

FIGS. 44 and 45 are diagrams showing another example of sub-frames to which CRSs have been mapped in accordance with the proposed method of transmitting a reference signal. Two OFDM symbols can be used for CRS transmission. FIG. 46 is a diagram showing another example of sub-frames to which CRSs have been mapped in accordance with the proposed method of transmitting a reference signal. Four OFDM symbols can be used for CRS transmission.

Although the cases in which one or more CRSs are allocated to sub-frames in which the PBCH or the SCH is transmitted have been described above, the transmission of the CRSs can be omitted in order to transmit the PBCH or the SCH. Further, it has been assumed that the positions of OFDM symbols to which the CRSs are allocated differ from each other in order to avoid a collision with the position of an OFDM symbol to which the PBCH or the SCH is allocated. However, in the case in which the position of an OFDM symbol to which the CRS is allocated is identical with the position of an OFDM symbol to which the PBCH or the SCH is allocated, the CRS can be fully punctured, or partially punctured in the resource in which the PBCH or SCH is allocated.

The CRS mapped to an OFDM symbol can have a specific pattern in the frequency domain within a corresponding OFDM symbol.

Figure 47:
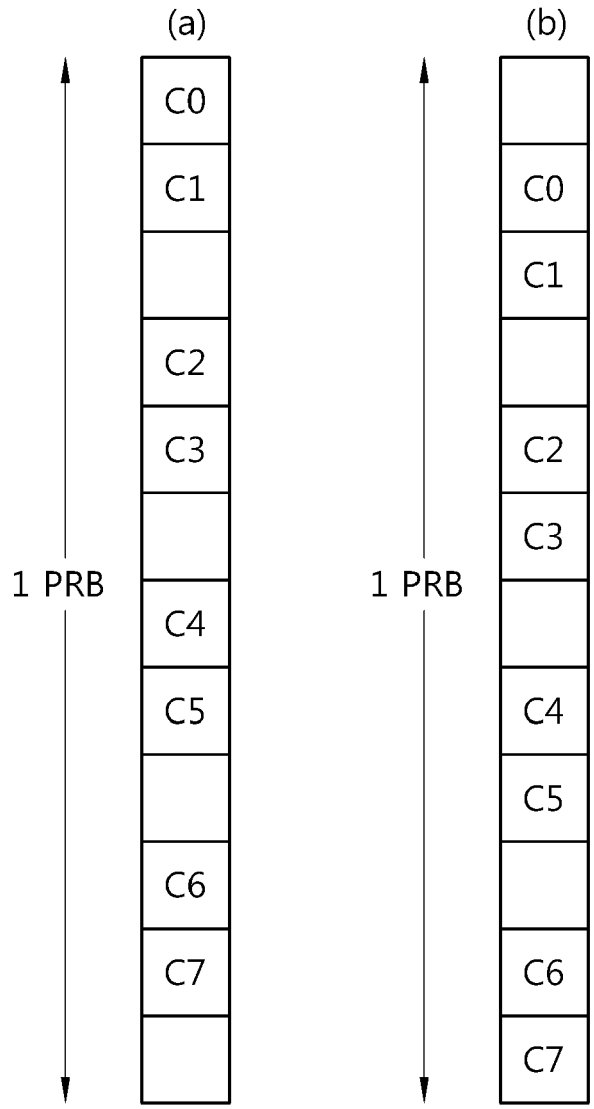
FIG. 47 is a diagram showing an example of the patterns of CRSs mapped to OFDM symbols.

FIG. 47 is a diagram showing an example of the patterns of CRSs mapped to OFDM symbols. The CRS occupies one OFDM symbol. One Physical Resource Block (PRB) can include twelve subcarriers. A CRS for each of the antenna ports of an LTE-A system is mapped to each of the subcarriers. FIG. 47(b) is a diagram showing a case in which the CRS pattern of FIG. 47(a) has shifted by one subcarrier.

Figure 48:
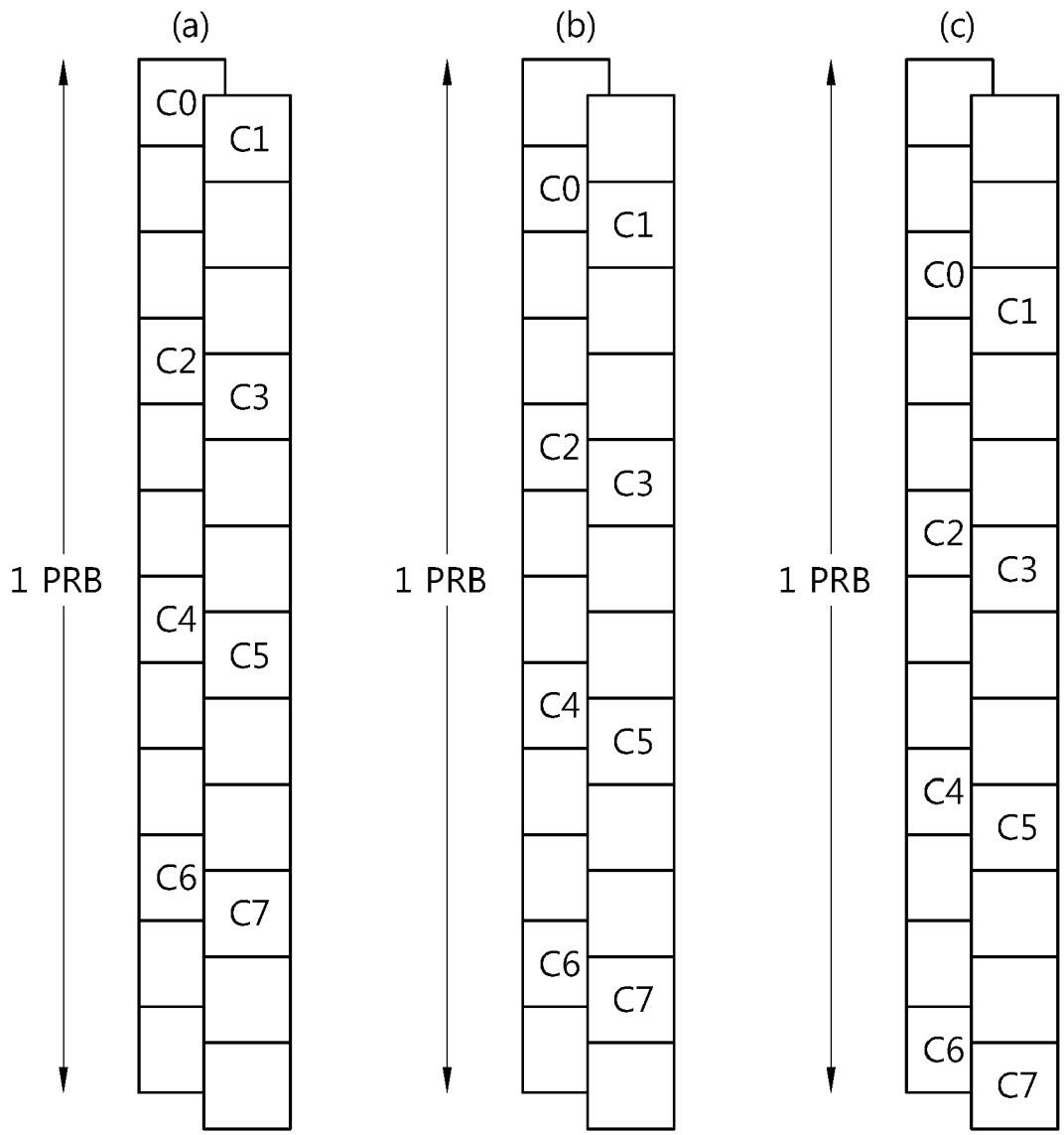
FIG. 48 to FIG. 55 is a diagram showing another example of the patterns of CRSs mapped to OFDM symbols.

FIG. 48 is a diagram showing another example of the patterns of CRSs mapped to OFDM symbols. The CRS occupies one OFDM symbol. In one subcarrier, CRSs for two antenna ports can be classified through codes. For example, a CRS C0 for an antenna port 0 and a CRS C1 for an antenna port 1 can be classified through codes. In a similar way, a CRS C2 for an antenna port 2 and a CRS C3 for an antenna port 3, a CRS C4 for an antenna port 4 and a CRS C5 for an antenna port 5, and a CRS C6 for an antenna port 6 and a CRS C7 for an antenna port 7 can be classified through codes. FIGS. 48(b) and 48(c) are diagrams showing cases in which the CRS pattern of FIG. 48(a) has shifted by one subcarrier and two subcarriers, respectively.

Figure 49:
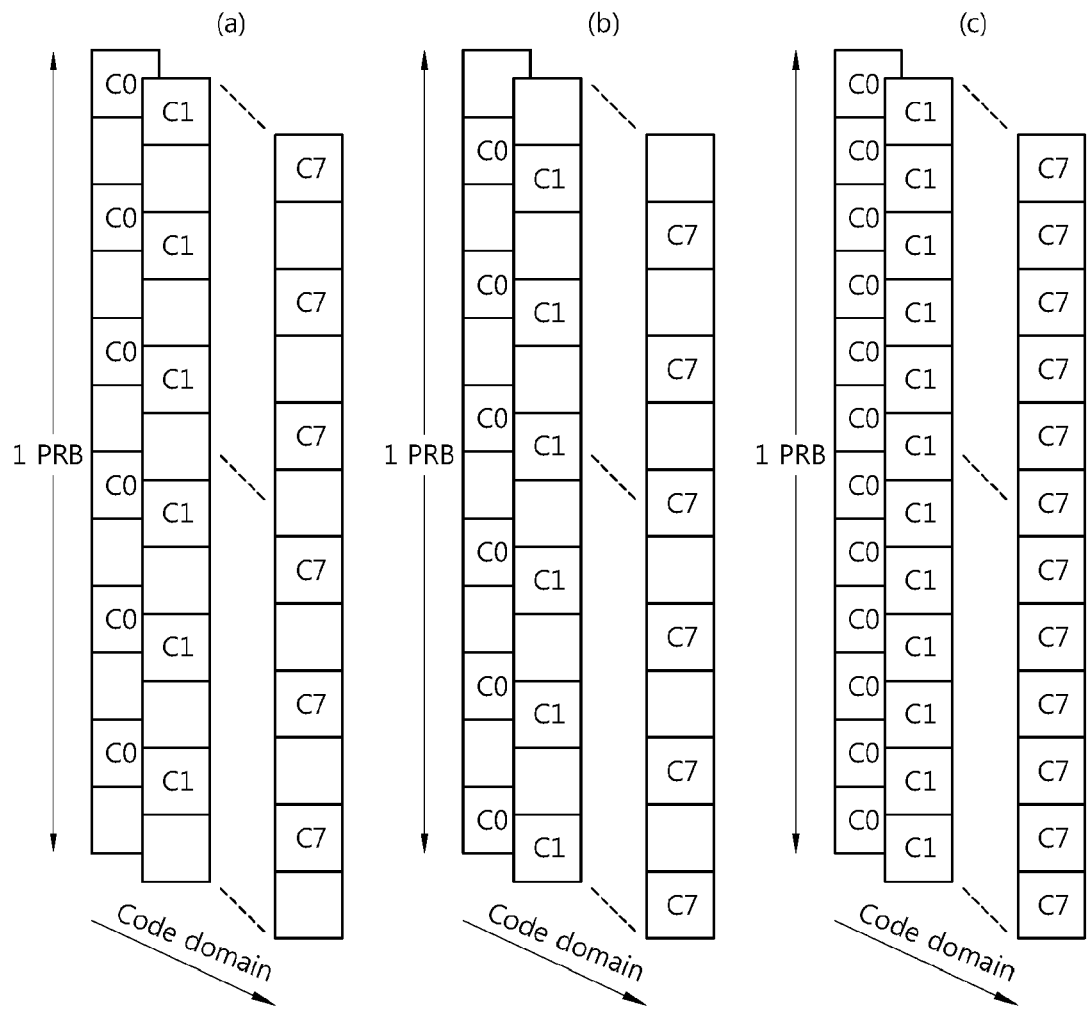

FIG. 49 is a diagram showing another example of the patterns of CRSs mapped to OFDM symbols. The CRS occupies one OFDM symbol. In one subcarrier, CRSs for eight antenna ports can be classified through codes. Referring to FIG. 49(a), six CRSs for one antenna port are mapped within one PRB. FIG. 49(b) is a diagram showing a case in which the CRS pattern of FIG. 49(a) has shifted by one subcarrier. Referring to FIG. 49(c), CRSs are mapped to all the subcarriers within one PRB.

Figure 50:
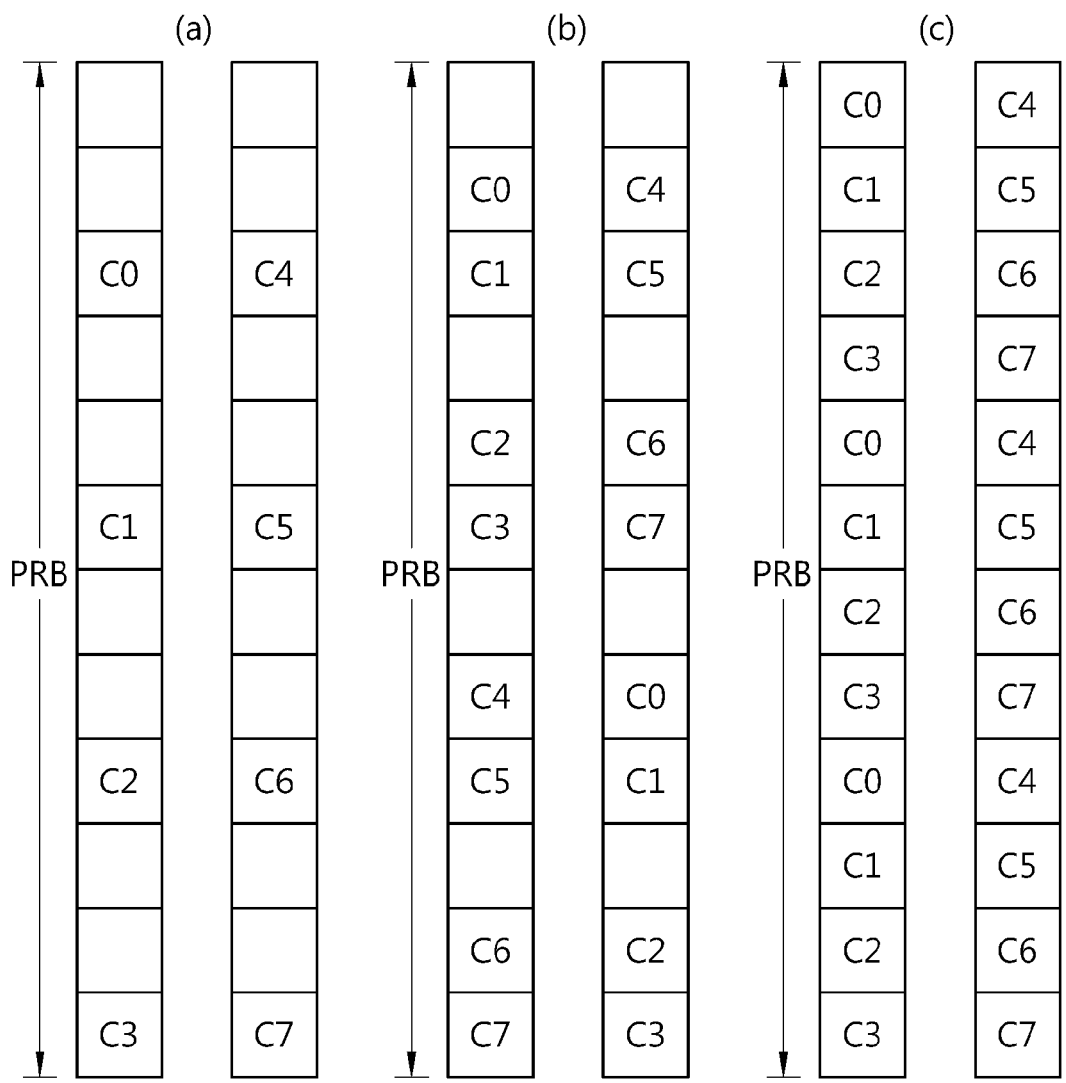

FIG. 50 is a diagram showing another example of the patterns of CRSs mapped to OFDM symbols. The CRS occupies two OFDM symbols. Referring to FIG. 50(a), CRSs for four antenna ports are transmitted in one OFDM symbol. One CRS for one antenna port is transmitted within one sub-frame. Referring to FIG. 50(b), CRSs for eight antenna ports, respectively, are transmitted in one OFDM symbol, and the CRS patterns within respective OFDM symbols have shifted to each other. That is, two CRSs for each antenna port are transmitted within one sub-frame. Referring to FIG. 50(c), CRSs are mapped to all the subcarriers within one PRB. CRSs each for four antenna ports are transmitted in one OFDM symbol. In other words, three CRSs for each antenna port are transmitted within one sub-frame.

Figure 51:
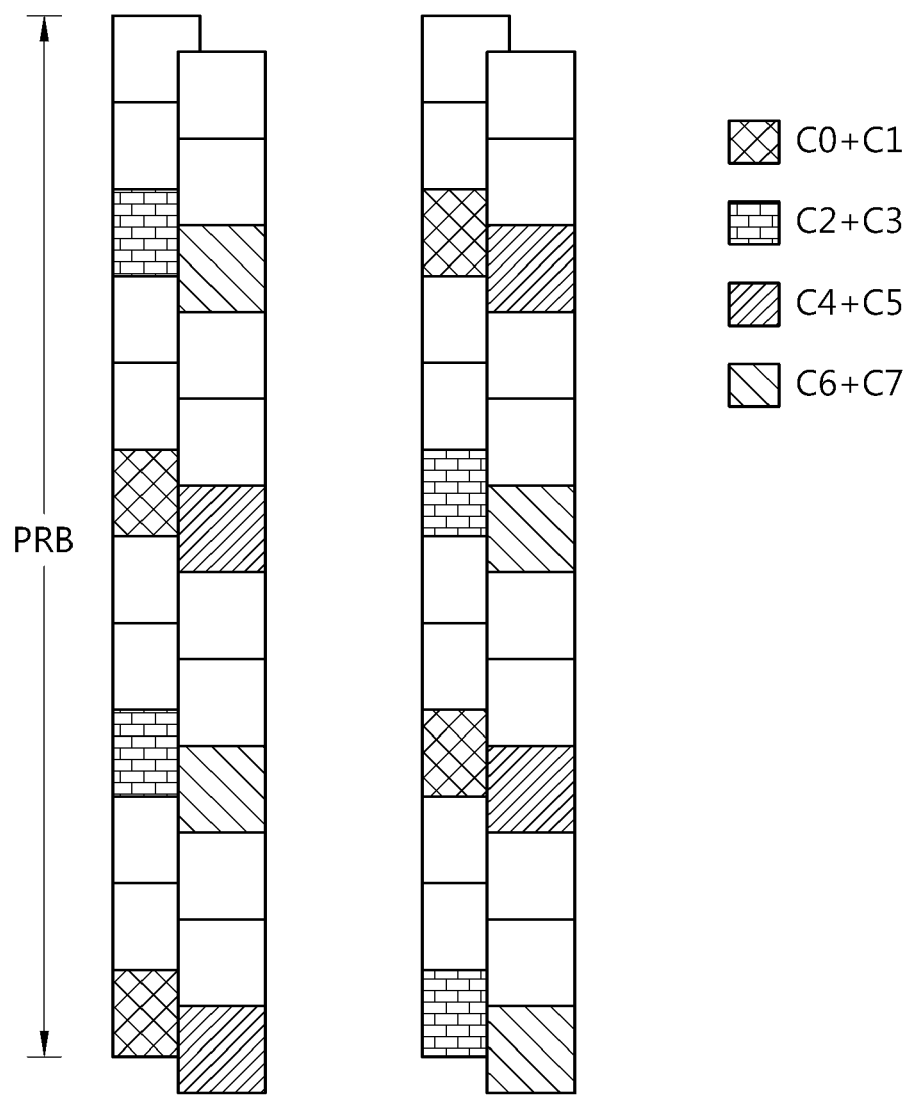

FIG. 51 is a diagram showing another example of the patterns of CRSs mapped to OFDM symbols. The CRS occupies two OFDM symbols. A CRS for a plurality of antenna ports can be transmitted in one subcarrier. For example, a CRS for an antenna port 0 and an antenna port 1 can be transmitted in one subcarrier. Further, the CRS for the plurality of antenna ports can be classified through codes.

Figure 52:
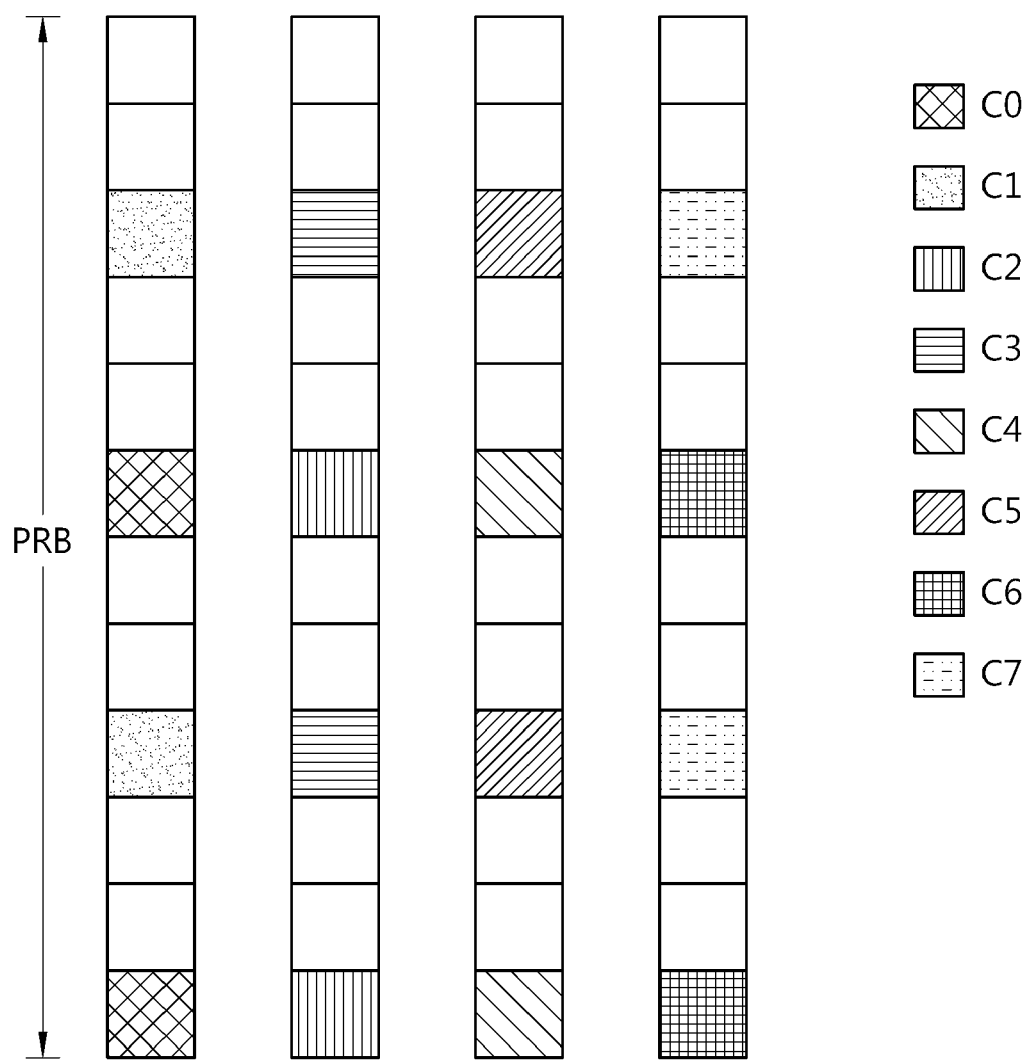

FIG. 52 is a diagram showing another example of the patterns of CRSs mapped to OFDM symbols. The CRS occupies four OFDM symbols. A CRS for two antenna ports is mapped to two subcarriers in one OFDM symbol. That is, two CRSs for each antenna port are transmitted in one sub-frame.

Figure 53:
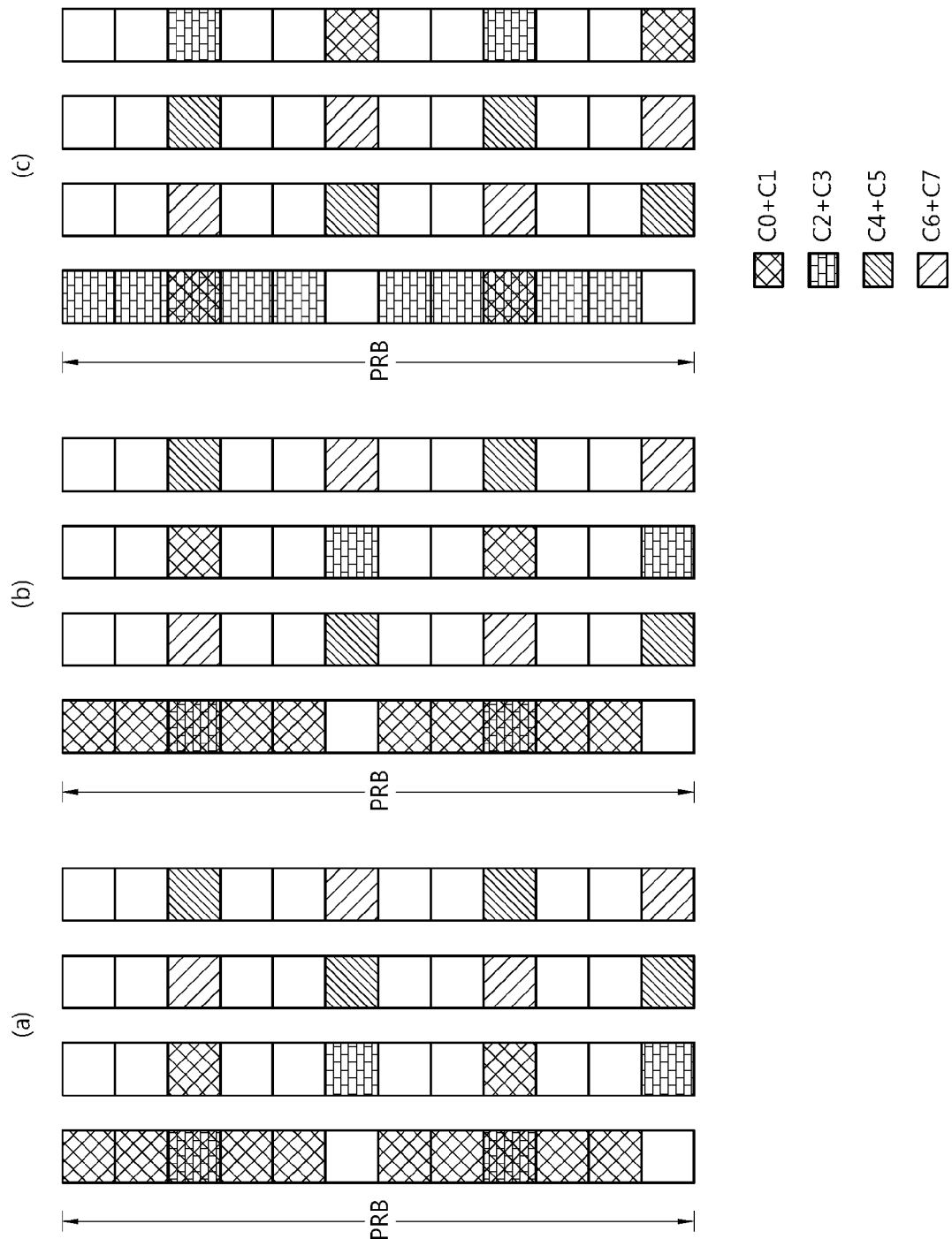

FIG. 53 is a diagram showing another example of the patterns of CRSs mapped to OFDM symbols. The CRS occupies four OFDM symbols. A CRS for a plurality of antenna ports can be transmitted in one subcarrier. For example, a CRS for an antenna port 0 and an antenna port 1 can be transmitted in one subcarrier. Further, the CRS for the plurality of antenna ports can be classified through a code.

Figure 54:
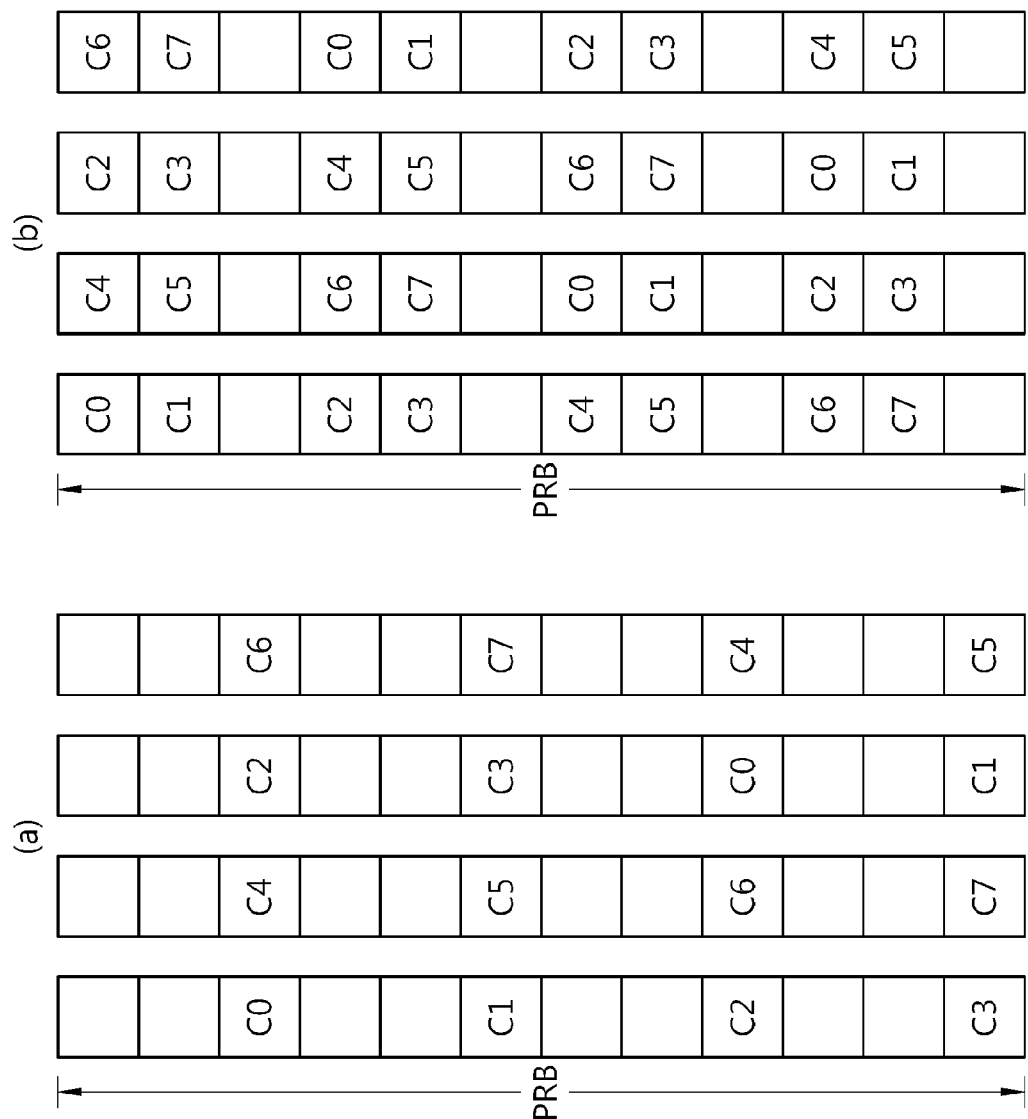

FIG. 54 is a diagram showing another example of the patterns of CRSs mapped to OFDM symbols. The CRS occupies four OFDM symbols. Referring to FIG. 54(a), a CRS for four antenna ports is transmitted in one OFDM symbol. Two CRSs for each antenna port are transmitted in one sub-frame. Referring to FIG. 54(b), a CRS for eight antenna ports is transmitted in one OFDM symbol. That is, four CRSs for each antenna port are transmitted in one sub-frame.

Figure 55:
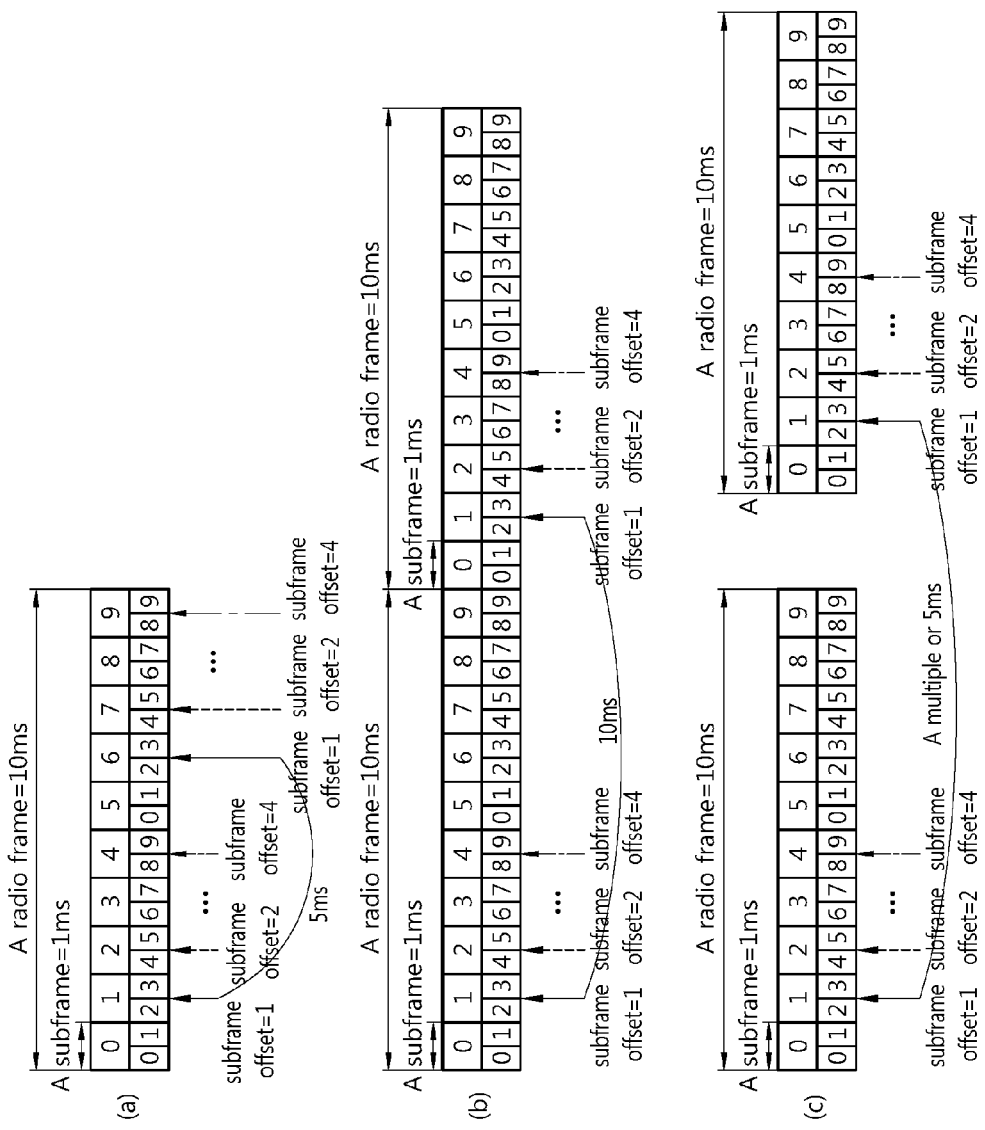

FIG. 55 is a diagram showing another example of the patterns of CRSs mapped to OFDM symbols. To prevent a collision between a sub-frame to which a PBCH or an SCH is allocated and a sub-frame to which a CRS is allocated, the transmission cycle of a CRS can be a multiple of an integer of 5 ms. The PBCH and the SCH are in general allocated to a zeroth sub-frame and a fifth sub-frame. A sub-frame to which a CRS is allocated can be allocated on the basis of a sub-frame offset value. The sub-frame offset value can be any one of 1 to 4. For example, when the sub-frame offset value is 1, the CRS can be allocated to a first sub-frame and a sixth sub-frame. The sub-frame offset value can be transmitted by a higher layer. FIG. 55(a) is a diagram showing a case in which the CRS transmission cycle is 5 ms, FIG. 55(b) is a diagram showing a case in which the CRS transmission cycle is 10 ms, and FIG. 55(c) is a diagram showing a case in which the CRS transmission cycle is a multiple of an integer of 5 ms.

Figure 56:
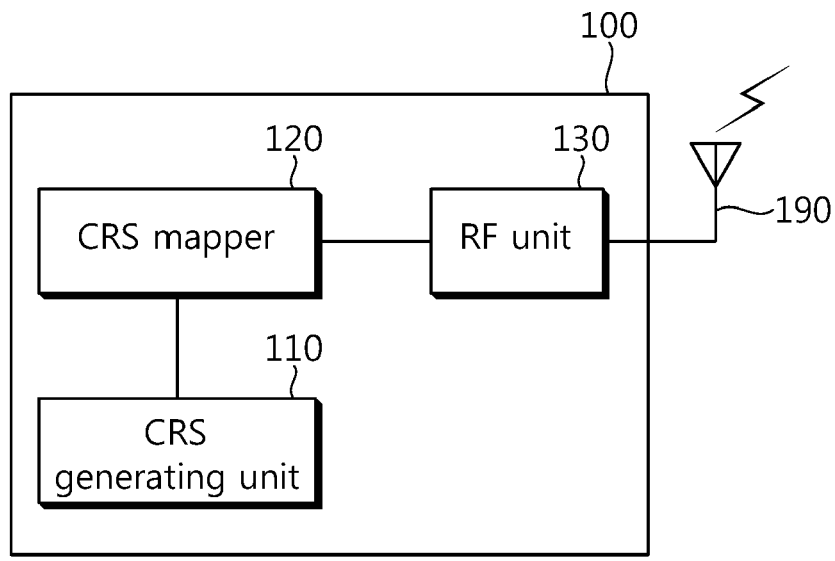
FIG. 56 is a block diagram of a transmitter in which the embodiments of the present invention are implemented.

FIG. 56 is a block diagram of a transmitter in which the embodiments of the present invention are implemented.

The transmitter 100 includes a CRS generating unit 110, a CRS mapper 120, and a Radio Frequency (RF) unit 130. Referring to FIG. 56, the CRS generating unit 110 and the CRS mapper 120 implement the proposed functions, processes, and/or methods. The CRS generating unit 110 is configured to generate CRSs. The CRS mapper 120 is configured to map the generated CRSs to a resource region. The RF unit 130 is connected to the CRS mapper 120 and configured to transmit and/or receive radio signals.

Figure 57:
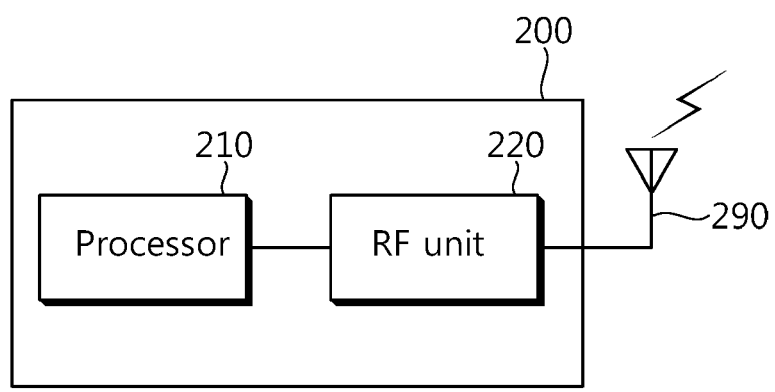
FIG. 57 is a block diagram of a receiver in which the embodiments of the present invention are implemented. The receiver 200 includes a processor 210 and an RF unit 220.

FIG. 57 is a block diagram of a receiver in which the embodiments of the present invention are implemented. The receiver 200 includes a processor 210 and an RF unit 220.

Referring to FIG. 57, the processor 210 implements the proposed functions, processes, and/or methods. The processor 210 is configured to receive CRSs transmitted by the transmitter, process the received CRSs, and measure the quality of a channel or estimates a channel. The RF unit 220 is connected to the processor 210 and configured to transmit and/or receive radio signals.

The CRS generating unit 110, the CRS mapper 120, and the processor 210 can include an Application-Specific Integrated Circuit (ASIC), other chipsets, logic circuits and/or a data processing device. The RF units 130 and 220 can include a baseband circuit for processing radio signal. In the case in which the embodiments are implemented in software, the above methods can be implemented using a module (process, function, etc.) for performing the above function.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of transmitting a reference signal in a wireless communication system, the method comprising:
   determining a position of a sub-frame to which the reference signal is mapped based on:
      hybrid automatic repeat request (HARQ) processing time for backhaul link transmission;
      positions of sub-frames for backhaul link transmission;
      a number of sub-frames for backhaul link transmission within one radio frame; and
      a transmission period of the reference signal; and
   transmitting the reference signal to a user equipment (UE) through the sub-frame to which the reference signal is mapped,
   wherein:
   the reference signal is a cell-specific reference signal (CRS);
   if the sub-frame, to which the reference signal is mapped, is overlapped with a Multimedia Broadcast multicast service Single Frequency Network (MBSFN) sub-frame, the reference signal is multiplexed with a Physical Multicast Channel (PMCH) or a Physical Downlink Shared Channel (PDSCH) within the MBSFN sub-frame through a Time Division Multiple (TDM) method at an orthogonal frequency division multiplexing (OFDM) symbol level;
   the transmission period of the reference signal is a multiple of an integer of 5 ms in order to avoid duplicated allocation with a sub-frame to which a Synchronization Channel (SCH) and a Physical Broadcast Channel (PBCH) are allocated; and
   if an OFDM symbol position for the reference signal is overlapped with the sub-frame to which the SCH and the PBCH are allocated, the transmission of the reference signal is punctured in a transmission bandwidth for the SCH and the PBCH.

2. The method of claim 1, wherein the HARQ processing time for backhaul link transmission is 10 ms, 8 ms, or 5 ms.

3. The method of claim 1, wherein the number of sub-frames for backhaul link transmission within one radio frame is 1 or 2.

4. The method of claim 1, wherein the sub-frame to which the reference signal is mapped is not allocated for backhaul link transmission.

5. The method of claim 1, wherein the sub-frame is indicated by a sub-frame offset value transmitted by a higher layer.

6. The method of claim 5, wherein the sub-frame offset value is 1, 2, 3 or 4.

7. A transmitter in a wireless communication system, the transmitter comprising:
   a transceiver configured for at least transmitting or receiving a radio signal; and
   a processor coupled to the transceiver and configured for determining a position of a sub-frame to which a reference signal is mapped based on:
      hybrid automatic repeat request (HARQ) processing time for backhaul link transmission;
      positions of sub-frames for backhaul link transmission;
      a number of sub-frames for backhaul link transmission within one radio frame; and
      a transmission period of the reference signal; and
      transmitting the reference signal to a user equipment (UE) through the sub-frame to which the reference signal is mapped,
   wherein:
   the reference signal is a cell-specific reference signal (CRS);
   if the sub-frame, to which a reference signal is mapped, is overlapped with a Multimedia Broadcast multicast service Single Frequency Network (MBSFN) sub-frame, the reference signal is multiplexed with a Physical Multicast Channel (PMCH) or a Physical Downlink Shared Channel (PDSCH) within the MBSFN sub-frame through a Time Division Multiple (TDM) method at an orthogonal frequency division multiplexing (OFDM) symbol level;
   the transmission period of the reference signal is a multiple of an integer of 5 ms in order to avoid duplicated allocation with a sub-frame to which a Synchronization Channel (SCH) and a Physical Broadcast Channel (PBCH) are allocated; and
   if an OFDM symbol position for the reference signal is overlapped with the sub-frame to which the SCH and the PBCH are allocated, the transmission of the reference signal is punctured in a transmission bandwidth for the SCH and the PBCH.

8. The transmitter of claim 7, wherein the HARQ processing time for backhaul link transmission is 10 ms, 8 ms, or 5 ms.

9. The transmitter of claim 7, wherein the number of sub-frames for backhaul link transmission within one radio frame is 1 or 2.

10. The transmitter of claim 7, wherein the sub-frame to which the reference signal is mapped is not allocated for backhaul link transmission.

\* \* \* \* \*